United States Patent
Walker et al.

(10) Patent No.: US 7,347,364 B2
(45) Date of Patent: Mar. 25, 2008

(54) METHOD AND APPARATUS FOR MANAGING VENDING MACHINE OFFERS

(75) Inventors: Jay S. Walker, Ridgefield, CT (US); Paul T. Breitenbach, Wilton, CT (US); Sih Y. Lee, Northvale, NJ (US); V. Michael O'Neil, New York, NY (US); Paul D. Signorelli, New York, NY (US); Daniel E. Tedesco, Huntington, CT (US); James A. Jorasch, Stamford, CT (US); Geoffrey M. Gelman, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 86 days.

(21) Appl. No.: 11/426,332

(22) Filed: Jun. 26, 2006

(65) Prior Publication Data

US 2006/0231613 A1  Oct. 19, 2006

Related U.S. Application Data

(63) Continuation of application No. 10/855,247, filed on May 27, 2004, and a continuation-in-part of application No. 10/095,372, filed on Mar. 11, 2002, which is a continuation-in-part of application No. 09/012,163, filed on Jan. 22, 1998, which is a continuation-in-part of application No. 08/947,798, filed on Oct. 9, 1997, and a continuation-in-part of application No. 08/920,116, filed on Aug. 26, 1997.

(60) Provisional application No. 60/473,815, filed on May 28, 2003.

(51) Int. Cl.
*G06F 7/08* (2006.01)

(52) U.S. Cl. ...................... 235/381; 235/380

(58) Field of Classification Search ............... 235/375, 235/379, 380, 381, 383; 705/10, 14, 16, 705/17, 20, 21, 39
See application file for complete search history.

(56) References Cited

U.S. PATENT DOCUMENTS 4,587,984 A   5/1986   Levasseur et al. .......... 133/8 R (Continued)

FOREIGN PATENT DOCUMENTS

EP   0 817 138 A1   1/1998

(Continued)

OTHER PUBLICATIONS

Berk, Christina Cheddar, "Many Vending Machines Opt Out of the High-Tech Fixes", WSJ.com, Nov. 4, 2003, 3 pp.

*Primary Examiner*—Karl D. Frech

(57) ABSTRACT

In accordance with one or more embodiments, a promotion redeemable at a vending machine is determined. The promotion comprises an offer distinct from a general offer to sell products from the vending machine at posted prices. The promotion is output (e.g., via an output device of a vending machine, an output device of a peripheral device of a vending machine, an output device of a customer device, or a combination thereof). In some embodiments, the promotion may be determined such that it satisfies the goal of increasing the profitability of the vending machine and/or the goal of conserving an inventory of coins in the vending machine. In some embodiments, determining a promotion may comprise constructing a promotion instance by populating a parameter of a promotion type with a value selected based on one or more rules.

80 Claims, 22 Drawing Sheets

U.S. PATENT DOCUMENTS

| | | | |
|---|---|---|---|
| 4,654,800 A | 3/1987 | Hayashi et al. | 364/479 |
| 5,482,139 A * | 1/1996 | Rivalto | 186/36 |
| 5,774,868 A | 6/1998 | Cragun et al. | 705/10 |
| 5,822,736 A | 10/1998 | Hartman et al. | 705/1 |
| 5,927,541 A * | 7/1999 | Stoken et al. | 221/2 |
| 5,997,928 A * | 12/1999 | Kaish et al. | 426/418 |
| 6,012,834 A | 1/2000 | Dueck et al. | 364/479.08 |
| 6,049,777 A | 4/2000 | Sheena et al. | 705/10 |
| 6,115,649 A | 9/2000 | Sakata | 700/241 |
| 6,119,099 A * | 9/2000 | Walker et al. | 705/16 |
| 7,014,108 B2 | 3/2006 | Sorenson et al. | 235/381 |
| 2006/0122885 A1 | 6/2006 | Ota et al. | 705/14 |

FOREIGN PATENT DOCUMENTS

| | | |
|---|---|---|
| WO | WO 98/58355 | 12/1998 |

\* cited by examiner

| PRODUCT IDENTIFIER 605 | PRODUCT DESCRIPTION 610 | PRODUCT CATEGORY 615 | ROW POSITION 620 | RETAIL PRICE 625 |
|---|---|---|---|---|
| P-123456789 | SNICKERS | CANDY | A1 | $0.75 |
| P-234567891 | MILKY WAY | CANDY | A2 | $0.50 |
| P-345678912 | M&MS | CANDY | A3 | $0.50 |
| P-456789123 | LAYS | CHIPS | B1 | $0.75 |
| P-567891234 | DORITOS | CHIPS | B2 | $0.50 |
| P-678912345 | CHEETOS | CHIPS | B3 | $0.75 |
| P-789123456 | SODA X | SODA | C1 | $0.65 |
| P-891234567 | SODA Y | SODA | C2 | $0.65 |
| P-912345678 | SODA Z | SODA | C3 | $1.00 |

FIG. 6A 600 (CONT.)

| MINIMUM SELLING PRICE 630 | COST 635 | ACTUAL (CURRENT) PRODUCT VELOCITY 640 | DESIRED PRODUCT VELOCITY 645 | CURRENT NUMBER IN STOCK 650 |
|---|---|---|---|---|
| $0.40 | $0.20 | 0.5 / DAY | 3.0 / DAY | 5 |
| $0.40 | $0.20 | 0 / DAY | 3.0 / DAY | 4 |
| $0.35 | $0.25 | 0.5 / DAY | 4.0 / DAY | 3 |
| $0.35 | $0.20 | 0 / DAY | 3.0 / DAY | 6 |
| $0.25 | $0.20 | 0.5 / DAY | 2.0 / DAY | 4 |
| $0.35 | $0.27 | 1.0 / DAY | 2.0 / DAY | 5 |
| $0.50 | $0.25 | 0.5 / DAY | 3.0 / DAY | 4 |
| $0.50 | $0.20 | 0 / DAY | 2.0 / DAY | 2 |
| $0.75 | $0.30 | 1.0 / DAY | 3.0 / DAY | 2 |

| COIN DENOMINATION 705 | QUANTITY 710 |
|---|---|
| $1.00 | 8 |
| $0.50 | 0 |
| $0.25 | 2 |
| $0.10 | 7 |
| $0.05 | 4 |
| $0.01 | 0 |

| AMOUNT TENDERED 830 | CHANGE DISPENSED 835 | PROMOTION IDENTIFIER 840 | RESPONSE 845 |
|---|---|---|---|
| $2.00 | $0.50 | O-555-321 | ACCEPTED |
| $1.00 | $0.50 | O-444-210 | ACCEPTED |
| $2.50 | $0.75 | O-333-109 | REJECTED |
| $1.00 | $0 | O-222-098 | ACCEPTED |
| $1.00 | $0.35 | N/A | N/A |
| $1.00 | $0 | O-000-876<br>O-999-765 | REJECTED<br>ACCEPTED |

FIG. 8B

| PROMOTION IDENTIFIER 1005 | PROMOTION DESCRIPTION 1010 | CONDITION(S) FOR OUTPUT 1015 |
| --- | --- | --- |
| P-10-321 | BUY SODA X AND SNACK W FOR THE PACKAGE PRICE OF $1.00 | IF ACTUAL VELOCITY OF SODA X < MINIMUM THRESHOLD AND SNACK W AMOUNT IN INVENTORY > 10 |
| P-30-528 | GET SNACK W FOR YOUR SPARE CHANGE! | IF COIN INVENTORY BELOW MINIMUM THRESHOLD AND $0.75 > CHANGE DUE < $0.10 |
| P-90-989 | GET SODA X FOR $0.50 (A 50% SAVINGS) INSTEAD OF SODA Y | IF SODA Y AMOUNT IN INVENTORY < 3 AND SODA X AMOUNT IN INVENTORY > 5 |

| COIN INVENTORY STATE 1105 | ELIGIBLE PROMOTION TYPE(S) 1110 |
|---|---|
| EXACT CHANGE DEPOSITED FOR SELECTED ITEM(S) | COMBINATION; FIXED PRICE UPSELL |
| $1, $5 BILL DEPOSITED, CHANGE DUE TO CUSTOMER | COMBINATION; FIXED PRICE UPSELL; DYNAMIC PRICE UPSELL |
| COINS IN HOPPER < AMOUNT NEEDED TO PROVIDE EXACT CHANGE THROUGH CURRENT SALES PERIOD | DYNAMIC PRICE UPSELL |

FIG. 11

| CONDITION 1205 | ELIGIBLE PROMOTION TYPE(S) 1210 |
|---|---|
| R-1201: - IF LESS THAN 3 DAYS REMAIN IN FILL PERIOD<br>-AND NO TRANSACTION UNDERWAY<br>- AND ACTUAL AVERAGE VELOCITY OF ALL INVENTORIED PRODUCTS < DESIRED VELOCITY | -THEN COMBINATION |
| R-1202: -IF CUSTOMER ENGAGES IN FIRST TRANSACTION<br>-AND ACTUAL AVERAGE VELOCITY OF ALL INVENTORIED PRODUCTS < DESIRED VELOCITY<br>-AND COIN INVENTORY > FORECASTED CHANGE DUE UNTIL RESTOCK BASED ON CURRENT SALES | -THEN FIXED PRICE UPSELL OR<br>-COMBINATION |
| R-1203: -IF CUSTOMER ENGAGES IN FIRST TRANSACTION<br>-AND ACTUAL AVERAGE VELOCITY OF ALL INVENTORIED PRODUCTS < DESIRED VELOCITY<br>-AND COIN INVENTORY > FORECASTED CHANGE DUE UNTIL RESTOCK BASED ON CURRENT SALES | -THEN DYNAMIC PRICE UPSELL OR<br>-ALTERNATE PRODUCT OFFER |

FIG. 12

METHOD AND APPARATUS FOR MANAGING VENDING MACHINE OFFERS

The present application:

(i) is a continuation application that claims benefit and priority under 35 U.S.C. §120 to commonly owned and co-pending U.S. patent application Ser. No. 10/855,247, entitled "METHOD AND APPARATUS FOR MANAGING VENDING MACHINE OFFERS", and filed May 27, 2004, which itself claims the benefit of Provisional Application No. 60/473,815, filed May 28, 2003 in the name of Walker et al. and entitled "APPARATUS, SYSTEM AND METHOD FOR PROFIT MANAGED VENDING MACHINE TRANSACTIONS"; and (ii) is a continuation-in-part application that claims benefit and priority under 35 U.S.C. §120 to commonly owned and co-pending U.S. patent application Ser. No. 10/095,372 entitled "METHOD AND APPARATUS FOR VENDING A COMBINATION OF PRODUCTS" and filed on Mar. 11, 2002, which itself:

(1) is a continuation-in-part of U.S. Patent application Ser. No. 09/012,163, entitled "METHOD AND APPARATUS FOR AUTOMATICALLY VENDING A COMBINATION OF PRODUCTS", filed on Jan. 22, 1998, which is a continuation-in-part of U.S. Patent application Ser. No. 08/947,798 entitled "METHOD AND APPARATUS FOR DYNAMICALLY MANAGING VENDING MACHINE INVENTORY PRICES" filed Oct. 9, 1997; and (2) is a continuation-in-part of U.S. application Ser. No. 08/920,116 entitled "METHOD AND SYSTEM FOR PROCESSING SUPPLEMENTARY PRODUCT SALES AT A POINT-OF-SALE TERMINAL" filed Aug. 26, 1997.

Each of the above-referenced applications is incorporated by reference herein in its entirety.

This Application is related to the following commonly-owned U.S. Patent Applications:

1) U.S. patent application Ser. No. 08/920,116 entitled "Method And System For Processing Supplementary Product Sales At A Point-Of-Sale Terminal", filed Aug. 26, 1997 in the name of Walker et al., which issued as U.S. Pat. No. 6,119,099 on Sep. 12, 2000;

2) Co-pending U.S. patent application Ser. No. 08/947,798 entitled "Method And Apparatus For Dynamically Managing Vending Machine Inventory Prices", filed Oct. 9, 1997 in the name of Tedesco et al.;

3) Co-pending U.S. patent application Ser. No. 09/345,092 entitled "Vending Machine System And Method For Encouraging The Purchase Of Profitable Items", filed Jun. 30, 1999 in the name of Walker et al.;

4) Co-pending U.S. patent application Ser. No. 09/603,677 entitled "Method And Apparatus For Selecting A Supplemental Product To Offer For Sale During A Transaction", filed Jun. 26, 2000 in the name of Mueller et al.

5) Co-pending U.S. patent application Ser. No. 09/994,810 entitled "Method And Apparatus For Utilizing Demand Information At A Vending Machine", filed Nov. 27, 2001 in the name of Walker et al.;

6) Co-pending U.S. patent application Ser. No. 10/095,372 entitled "Method And Apparatus For Vending A Combination Of Products", filed Mar. 11, 2002 in the name of Walker et al.; and 7) Co-pending U.S. patent application Ser. No. 10/403,184 entitled "Method And Apparatus For Managing And Providing Offers", filed Mar. 28, 2003 in the name of Van Luchene et al.

The entirety of each of the above applications is incorporated by reference herein for all purposes.

BACKGROUND

Traditional vending machines provide sellers with the ability to offer products to consumers in an automated fashion, thereby allowing the sale of products at places where face-to-face retailing efforts are not practical (e.g. the lobby of an office building) and at times inconvenient for traditional retailers (e.g. 3 AM on a Tuesday morning). However, traditional vending machines do not permit the flexibility enjoyed by human retailers in dynamically responding to changes in supply and demand.

Applicants have previously recognized that significant benefits ensue from vending machines configured to dynamically respond to market forces. For example, Applicants' co-pending U.S. patent application Ser. No. 08/947,798, entitled METHOD AND APPARATUS FOR DYNAMICALLY MANAGING VENDING MACHINE INVENTORY PRICES and filed Oct. 9, 1997, enables the automated, dynamic pricing of vended products based on stored rules that consider up-to-date supply and demand data gathered when no human salesperson is present. Further, Applicant's co-pending U.S. patent application Ser. No. 10/095,372, entitled METHOD AND APPARATUS FOR VENDING A COMBINATION OF PRODUCTS and filed Mar. 11, 2002, enables the automated, dynamic configuration of promotional product combinations based on supply and demand data. Further still, Applicant's co-pending U.S. patent application Ser. No. 09/218,085, entitled METHOD AND APPARATUS FOR VENDING PRODUCTS and filed Dec. 22, 1998, enables the automatic selection of products for customers based on supply and demand data. Additionally, Applicant's co-pending U.S. patent application Ser. No. 09/345,092, entitled VENDING MACHINE SYSTEM AND METHOD FOR ENCOURAGING THE PURCHASE OF PROFITABLE ITEMS and filed Jun. 30, 1999, enables the presentment of offers for substitute products based on supply and demand data.

The advantages of the inventions described in the above applications are significant. However, given the complexity of the marketplace, an ongoing need exists for vending machine systems and methods that dynamically respond to market forces. More specifically, an ongoing need exists for vending machine systems and methods that dynamically institute promotional tactics in a beneficial manner (e.g., in a manner that increases overall machine profit).

Further, many potential customers of prior art vending machines are unable to purchase items when machines require "correct change only". A vending machine may require "correct change only" when the machine contains an insufficient amount of machine coin inventory that may be used to provide customers with change. Accordingly, a need exists for systems and methods that preserve vending machine coin inventory so that more customers may purchase vending machine products despite their inability to tender exact change, thus resulting in fewer losses of potential sales.

BRIEF DESCRIPTION OF THE FIGURES

FIGS. 6A and 6B are a table illustrating an example data structure of an example product inventory database for use in some embodiments of the present invention.

FIG. 7 is a table illustrating an example data structure of an example coin inventory database for use in some embodiments of the present invention.

FIGS. 8A and 8B are a table illustrating an example data structure of an example transaction history database for use in some embodiments of the present invention.

FIG. 10 is a table illustrating an example data structure of an example available offers database for use in some embodiments of the present invention.

FIG. 11 is a table illustrating an example data structure of an example rules database for use in some embodiments of the present invention.

FIG. 12 is a table illustrating an example data structure of another example rules database for use in some embodiments of the present invention.

DETAILED DESCRIPTION OF THE INVENTION

Figure 1:
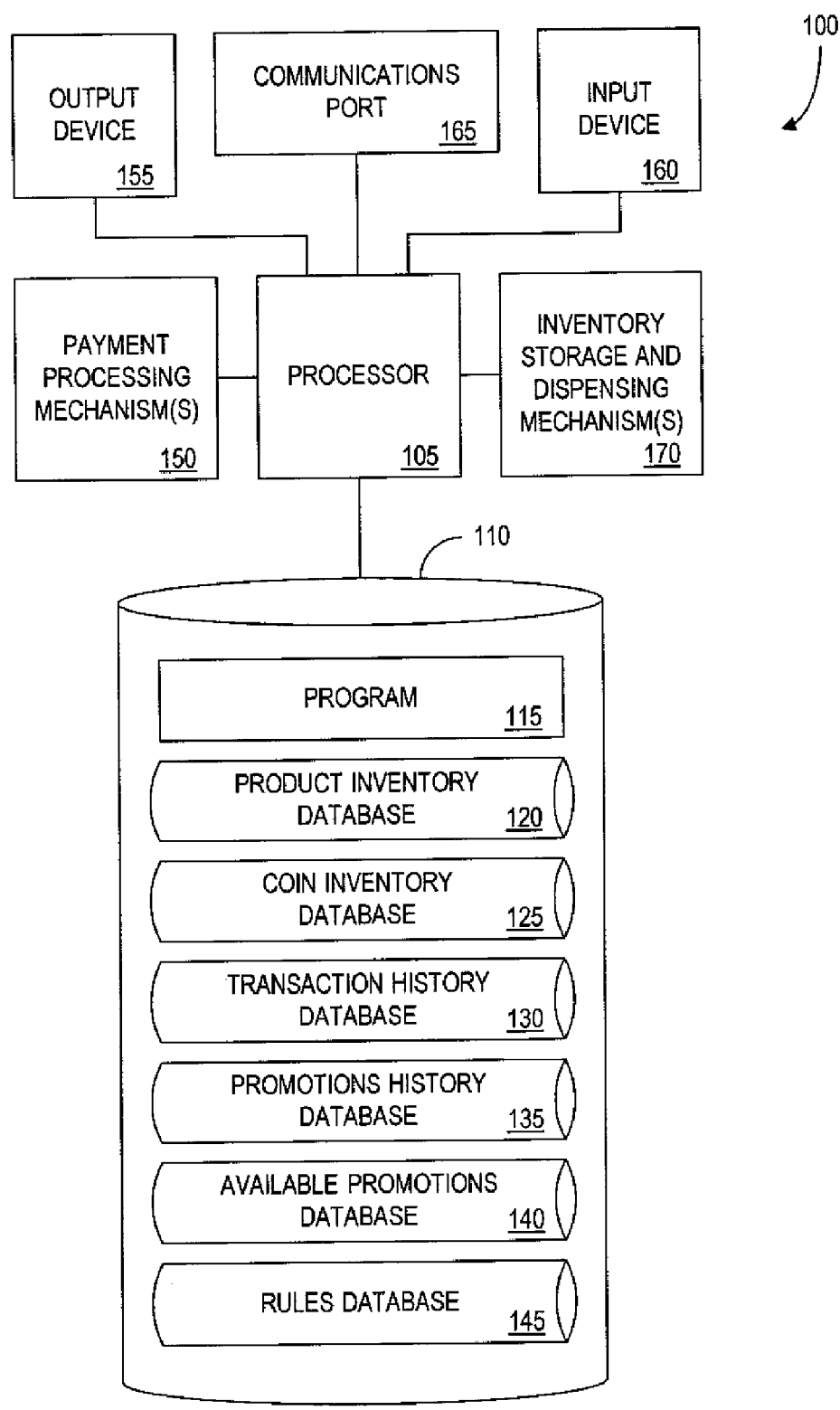
FIG. 1 is a block diagram of an embodiment of a vending machine consistent with some embodiments of the present invention.

Applicants have recognized that, in some situations, it may be advantageous to output a promotion to a customer of a vending machine, the promotion being distinct from a general offer to sell products from the vending machine at posted prices.

Applicants have further recognized that, in some situations, such a promotion may be utilized to manage the profitability of a vending machine.

Applicants have further recognized that, in some situations, taking into account certain information when determining such a promotion may aid in the management of the profitability of the vending machine. Such information may comprise, for example, information regarding a current inventory of a vending machine, an expected restocking of the vending machine, a current coin inventory of the vending machine, at least one transaction previously completed at the vending machine, and/or a transaction currently initiated at the vending machine.

Applicants have yet further recognized that, in some situations, multiple such promotions may be possible and thus it can be beneficial to have software operable to select which, if any, of the possible promotions to output. Such software may, for example, enable an efficient process for selecting the promotion that is likely to result in the most profit for a vending machine and/or that is most likely to be accepted by a customer of the vending machine.

With these and other advantages and features of the invention that will become hereinafter apparent, the nature of the invention may be more clearly understood by reference to the following detailed description of the invention, the appended claims and to the several drawings included herein.

In the following description, reference is made to the accompanying drawings that form a part hereof and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense.

According to an embodiment of the present invention, a promotion redeemable at a vending machine is determined, the promotion comprising an offer distinct from a general offer to sell products from the vending machine at posted prices. The promotion is then caused to be output.

For example, a peripheral device associated with a vending machine may determine, based on current inventory and a rate at which each of the products available from the vending machine have been selling, that it may be desirable to promote the sale of a certain slow-selling product in order to increase the profits of the vending machine for a current sales period. Accordingly, the peripheral device may determine that it would be beneficial to promote the slow-selling product either by (i) promoting the slow-selling product as an alternate product to a product selected by a customer or (ii) by offering the slow-selling product in a package along with a more popular product, for a package price that is less than the sum of the retail prices of the slow-selling product and the popular product. The peripheral device may select one of these possible promotions by, for example, calculating an expected value for each and selecting the one with the highest expected value. Assuming the package promotion is associated with the higher expected value, the peripheral device may output, via an output device of the peripheral device, a promotion informing customers of the vending machine that the slow-selling product and the popular product are available for a package price. Alternatively, the peripheral device may direct a processor of the vending machine to cause an output device of the vending machine to output the promotion.

According to another embodiment of the present invention, an occurrence of a predetermined event may be determined. An instance of a promotion may be constructed in response to the determination of the predetermined event. The instance of the promotion may comprise an offer distinct from a general offer to sell products from the vending machine at posted prices. The instance of the promotion may be constructed based on (i) at least one of data associated with transactions completed at a vending machine and data associated with a transaction currently initiated at the vending machine; and (ii) a predetermined goal stored in a memory. The instance of the promotion may then be output via an output device of the vending machine.

For example, it may be determined that a coin inventory of a vending machine is lower than a predetermined threshold. Accordingly, in order to conserve the current inventory of coins and avoid requiring "exact change only" for future transactions, it may be determined that an offer for an additional product in exchange for any change due should be output to a customer who deposits more money than required for a selected product. Thus, when a customer inputs a $1.00 and selects for purchase a product associated with a retail price of $0.65, the vending machine may determine a promotion that offers to the customer an additional product in exchange for the $0.35 that is otherwise due the customer. The additional product may be determined, for example, based on the selected product. For example, a complementary product may be selected (e.g., if the customer selects a snack, the additional product may be a drink).

In accordance with some embodiments, apparatus, systems and methods are disclosed for managing the profitability of a vending machine by constructing promotions based on an evaluation of sales data in light of criteria including but not limited to stored, or dynamically generated, rules.

According to one embodiment of the present invention, sales and/or cost data is monitored and compared to a profit goal. If a forecast based on the sales and/or cost data indicates that the profit goal will likely not be reached within a predefined period (e.g., by a restock date), a determination is made as to which of several possible promotion types may be appropriate for the circumstances based on stored rules. Several promotion types are disclosed herein, including (i) combination product promotions, (ii) "dynamically priced upsell" promotions, in which customers are offered the opportunity to purchase products for an amount equal to the change due from a first, triggering transaction, and (iii) "fixed-price upsell" promotions, in which customers are offered the opportunity to purchase products for an amount that may require more or less than the change due from a first, triggering transaction. For each potential promotional type, a hypothetical promotion instance may be constructed based on stored rules (e.g., a potential offer to sell an additional candy bar for $0.35), and an expected profit associated with each hypothetical promotion instance is calculated (e.g. $0.10). According to the relative expected profitability of the constructed hypothetical promotion instances, at least one promotional instance is selected and used as the basis for a promotion to a customer.

Specifically and in accordance with one embodiment, the promotion may be executed by (a) outputting promotion content to a customer via an output device such as a touch screen, (b) determining the customer's response to the promotion by receiving a signal from an input device such as a touch screen, and (c) recording sales data including (i) whether the customer accepted or rejected the promotion, and (ii) an updated inventory count reflecting dispensed products. The recorded sales data is in turn used in subsequent promotion construction processes.

In some embodiments, the determination of whether a promotion is appropriate is made periodically or substantially continuously, so that promotional offers can be offered to prospective customers before a transaction is initiated ("proactive promotions"). In other embodiments, the determination of whether a promotion is appropriate is made following the initiation of a transaction by a customer ("reactive promotions").

Thus, utilizing embodiments of the present invention, a vending machine's profit per fill period may be increased. Specifically, rules for determining available promotion types, constructing hypothetical promotion instances, and/or selecting a promotion from several hypothetical promotion instances are designed to, in some embodiments, (i) increase sales volume/velocity while not undermining overall machine profitability through "dilution" and/or "diversion" effects, and/or (ii) preserve an available coin inventory so that change can be provided to an increased number of customers during a fill period.

A. Terms

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The term "actual product velocity" may refer to an actual rate at which a given product is sold by a vending machine during a period of time (e.g., during a sales period).

The term "baseline velocity demand" may refer to the total number of products sold at retail price within a particular period of time (e.g., during a particular sales period).

The term "coin conservation" may refer to the practice of managing the working capital stored in a vending machine, such as by managing an inventory of coins or other currency so as to reserve or preserve a minimum amount that can be used to provide customers with change when appropriate. In some embodiments, a vending machine can engage in coin conservation efforts by configuring and outputting one or more promotions to a customer. For example, where a forecast based on current sales patterns indicates that an insufficient number of coins remains in the machine to make correct change for every anticipated transaction, a vending machine control system may execute dynamically priced upsell promotions (where customers are offered additional products for their change due), and thereby engage in coin conservation.

The term "control system" may refer to a combination of hardware and software, operative to carry out methods of the present invention. For example, a control system may comprise a processor performing instructions of a program.

The terms "customer device" and "user device" shall be synonymous and may refer to any device owned or used by a customer, which device is capable of accessing and/or outputting online and/or offline content. Customer devices may communicate with one or more vending machine servers, one or more vending machines, one or more third-party service provider servers, one or more user terminals, and/or other network nodes. In some embodiments, customer devices may, for example, include gaming devices, personal computers, personal digital assistants, point-of-sale terminals, point of display terminals, kiosks, telephones, cellular phones, automated teller machines (ATMs), pagers, and combinations of such devices.

The terms "dilution" and "price dilution" shall be synonymous and may refer to the negative effect on profitability that ensues when a product is sold for a price lower than a given customer otherwise would have paid for the product. In some embodiments, the potential for dilution is factored into stored rules for constructing promotion instances. Thus, in some embodiments, vending machines may be programmed to eliminate or reduce the effects of dilution by picking those promotion instances that are less likely to result in dilution, or are more likely to result in less dilution.

The term "diversion" may refer to the negative effect on profitability that ensues when a lower price or lower profit product is sold to a customer instead of a higher price or higher profit product that the customer otherwise would have purchased. In some embodiments, the potential for diversion is factored into stored rules for constructing promotion instances. Thus, in some embodiments, vending machines may be programmed to eliminate or reduce the effects of diversion by picking those promotion instances that are less likely to result in diversion.

The terms "dynamically priced upsell promotion", "dynamic priced upsell promotion", "roundup deal", "roundup promotion", and "spare-change upsell promotion" shall be synonymous and may refer to a promotion to a customer of a first product for the purchase of an additional product in exchange for an additional amount that is equal to an amount of change due back to the customer as a result of the customer's purchase of the first product.

The terms "fill period" and "sales period" shall be synonymous and may refer to the period of time between restocking events at a vending machine.

The terms "fixed price upsell promotion" and "upsell promotion" shall be synonymous and may refer to a promotion to a customer of a first product for the purchase of an additional product in exchange for an additional amount that is not necessarily correlated with an amount of change due back to the customer as a result of the customer's purchase of the first product. In some embodiments, a customer who has purchased a first product and is thereby due change may be required to deposit additional currency in order to accept a fixed price upsell promotion. Thus, the fixed price upsell promotion may require that the customer pay an amount equal to his or her change due plus an additional amount of currency.

The terms "full price" and "retail price" shall by synonymous and may refer to the normal price charged for the purchase of a given product. Typically, promotions present customers with the opportunity to purchase products at less than full price.

The terms "ideal product velocity", "target product velocity", and "target velocity" shall be synonymous and may refer to the desired rate at which a given product should be sold by a vending machine during a period of time (e.g., during a sales period). Thus, in some embodiments, an ideal velocity may be set or calculated for each product indicating the rate at which products must be sold in order to deplete the inventory to a certain level by the end of a given sales period (i.e., by the next restocking event at the vending machine).

For example, an ideal product velocity may be calculated by a vending machine control system after an operator inputs a restock date and a desired remaining inventory for the date. For example, an operator may wish to have only one of each product remaining at the next restocking event so that the vending machine sells as many products as possible without completely selling out and thereby disappointing customers. Thus, in the preceding example, if an operator (a) stocks 50 units of Soda A, (b) inputs a restock date fourteen days away, and (c) indicates that only one unit of Soda A should remain at the restock date, the control system may divide 49 by 14 to conclude that, on average, 3.5 units must be sold per day within the sales period in order to realize the ideal product velocity.

As discussed herein, a vending machine or other device may periodically, substantially continuously, or otherwise determine whether or not actual product velocity is at least equal to the ideal product velocity, and if not, may institute promotions as discussed herein. An ideal product velocity may be further set so that if such a velocity is reached, the increase in volume will sufficiently offset any discounts afforded to customers through promotions, thereby eliminating or reducing the potential for dilution.

The term "input device" may refer to a device that is used to receive an input. An input device may communicate with or be part of another device (e.g. a point of sale terminal, a point of display terminal, a customer terminal, a server, a customer device, a vending machine, a controller, a peripheral device, etc.). Some examples of input devices include: a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale.

The term "output device" may refer to a device that is used to output information. An output device may communicate with or be part of another device (e.g. a vending machine, a point of sale terminal, a point of display terminal, a customer device, a controller, etc.). Possible output devices include: a cathode ray tube (CRT) monitor, liquid crystal display (LCD) screen, light emitting diode (LED) screen, a printer, an audio speaker, an infra-red transmitter, and a radio transmitter.

The term "minimum selling price" may refer to the lowest price at which a product may be sold. The minimum selling price may not necessarily reflect the cost of the product to the operator of a vending machine. Thus, the minimum selling price may include an acceptable profit margin. Conversely, the minimum selling price may be set less than the cost of a product to the operator of a vending machine, as may be the case where a promotion or series of promotions would sufficiently offset any loss associated with selling the particular product below cost.

The term "operator" may refer to the owner of a vending machine, or agent or associate thereof (e.g., a route driver or lessee of a vending machine).

The terms "package deal", "combination deal", "package promotion", "combination promotion", "combination product promotion", "'Load-up' deal", "value combo deal", and "combo deal" shall be synonymous and may refer to a promotion enabling a customer to purchase at least two products for a single price. In one or more embodiments, package promotions are configured to result in a benefit (e.g., net-savings) to the customer when compared to the sum of the individual component product's retail prices.

The term "peripheral device" may refer to any device associated with one or more vending machines, the peripheral device being operable to perform any of the functions described herein. For example, in one embodiment a prior art vending may be retrofitted with a peripheral device that comprises a processor, memory, and output device for facilitating promotions in accordance with embodiments of the present invention. A peripheral device may or may not be attached to a vending machine. A peripheral device mayor may not be operable to direct the associated vending machine to perform certain functions. A peripheral device, or portions thereof, may be housed inside the casing of the associated vending machine. Further, a peripheral device may be operable to detect one or more events at a vending machine. For example, a peripheral device may be operable to detect one or more signals output by a processor of a vending machine. Further still, a peripheral device may be operable to communicate with a processor of an associated vending machine.

The term "proactive promotion" may refer to a promotion provided to one or more customers irrespective of customer action (e.g., promotions offered to customers independent of a first, triggering transaction). For example, a proactive promotion is the offering of a combination product offer to all customers via an output device such as an LCD screen. A proactive promotion may be output, for example, constantly, periodically, randomly and/or only when the presence of a customer is detected at the vending machine.

The terms "product," "good," "item", "merchandise," and "service" shall be synonymous and may refer to anything licensed, leased, sold, available for sale, available for lease, available for licensing, and/or offered or presented for sale, lease, or licensing including individual products, packages of products, subscriptions to products, contracts, information, services, and intangibles. Examples of goods sold at vending machines include beverages (e.g. cans of soda) and snacks (e.g. candy bars). Examples of services sold by vending machines include car washes, photography services and access to digital content (e.g. permitting the downloading of MP3 files or "ring tunes" to a handheld device).

The term "profit inventory management" or "PIM" may refer to the practice of managing the sale of products so as to increase a vending machine's profitability during a period of time (e.g., during a sales period). In some embodiments, a vending machine is programmed to evaluate sales data in light of stored rules indicative of a profit goal. For example, stored rules may indicate an ideal product velocity that would tend to increase the machine's profitability. The machine may determine that, based on cent sales data, the ideal product velocity (for a given product or group of products) will not be achieved based on current promotions, prices, or other sales parameters. In response, the vending machine may execute multi-variant equations to identify, construct and offer a promotion to a customer with the goal of achieving the ideal product velocity (for a given product or group of products).

The term "promotion instance" may refer to an instance of a potential or hypothetical promotion that may be output (e.g., to a particular customer). A promotion instance may be constructed and compared to other potential or hypothetical promotion instances for the purpose of determining which one or more promotions will be presented to a customer for acceptance. In one or more embodiments, promotion instances are constructed by populating promotion types with data representing inventory in a vending machine.

The term "promotion type" may refer to the form, format or category of a promotion, as distinguished from the products and/or prices that may be included in a promotion. For example, the form of an promotion may be a "dynamically priced upsell", meaning that a particular product will be offered to a customer in exchange for the customer's change due from a first, triggering transaction. Thus, one dynamically priced upsell promotion may include Product A, whereas another such promotion may include Product B, but both promotions may be of the "dynamically priced upsell" promotion type.

The term "promotion" may refer to a message that is output, regarding some product, distinct from a general offer to sell products from a vending machine at retail prices. For example, a promotion may comprise a message intended to increase machine profitability. Typically, a promotion allows customers to purchase one or more products under terms that are generally more favorable to the customer than standard retail terms (e.g., at prices less than or equal to the corresponding product's full price(s), but greater than or equal to the corresponding product's minimum prices)).

The term "reactive promotion" may refer to a promotion that is offered to a customer in response to a customer action, such as the purchase of a product or a request for a promotion. Examples of reactive promotions include dynamically priced upsell offers and fixed-price upsell offers.

The terms "restock date", "restock time", "restore event" and "pick-up," shall be synonymous and may refer to time and/or date that a vending machine is scheduled to be restocked by an operator of a vending machine.

The terms "server" and "controller" shall be synonymous and may refer to any device that may communicate with one or more vending machines, one or more third-party servers, one or more remote controllers, one or more customer devices, one or more peripheral devices and/or other network nodes, and may be capable of relaying communications to and from each.

The terms "target profit" and "ideal profit" may be used interchangeably and may refer to a desired profit to be achieved by a vending machine or group of vending machines. In some embodiments, the profit goal set by an operator of a vending machine.

The scope of the present invention and embodiments thereof may be understood more fully with reference to the following figures. Embodiments of the present invention are first described by means of block diagrams illustrating exemplary system infrastructure and devices that may be utilized by an entity practicing the present invention. Exemplary data structures illustrating tables that may be used when practicing embodiments of the present invention are then described, followed by schematic diagrams of exemplary software architecture designed to implement some embodiments of the present invention. Finally, flow diagrams that, illustrate exemplary processes consistent with some embodiments of the present invention are described.

B. Systems and Apparatus

Generally, a vending machine in accordance with the present invention may comprise a device, or communicate with a device (e.g., a server, a peripheral device, and/or a peripheral device server), configured to manage sales transactions with customers by, among other things, receiving payment from customers, controlling the pricing and/or distribution of goods and/or controlling entitlements to services.

Referring now to FIG. 1, illustrated therein is a block diagram of an embodiment of a system consistent with the present invention. More specifically, FIG. 1 is a block diagram of a vending machine 100 that may be operable to perform one or more functions described herein.

The vending machine 100 may include a processor 105, such as one or more Intel® Pentium® processors. The processor 105 may include or be coupled to one or more clocks or timers (not pictured) and one or more communication ports 165 through which the processor 105 may communicate, in accordance with some embodiments, with other devices such as one or more peripheral devices, one or more servers, one or more peripheral devices, and/or one or more user devices. The processor 105 is also in communication with a data storage device 110. The data storage device 110 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 105 and the storage device 110 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the vending machine 100 may comprise one or more computers (or processors 105) that are connected to a remote server computer operative to maintain databases, where the data storage device 110 is comprised of the combination of the remote server computer and the associated databases.

The data storage device 110 stores a program 115 for controlling the processor 105. The processor 105 performs instructions of the program 115, and thereby operates in accordance with the present invention, and particularly in accordance with the methods described in detail herein. The present invention may be embodied as a computer program 115 developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers.

The program 115 may be stored in a compressed, uncompiled and/or encrypted format. The program 115 furthermore may include program elements that may be generally useful, such as an operating system, a database management system and device drivers for allowing the processor 105 to interface with computer peripheral devices. Appropriate general purpose program elements are known to those skilled in the art, and need not be described in detail herein.

Further, the program 115 is operative to execute a number of invention-specific, objects, modules and/or subroutines which may include (but are not limited to) one or more subroutines to determine whether a promotion should be output; one or more subroutines to determine a promotion type; one or more subroutines to populate a promotion type, thereby constructing a promotion instance; one or more subroutines to select a constructed promotion instance from a plurality of hypothetical promotion instances; and/or one or more subroutines to determine an expected value of a promotion being considered for output. Examples of some of these subroutines and their operation are described in detail below in conjunction with the flowcharts depicted in FIGS. 13 through 16.

According to some embodiments of the present invention, the instructions of the program 115 may be read into a main memory of the processor 105 from another computer-readable medium, such from a ROM to a RAM. Execution of sequences of the instructions in the program 115 causes processor 105 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 115, the storage device 110 is also operative to store one or more databases, such as (i) an product inventory database 120, (ii) a coin inventory database 125, (iii) a transaction history database 130, (iv) a promotion history database 135, (v) an available promotions database 140, and (vi) one or more rules database 145. The databases 120, 125, 130, 135, 140 and 145 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though six separate databases are illustrated, the invention could be practiced effectively using one, two, three, four, five, seven or more functionally equivalent databases.

Similarly, the illustrated entries of the databases represent exemplary information only; those skilled in the art will understand that the number and content of the entries can be different from those illustrated herein.

Further, despite the depiction of the databases as tables, an object-based model could be used to store and manipulate the data types of the present invention and likewise, object methods or behaviors can be used to implement the processes of the present invention. Examples of some of these processes are described below in detail with respect to FIGS. 13 through 16.

It should be noted that the term "computer-readable medium" as used herein refers to any medium that participates in providing instructions to a processor for execution. Such a medium may take many forms, including but not limited to, non-volatile media, volatile media, and transmission media. Non-volatile volatile media include, for example, optical or magnetic disks, such as memory. Volatile media include dynamic random access memory (DRAM), which typically constitutes the main memory. Transmission media include coaxial cables, copper wire fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable media may be involved in carrying one or more sequences of one or more instructions to a processor for execution.

Vending machine 100 may comprise payment processing mechanism(s) 150. The payment processing mechanism(s) 150 may comprise one or more mechanisms for receiving payment and dispensing change, including a coin acceptor, a bill validator, a card reader (e.g. a magnetic stripe reader) and a change dispenser.

In a manner known in the art, a magnetic stripe card reader may read data on the magnetic stripe of a credit or debit card, and it may cooperate with conventional point-of-sale credit card pressing equipment to validate card-based purchases through a conventional transaction authorization network. Suitable card-based transaction processing systems and methods are available from USA Technologies, Inc.™ of Wayne, Pa.

The coin acceptor, bill validator and change dispenser may communicate with a currency storage apparatus (a "hopper"; not shown) and may comprise conventional devices such as models AE-2400, MC5000, TRC200 by Mars, Inc.™ of West Chester, Pa., or CoinCo™ model 9300-L.

The coin acceptor and bill validator may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein for all purposes. The change dispenser activates the return of coinage to the customer where appropriate (e.g. where a customer rejects or otherwise fails to accept a dynamically priced upsell offer). Such apparatus may feature Multidrop Bus (MDB) and/or Micromech peripheral capabilities, as is known in the art.

In another embodiment, a vending machine in accordance with the present invention may be configured to receive payment authorization and product selection commands through a wireless device communication network, directly or indirectly, from a customer device (e.g. a cellular telephone). In such an embodiment, a payment processing mechanism may comprise a cellular transceiver operatively connected to a processor, as described herein. Systems and methods allowing for the selection of and payment for vending machine articles through cellular telephones are provided by USA Technologies, Inc.™. Further, in such an embodiment, a customer cellular telephone may serve as an input/output device, as described herein.

Further details concerning vending machine payment processing mechanisms are well known in the art, and need not be described in further detail herein.

The vending machine 100 may her comprise an output device 155 and an input device 160. It should be understood that, although only a single output device 155 and a single input device 160 is illustrated in FIG. 1, any number of output devices and/or input devices may be used.

In accordance with embodiments of the presenting invention, a vending machine may include an input device for receiving input from a (i) a customer indicating a product and/or offer selection, and/or (ii) an operator (or agent thereof) during stocking or maintenance of the vending machine. Also, a vending machine may include one or more output devices for outputting product and/or promotion information to a customer or operator.

Many combinations of input and output devices may be employed in accordance with embodiments of the present invention. For example, in embodiments which feature touch screens (described herein), input and output functionality may be provided by a single device.

As described, a vending machine may include more than one input device. For example, a vending machine may include an exterior input device for receiving customer input and an interior input device for receiving operator input. In some embodiments, however, the input device provides the dual functionality of receiving input data from both operators and customers.

As also described, a vending machine may comprise more than one output device. For example, a vending machine may include both an Liquid Crystal Display (LCD) screen and several Light Emitting Diodes (LEDs).

Output device 155 may comprise, for example, an LCD and/or one or more LEDs displays (e.g., several alphanumeric LEDs on the shelves of a vending machine, each LED being associated with a row of product inventory).

In one embodiment, an LED display screen may be mounted atop a vending machine (e.g., attached thereto, such as via bolts or other mounting hardware). Such a mounted LED display screen and may be used to communicate promotions and other messages (e.g., product advertisements) to prospective customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green, black) regarding current and upcoming promotions.

Further, in some embodiments, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. raging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly.

Input device 160 may comprise one or more of (1) a set of alpha-numeric keys for providing input to the vending machine, such as the Programmable Master Menu® Keypad, (2) a selector dial, (3) a set of buttons associated with a respective set of item dispensers, (4) a motion sensor, (5) a barcode reader, (6) a voice recognition module, (7) a Dual-Tone Multi-Frequency receiver/decoder, (8) a wireless device (e.g. a cellular telephone or wireless Personal Digital Assistant), and/or (9) any other conventional input device commonly employed by a vending machine designer.

As described, in some embodiments, a touch-sensitive screen may be employed to perform both input and output functions. Suitable, commercially available touch screens for use in accordance with the present invention are manufactured by Elo TouchSystems, Inc.™, of Fremont, Calif., such as Elo's AccuTouch™ series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in² (15,500 touchpoints/cm²) for a 13-inch touch screen. For such touch screens, the touch activation force required to trigger an input signal to the processor (described herein) via the touch screen is typically 2 to 4 ounces (57 to 113 g). Additionally, touch screens for use in accordance with embodiments of the present invention may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art and need not be described further herein.

Vending machine 100 may further comprise one or more inventory storage and dispensing mechanism(s) 170. Product inventory storage and product dispensing functions of a vending machine configured in accordance with a snack machine embodiment of the present invention may include one or more of: (i) a drive motor, (ii) metal shelves, (iii) a product delivery system (e.g. a chute, product tray, product tray door, etc.), (iv) dual spiral (i.e. double helix) item dispensing rods, (v) convertible (i.e. extendable) shelves, and/or (vi) a refrigeration unit.

In some embodiments, as described below with respect to FIG. 3, a vending machine may be housed in a casing of the model 129 SnackShop manufactured by Automatic Products™. In such embodiments, 3 removable shelves may be employed, together providing for 30 product rows and an inventory capacity of between 185 to 522 commonly vended snack products.

Inventory storage and dispensing mechanism(s) 170 may comprise one or more of: (i) metal and/or plastic shelving, (ii) item dispensing actuators/motors, (iii) product delivery chutes, and/or (iv) a refrigeration unit. Further details concerning vending machine inventory storage and dispensing mechanisms are well known in the art, and need not be described in further detail herein.

Figure 2A:
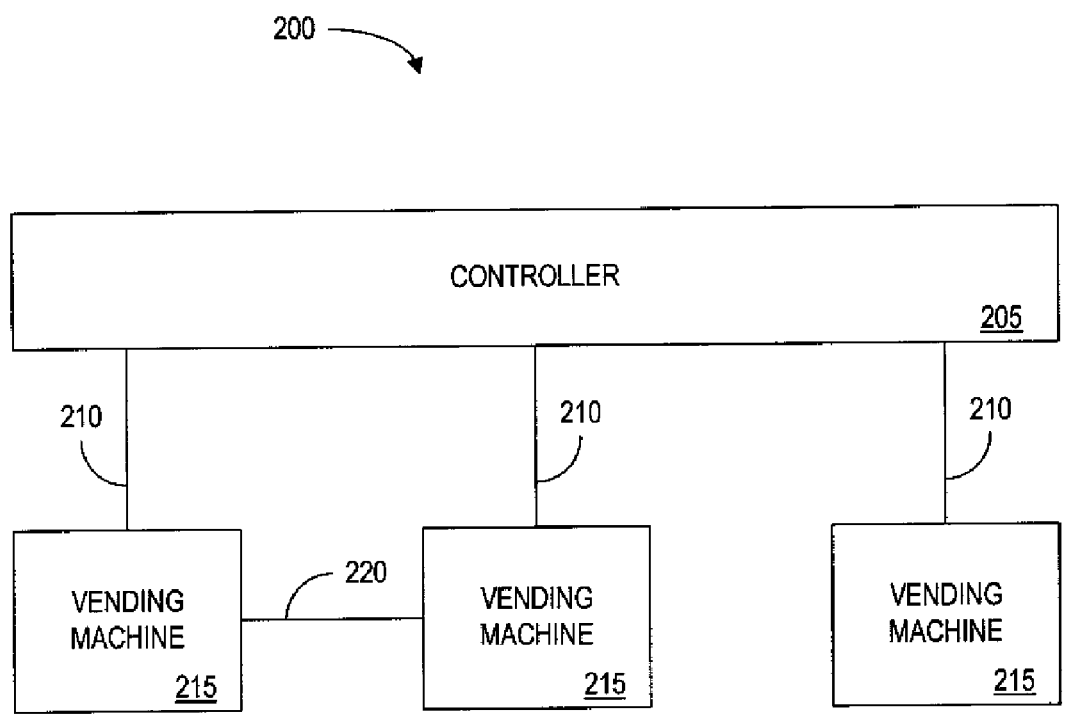
FIG. 2A is a block diagram of an embodiment of a system consistent with some embodiments of the present invention.

Referring now to FIG. 2A, a block diagram of a system 200 according to at least one embodiment of the present invention includes a controller 205 that is in communication, via a communications network 210, with one or more vending machines 215. The controller 205 may communicate with the vending machines 215 directly or indirectly, via a wired or wireless medium such as the Internet, LAN, WAN or Ethernet, Token Ring, or via any appropriate communications means or combination of communications means. Each of the vending machines 215 may comprise computers, such as those based on the Intel® Pentium® processor, that are adapted to communicate with the controller 205. Any number and type of vending machines 215 may be in communication with the controller 205.

Communication between the vending machines 215 and the controller 205, and among the vending machines 215 (which communicate via communication network 220), may be direct or indirect, such as over the Internet through a Web site maintained by controller 205 on a remote server or over an on-line data network including commercial on-line service providers, bulletin board systems and the like. In yet other embodiments, the vending machines 215 may communicate with one another and/or controller 205 over RF, cable TV, satellite links and the like.

Some, but not all, possible communication networks that may comprise network 210 and/or network 220 or be otherwise part of system 200 include; a local area network (LAN), a wide area network (WAN), the Internet, a telephone line, a cable line, a radio channel, an optical communications line, a satellite communications link. Possible communications protocols that may be part of system 200 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the controller 205 may not be necessary and/or preferred. For example, the present invention may, in one or more embodiments, be practiced on a stand-alone vending machine 100 and/or a vending machine 100 in communication only with one or more other vending machines 100. In such an embodiment, any functions described as performed by the controller 205 or data described as stored on the controller 205 may instead be performed by or stored on one or more vending machines 100.

It should be noted that, in the embodiment of FIG. 2, some of the functionality described with reference to FIG. 1 as being performed by vending machine 100 may instead or in addition be performed by controller 205. For example, controller 205 may determine a promotion type to be used as the basis for construction of a promotion instance and/or may construct a promotion instance. Similarly, any data described with reference to FIG. 1 as being stored in a memory of vending machine 100 may, in the embodiment of FIG. 2, be instead or in addition stored in a memory of controller 205. For example, data associated with past transactions completed at a vending machine 100 may be stored in a memory of controller 205.

It should further be noted that controller 205 may comprise one or more computing devices (e.g., working in cooperation with one another) that may or may not be located remotely to one another or remotely to one or more of the vending machines 100.

Figure 2B:
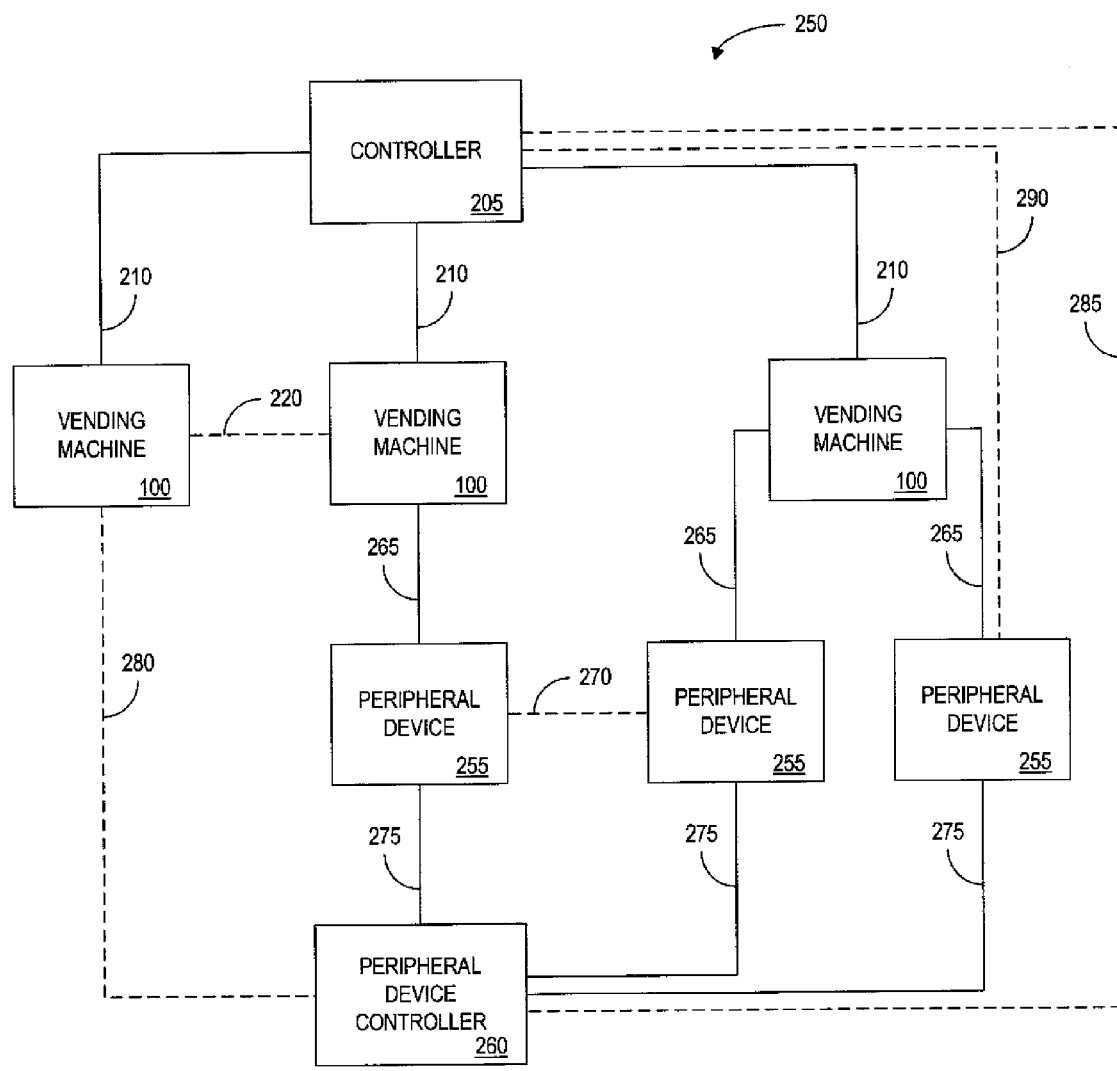
FIG. 2B is a block diagram of an embodiment of another system consistent with some embodiments of the present invention.

Referring now to FIG. 2B, a block diagram of another system 250 according to at least one embodiment of the present invention includes a controller 205 that is in communication, via a communications network 210, with one or more vending machines 100. A difference between system 200 (FIG. 2A) and system 250 (FIG. 2B) is that in system 250 at least one vending machine 100 is also in communication with one or more peripheral devices 255 (defined above). A peripheral device 255 may, in turn, be in communication with a peripheral device controller 260 (via communication network 275). In some embodiments, a peripheral device 255 may also or instead be in communication with controller 205 (via communication network 290), one or more vending machines 100 (via communication network 265) and/or one or more user devices (not shown). In one or more embodiments the peripheral device controller 260 may be in communication with one or more vending machines 100 (via communication network 280) and/or controller 205 (via communication network 285).

Any of the controller 205, the vending machines 100, the peripheral devices 255 and/or the peripheral device server 260 may communicate with one another directly or indirectly, via a wired or wireless medium such as the Internet, LAN, WAN or Ethernet, Token Ring, or via any appropriate communications means or combination of communications means. For example, the controller 205 may communicate directly with one of the vending machines 100 (e.g., via a LAN) and indirectly (e.g., via a vending machines 100) with a peripheral device 255. In another example, the controller 205 may communicate with one of the vending machines 100 via a LAN and with another of the vending machines 100 via the Internet.

Any and all of the controller 205, the vending machines 100, the peripheral devices 255 and the peripheral device controller 260 may comprise computers, such as those based on the Intel® Pentium® processor. Further, in one or more embodiments, each of the peripheral devices 255 may comprise an external or internal module associated with one or more of the vending machines 100 that is capable of communicating with one or more of the vending machines 100 and of directing the one or more vending machines 100 to perform one or more functions.

Any number of vending machines 100 may be in communication with the controller 205. Any number and type of peripheral devices 255 may be in communication with a vending machine 100, peripheral device controller 260 and controller 205.

Communication between any of the controller 205, the vending machines 100, the peripheral devices 255 and the peripheral device contoller 260, among the vending machines 100 and among the peripheral devices 255 may be direct or indirect, such as over the Internet through a Web site maintained by controller 205 on a remote server or over an on-line data network including commercial on-line service providers, bulletin board systems and the like. In yet other embodiments, any and all of controller 205, the vending machines 100, the peripheral devices 255 and the peripheral device controller 260 may communicate with one another over RF, cable TV, satellite links and the like.

Some, but not all, possible communication networks that may comprise any or all of the network 210, 220, 265, 270, 275, 280, 285 and 290, or that otherwise may be part of system 250 include: a local area network (LAN), a wide area network (WAN), the Internet, a telephone line, a cable line, a radio channel, an optical communications line, a satellite communications link. Possible communications protocols that may be part of system 250 include: Ethernet (or IEEE 802.3), SAP, ATP, Bluetooth™, and TCP/IP. Communication may be encrypted to ensure privacy and prevent fraud in any of a variety of ways well known in the art.

Figure 2C:
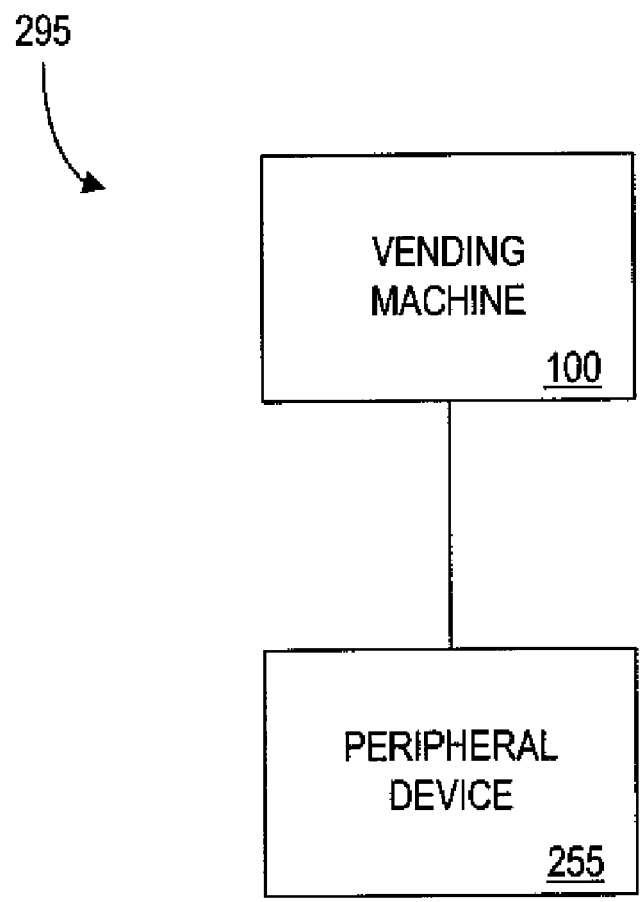
FIG. 2C is a block diagram of an embodiment of yet another system consistent with some embodiments of the present invention.

In an embodiment, the controller 205 may not be necessary and/or preferred. For example, the present invention may, in one or more embodiments, be practiced on a stand-alone vending machine 100, one or more vending machines 100 in communication with one or more peripheral devices 255 (as illustrated in FIG. 2C), one or more vending machines 100 in communication with peripheral device controller 260, one or more peripheral devices 255 in communication with peripheral device controller 260, and/or a vending machine 100 in communication only with one or more other vending machines 100. In such embodiments, any functions described as performed by a particular device (e.g., by a vending machine 100) or data described as stored in a memory of a particular device (e.g., in a memory of a vending machine 100) may instead or in addition be performed by or stored in another of the devices described herein (e.g., a peripheral device 255).

Similarly, peripheral device controller 260 may not be desired and/or needed in some embodiments of the present invention. In embodiments that do not involve peripheral device controller 260, any or all of the functions described herein as being performed by peripheral device controller 260 may instead be performed by controller 205, one or more vending machines 100, one or more peripheral devices 255, or a combination thereof. Similarly, in embodiments that do not involve peripheral device controller 260 any data described herein as being stored in a memory of peripheral device controller 260 may instead be stored in a memory of controller 205, one or more vending machines 100, one or more peripheral devices 255, or a combination thereof.

Any or all of the vending machines 100 may, respectively, include or be in communication with a peripheral device 255. A peripheral device 255 may be a device that obtains (e.g., receives or reads) information from (and/or transmits information to) one or more vending machines 100. For example, a peripheral device 255 may be operable to obtain information about transactions being conducted at a vending machine 100, such as the initiation of a transaction, an amount of money deposited for a transaction and/or a product selected during a transaction. For example, a peripheral device 255 may monitor activities carried out by a processor of a vending machine 100.

In one or more embodiments, one or more such peripheral devices 255 may be in communication with a peripheral device controller 260. This allows the peripheral device controller 260 to receive information regarding a plurality of transactions conducted at a plurality of vending machines 100. The peripheral device controller 260, in turn, may be in communication with the controller 205. It should be understood that any functions described herein as performed by a peripheral device 255 may also or instead be performed by the peripheral device controller 260. Similarly, any data described herein as being stored on or accessed by a peripheral device 255 may also or instead be stored on or accessed by the peripheral device controller 260.

A peripheral device 255 may be operable to access one or more databases (e.g., of peripheral device controller 260 or of the peripheral device 255 or a combination thereof) to determine a promotion type based on, for example, an one or more transactions initiated and/or completed at a vending machine 100. A peripheral device 255 may also be operable to access one or more databases (e.g., a product inventory database and/or a transaction history database, each of which is described in detail below) to construct a promotion instance.

The peripheral device controller 260 may also monitor promotions output to customers of vending machines 100 over time to determine acceptance rates for various promotions. For example, in embodiments wherein a customer is presented with a promotion at a vending machine 100 and responds thereto by providing an acceptance or rejection of the promotion via an input device of the vending machine 100 or an input device of a peripheral device 255, the peripheral device controller 260 may track which promotions are accepted by customers and subsequently use that information to present other promotions to a customer and/or to construct promotion instances. Further, information about a transaction obtained or accessed by peripheral device controller 260 may be analyzed, e.g., to identify the circumstances under which a promotion type is most likely to be accepted by a customer. Based upon desired objectives, the peripheral device controller 260 may direct the appropriate peripheral device 255 to output customized promotions to a customer of a vending machine based on the circumstances of a transaction initiated by the customer.

Information received by a peripheral device 255 from a vending machine 100 may include inventory data such as an actual rate at which a particular product is selling, a number of transactions per unit of time, a coin inventory, a product inventory and/or a selection of a product by a customer currently conducting a transaction at the vending machine.

An example of a peripheral device that may comprise a peripheral device 255 is the e-Port™ by USA Technologies Inc. The e-Port™ is a credit and smart card-accepting unit that controls access to office and MDB vending equipment, and serves as a point of purchase credit card transaction device. The e-Port™ includes an LCD) that allows for the display of color graphics, and a touch sensitive input device (touch screen) that allows users to input data to the device. The display may be used to prompt users interactively with, e.g., promotions and information about their transaction status.

A peripheral device 255 may be operable to receive input from customers, receive payment from customers, exchange information with a remotely located server (e.g., controller 205 and/or peripheral device controller 260) and/or display messages to customers (e.g., promotion content). A peripheral device 255 may be operable to instruct a vending machine 100 that appropriate payment has been received (e.g., via a credit card read by the separate device) and/or that a particular product should be dispensed by the vending machine. Further, a peripheral device 255 may be operable to instruct the vending machine to execute promotions or price changes.

The functions described herein as being performed by a peripheral device controller 260 and/or a peripheral device 255 may, in one or more embodiments, be performed by the controller 205 (in lieu of or in conjunction with being performed by a peripheral device controller 260 and/or a peripheral device 255). Such functions may be performed by controller 205 in either system 200 (FIG. 2A) or system 250 (FIG. 2B).

In one or more embodiments, a peripheral device 255 may be useful for implementing the embodiments of the present invention into the operation of a conventional vending machine. For example, in order to avoid or minimize the necessity of modifying or replacing a program already stored in a memory of a conventional vending machine, an external or internal module that comprises a peripheral device 255 may be inserted in or associated with the vending machine. For example, a conventional vending machine may be retrofitted with a peripheral device 255 in order to implement one or more embodiments of the present invention.

A peripheral device 255 may include (i) a communications port (e.g., for communicating with one or more vending machines 100, peripheral device controller 260, another peripheral device 255, and/or controller 205); (ii) a display (e.g., for graphics and/or text associated with a promotion), (iii) another output means (e.g., a speaker and/or light to communicate with a customer), and/or (iv) a benefit providing means (e.g., a printer and paper dispensing means).

In one or more embodiments, the peripheral device 255 may direct a vending machine to perform certain functions. For example, a program stored in a memory of peripheral device 255 may cause a processor of a vending machine 100 to perform certain functions. For example, a program stored in a memory of peripheral device 255 may cause a processor of a vending machine to dispense one or more products, dispense a monetary amount, refrain from dispensing a monetary amount, refrain from outputting a product, and/or communicate with another device.

Note that, in one or more embodiments, a vending machine 100 and a peripheral device 255 that is associated with the vending machine 100 may not communicate with one another at all. In some embodiments, however, each may communicate with a computer or other device. For example, a vending machine 100 may communicate with controller 205 and an associated peripheral device 255 may communicate with peripheral device controller 260 and/or controller 205. For example, if both vending machine 100 and peripheral device 255 are in communication with controller 205, each may obtain information associated with the other through controller 205.

It should be noted that in either the system 200 (FIG. 2A) or the system 250 (FIG. 2B), the controller 205 and/or the peripheral device controller 260 may be accessible, directly or indirectly, via another computer (communicating, e.g., over the Internet or other network) by a customer or another entity. Accordingly, a customer or other entity (e.g., an owner of the vending machine) of the other computer could communicate with the controller 265 and or peripheral device controller 260 via a Web browser. The other computer could, e.g., receive from the controller 205 and/or peripheral device controller 260 messages (e.g., promotions) described herein as being output by the vending machine or peripheral device, and/or transmit to the controller 205 and/or peripheral device controller 260 input described herein as being provided to the vending machine. Similarly, various data described herein as received through an input device of a vending machine 100 and/or peripheral device 255 may be received through a Web browser communicating with the controller 205 and/or peripheral device controller 260, which in turn communicates with the vending machine 100. Thus, an owner/operator of the vending machine may have remote polling and reporting capabilities, may be able to transmit new business rules to the vending machine 100, and the like.

Referring now to FIG. 2C, a block diagram of another system 295 according to at least one embodiment of the present invention includes a vending machine 100 that is in communication with a peripheral device 255. As described above, a prior art vending machine 100 may be retrofitted with a peripheral device 255. The peripheral device 255 may be operable to perform at least some of the methods of the present invention and/or to direct the vending machine 100 to perform at least some of the methods of the present invention, without requiring a controller 205 and/or a peripheral device controller 260. In one or more embodiments, the vending machine 100 and/or the peripheral device 255 may be accessible from a remote location via a communication port.

Figure 3:
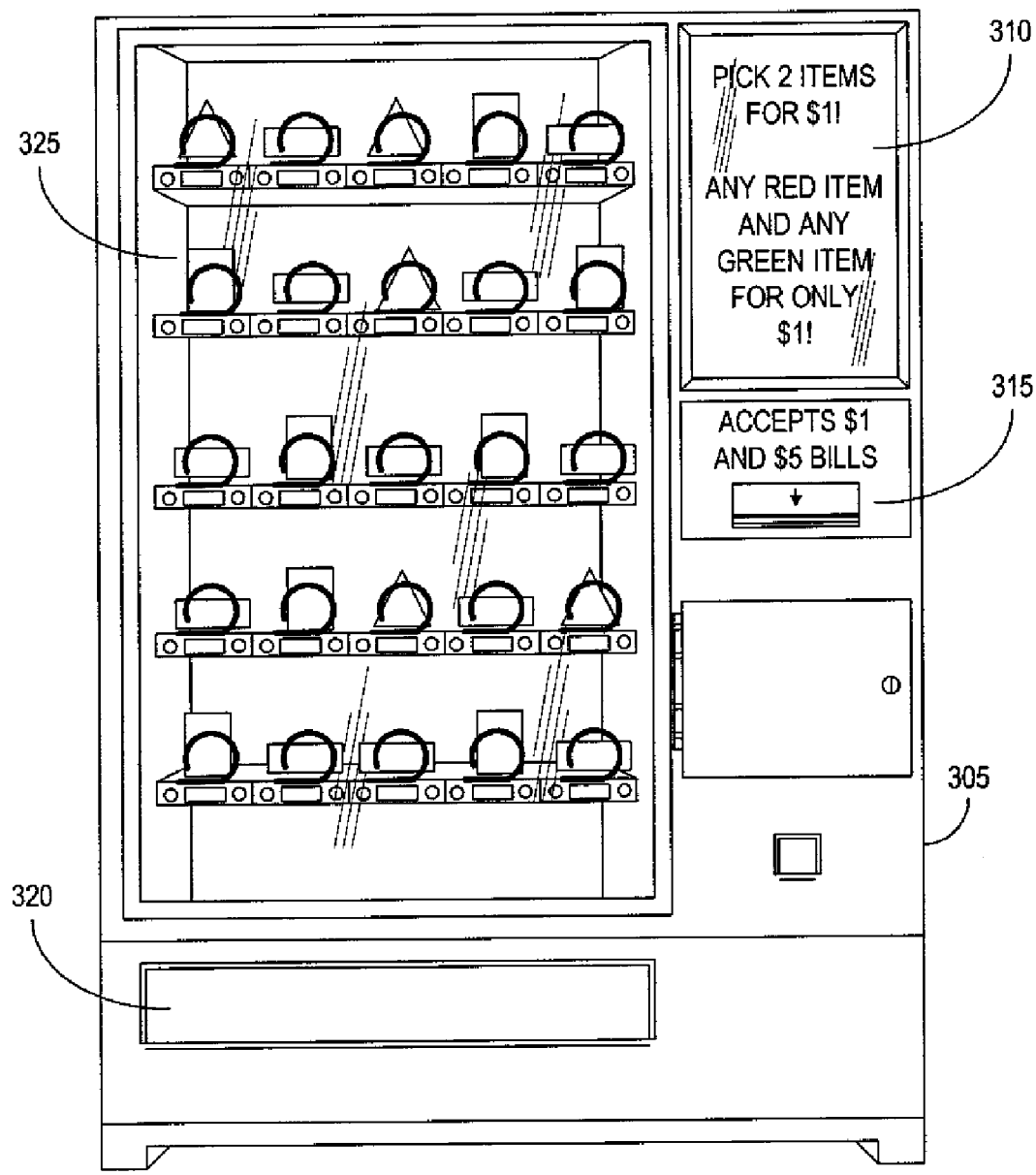
FIG. 3 is a diagram illustrating an example of the external appearance of a vending machine consistent with some embodiments of the present invention.

Referring now to FIG. 3, a diagram of an embodiment 300 of the external appearance of an exemplary vending machine 106 is illustrated. The embodiment 300 includes (i) a cabinet 305, (ii) an output device 310 for outputting text and/or graphical information about promotions to a customer, (iii) a payment processing mechanism 315, (iv) an inventory dispensing mechanism 320, and (iv) a product display window 325 behind which are visible the products available for sale from the vending machine and the product storage mechanism that holds the products within the vending machine.

Cabinet 305 may be constructed from, for example, any combination of (1) commercial grade (i.e., sixteen-gauge) steel (e.g., for exterior panels and internal shelving), (2) transparent materials such as glass or Plexiglas (e.g., for product display window 325), (3) rubber (e.g., for waterproofing insulation), (4) plastic, (5) aluminum, and/or (6) any suitable material.

Many commercially available machine cabinets can be modified to work in accordance with the present invention. For example, in snack machine embodiments, a suitable machine casing may comprise the 129 SnackShop™ manufactured by Automatic Products International, Ltd.™ of Saint Paul, Minn., which stands at 72"/1829 mm wide, has a width of 38⅞"/988 mm, and a depth of 35"/889 mm. Other suitable snack machine casings include the A La Carte™ machine from Automatic Products™, and the GPL Snack-Vendor™ model # 159 from Crane Merchandising Systems/Crane Co.™ of Stamford, Conn.

In beverage machine embodiments, machine cabinets commercially available from Dixie Narco™, Inc. of Williston, S.C. may be employed.

Beverage machine cabinets may comprise a "cooler" or "glass front" style front panel, featuring a transparent front panel (e.g. glass) enabling customers to see inventory for sale. Alternatively, beverage machine casings may comprise a "bubble front" or "stack front"style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co.™. Further details concerning the suitability of machine casing/cabinetry are well known in the art, and need not be described in further detail herein.

It should be noted that payment processing mechanism 315 may comprise any or all of the components described with reference to payment processing mechanism 150 (FIG. 1). Similarly, product dispensing mechanism 320 may comprise any or all of the components suitable for dispensing products described above with reference to inventory storage and dispensing mechanism 170 (FIG. 1).

C. Software Architecture

In one embodiment, a control system executes instructions for managing the operation of the vending machine, and in particular in accordance with the inventive functionality described herein. Such vending machine functions include, but are not limited to: (1) product pricing (e.g., displaying prices via an LED, changing such prices where appropriate, etc.), (2) processing vending transactions by (i) receiving customer selections via an input device, (ii) processing payment via a payment processing mechanism, and (iii) actuating corresponding product dispensing mechanisms, (3) selecting promotions or promotion types and constructing promotion instances, (4) outputting promotions to customers via output devices (including display of graphics/content on LCD and LED displays), and (5) recording transaction information (inventory levels, acceptance rates for promotions, etc.).

In some embodiments, machine components (e.g., machine hardware, including mechanical hardware such as input devices, output devices, product dispensing mechanisms, and payment processing mechanisms including coin acceptors, bill validators, card readers, change dispensers, etc.) may be controlled by the control system through a standard RS-232 serial interface. In such embodiments, embedded API/devices may be used to enable software to actuate/control vending machine components via RS-232 connectivity. Such vending machine components may be operatively connected to the control system directly or indirectly, in any manner that is practicable. Alternatively, machine components may communicate with the control system through a Universal Serial Bus "USB" standard (e.g., USB ports may allow "plug-and-play" installation of machine components).

Figure 4:
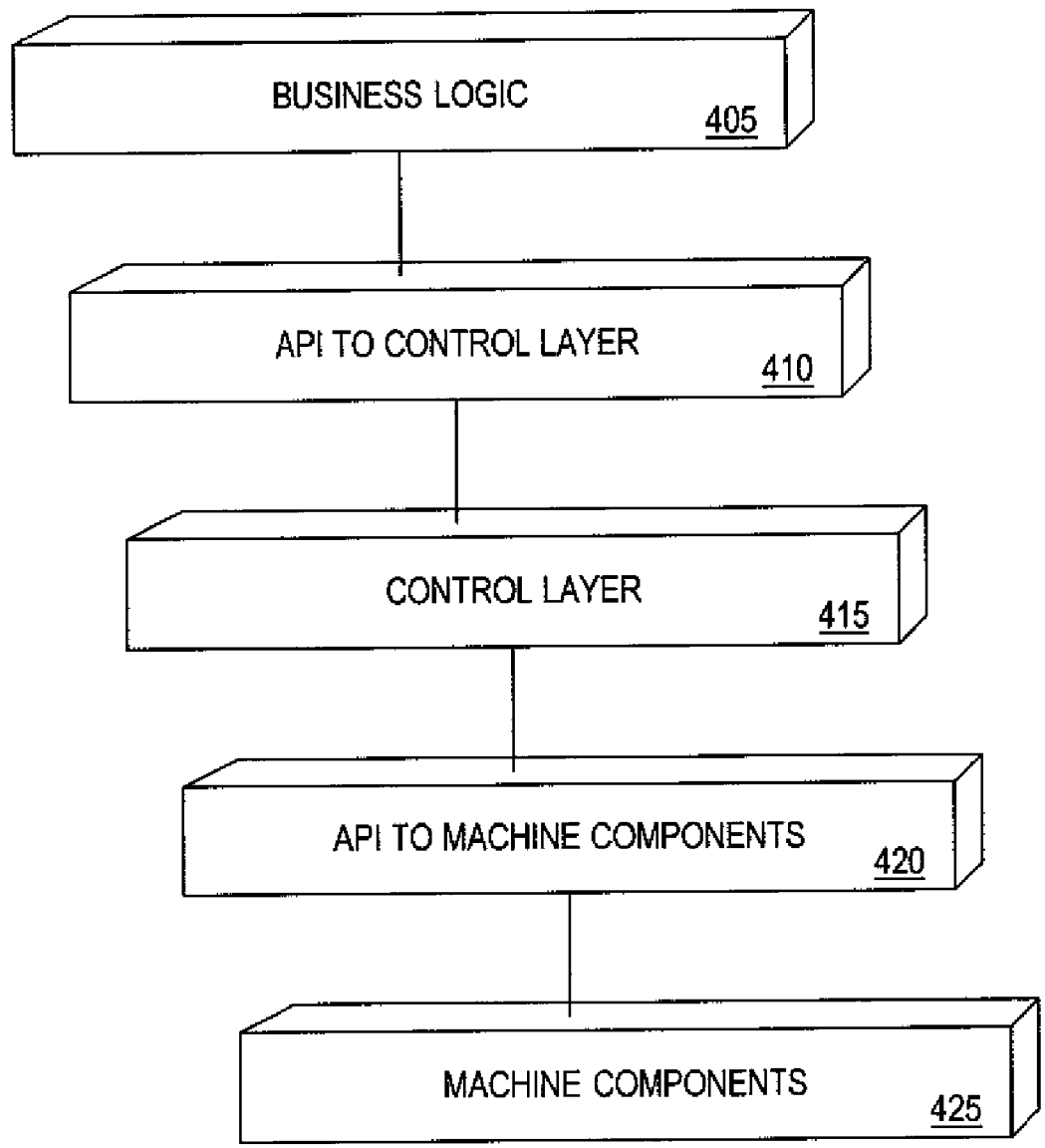
FIG. 4 is a diagram illustrating a portion of software that may be used in some embodiments of the present invention.

Referring now to FIG. 4, a diagram illustrates an embodiment 400 of an exemplary portion of control software that may be utilized to implement embodiments of the present invention. The embodiment 400 illustrates the control software as being divided into three abstract components. Such division may provide a clear partition of tasks, which may be desirable so that any future modification and new programming can be applied without disrupting other components. The three abstract components illustrated include a Business Logic software component 405, a Control Layer software component 415, and an exemplary Machine Components software component 425. As stated earlier, more machine components may be employed in addition to the exemplary one illustrated herein.

The software components are each connected to one another via a respective application program interface (API). As is known in the art, an API comprises a set of routines, protocols, and tools for building software applications. The Business Logic software component 405 is connected to Control Layer software component 415 via API 410. The Control Layer software component 415 is connected to Machine Component software component 425 via API 420.

The Business Logic software component 405 visually represents the portion of the software that selects promotions or promotion types instances and/or constructs promotion instances, as discussed herein. Such a component may, for example, access a rules database and a product inventory database to perform such functions.

The Control Layer software component 415 visually represents the portion of the software which interfaces with at least one Machine Component software component 425, and thereby transmits commands to perform such functions as: (i) outputting promotion information via an output device (i.e., a machine component), (ii) dispensing products via a product dispensing mechanism (i.e., a machine component), and/or (iii) dispensing change due to a customer via a payment processing mechanism, which may include a change dispenser and a currency storage apparatus (i.e., several machine components).

The Machine Component software component 425 generally represents software of machine hardware, including mechanical hardware such as input devices, output devices, inventory dispensing mechanisms, and payment processing mechanisms including coin acceptors, bill validators, card readers, change dispensers, etc.

Figure 5A:
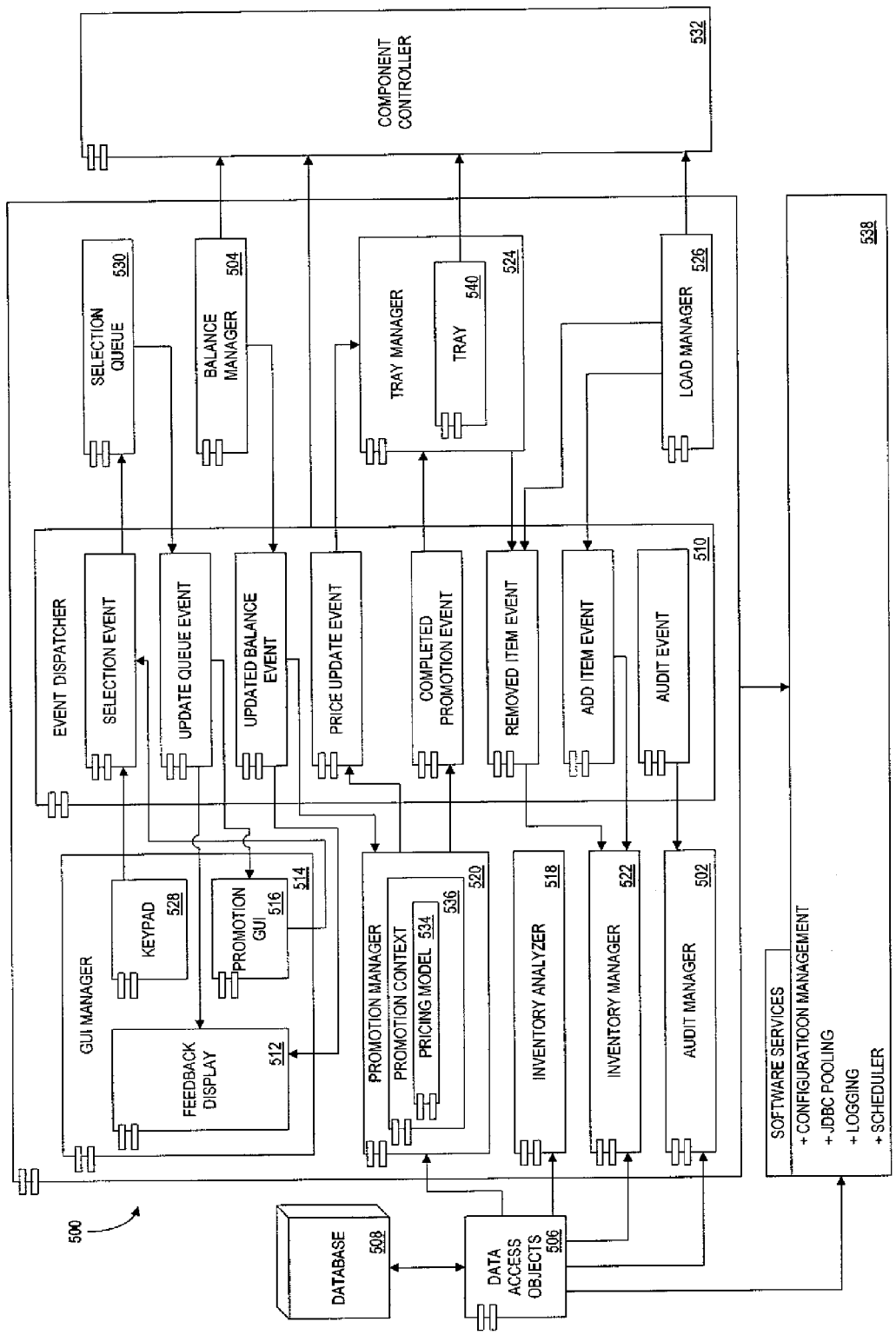
FIG. 5A is a schematic block diagram of software architecture that may be used in a vending machine, consistent with some embodiments of the present invention.

Referring now to FIG. 5A, illustrated therein is schematic block diagram of an embodiment 500 of exemplary software architecture, consistent with one or more embodiments of the present invention. It should be noted, however, that many architectural configurations are possible to carry out the inventive processes described herein. The architecture of embodiment 500 is a model of a software application for use in the present invention, designed using Unified Modeling Language™ (UML). The model comprises various software components 502 through 540 and illustrates how the various software components may interact with one another.

The audit manager 502 listens for audit events fired by other management components and acts on them by persisting meaningful state about the event to audit data structures. This function journals all significant events, transactions, and other meaningful system operations so that they can be used in subsequent analysis and reporting functions. The definition of "meaningful state" can potentially be specified through configuration management. The event/configuration driven approach provides flexibility if auditing/reporting requirements change.

The balance manager 504 represents the current monetary balance in the machine. It interacts with the component controller 532 (described below) and responds to money insertion by incrementing its balance value. It fires UpdatedBalance events whenever the balance changes. It listens for DrainBalance events and executes component controller 532 methods that return finds to the user.

The data access objects 506 is the layer of abstraction that is responsible for persisting domain objects such as inventory objects and audit data.

The database 508 is the persistence store (e.g. MySQL, file based, etc.). The database 508 may comprise any or all of the databases described with respect to FIG. 1.

The event dispatcher 510 acts as a proxy broker for events so that components do not need to explicitly listen to each other (i.e., have undue knowledge of each other by reference). Some examples of events that may be managed by this component include: SelectionEvent, UpdatedQueueEvent, UpdatedBalanceEvent, TrayLEDUpdateEvent, CompletedPromotionEvent, DispensedItemEvent, AuditEvent, and EnterOperatorModeEvent.

The feedback display 512 is a GUI manager (described below) sub-component and manages keypad feedback, instructions and error messages.

The GUI (Graphical User Interface) manager 514 is a container for all GUI components and defines their layout in reference to one another. The GUI manager 514 will also listen for events from the event dispatcher 510. Swing events may be handled by the individual GUI manager 514 sub-components (e.g., feedback display 512 and promotion GUI 516).

The inventory analyzer 518 performs derivation and aggregation computations on inventory state and audit data. The results of these computations are persisted for use by other components (e.g., the promotion manager 520). The computation functions can be initiated on demand or by a scheduler service when the system is dormant.

The inventory manager 522 maintains the current state of the machine's inventory. It listens for events that will ask it to update the inventory that was fired by components such as the tray manager 524 (described below) and the load manager 526 (described below).

The keypad 528 is a sub-component of the GUI manager 514 and represents the keypad data entry interface (rendered as Swing graphical objects on a touch screen LCD). It forces selection events to be fired that are relevant to the feedback display 512 and the selection queue 530 (described below).

The load manager 526 manages the inventory load processes. It may interact with a bar code scanner via the component controller 532 (described below), such as when an operator restocks the machine's inventory. The load manager 526 also fires inventory change events.

The component controller 532 manages (and masks the implementation of) vending machine components. Examples of vending machine components include: input devices, output devices, coin acceptors, bill validators, card readers, change dispensers, product dispensing mechanisms, and bar code readers.

The pricing model 534 is a sub-component of the promotion context 536 (described below). The pricing model 534 contains all the product pricing data needed to execute the promotion described by that context.

The promotion context 536 is a sub-component of the promotion manager 520 (described below). The promotion context 536 comprises all of the state and workflow rules required by the promotion manager 520 to execute a given promotion.

The promotion GUI 516 is a sub-component of the GUI manager 514 and represents promotion-related user interface rendering such as graphical selection menus, banners, animation, etc. The promotion GUI 516 fires events that can effect the selection queue 530 (described below) and also listens for events from the promotion manager 520 (described below).

The promotion manager 520 manages all of the promotion-related business rules in play in a vending machine. It can manage multiple promotion contexts simultaneously and executes all rules related to validation, execution, and workflow related to these promotion contexts. This component implements a promotion context factory object that encapsulates business rule logic related to promotion eligibility, selection, pricing and composition.

The selection queue 530 is a container for cumulative product selections made during the course of user interaction with a promotion.

The software services 538 provides miscellaneous application services, including: configuration management, connection pooling, diagnostic logging, and a scheduler.

The tray 540 is a sub-component of the tray manager and represents a product dispensing apparatus and its composite rows/slots in the vending machine. Its responsibilities include dispensing products and displaying LED data through the component controller 532.

The tray manager 524 is the container and manager of composite tray components. It is responsible for initiating and coordinating multiple-product dispense operations.

Figure 5B:
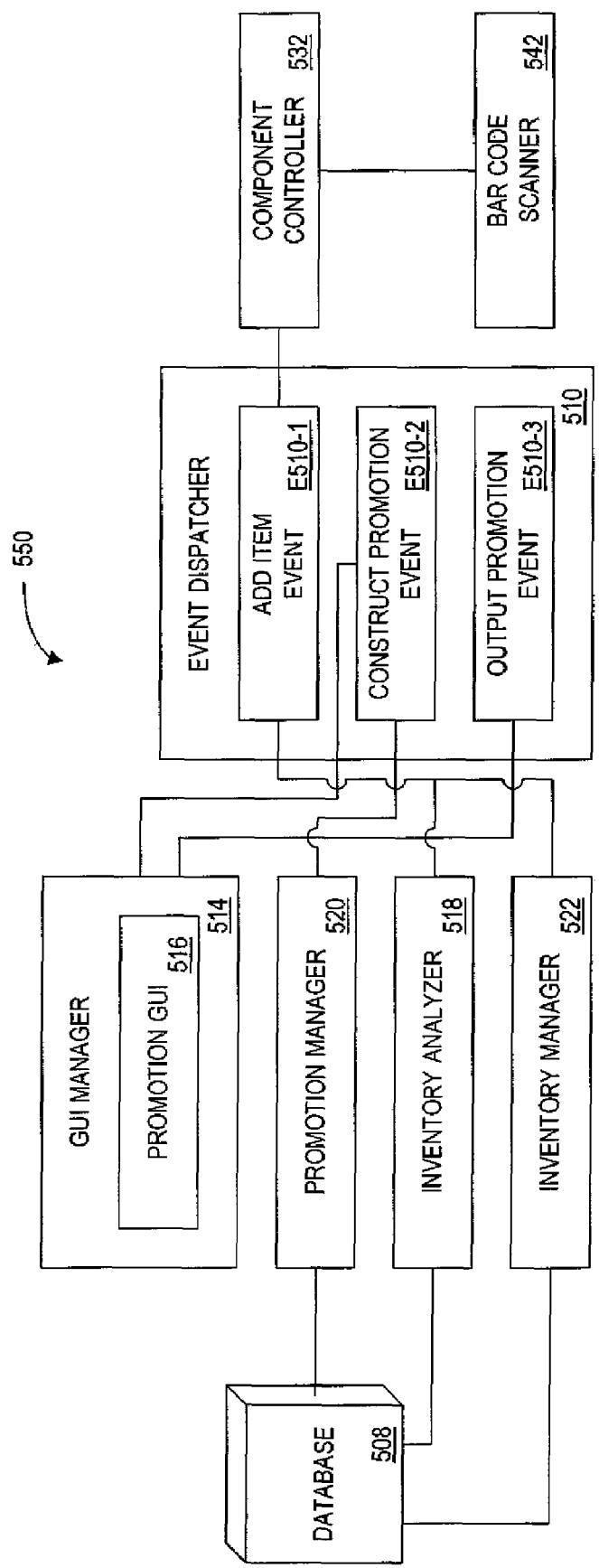
FIG. 5B is a schematic block diagram of software architecture that may be used in a vending machine, consistent with some embodiments of the present invention.

Referring now to FIG. 5B, illustrated therein is schematic block diagram of an embodiment 550 of exemplary software architecture, consistent with one or more embodiments of the present invention. The architecture of embodiment 550 is a model of a software application for use in the present invention, designed using Unified Modeling Language™ (UML). The model comprises various software components 508, 510, 514, 516, 518, 520, 522 and 532 and a hardware component 542. The software component 510 (the event dispatcher) includes three exemplary events E510-1, E510-2, and E510-3, some of the events that may be triggered by an addition of a product to a vending machine. The description of embodiment 550 explains, with reference to FIG. 5B, how an addition of a product may be processed by various components of the modeled software application.

As illustrated, the component controller 532 is in communication with a particular vending machine component, a bar code scanner 542. For example, when an operator of the vending machine adds a product to the inventory of the vending machine, the operator may scan a bar code of the product. The component controller 532 communicates the input of the bar code to the event dispatcher 510, which recognizes the input of the bar code as an AddItem Event E-510-1. As described above, the event dispatcher 510 acts as a proxy broker for events, alleviating the need for components to listen for events from other components. Thus, the event dispatcher may communicate the AddItem Event E-510-1 to the inventory manager 522, without the need for inventory manager 522 to listen for events from the component controller 532. The inventory manager, in turn, causes a record of the added item to be stored in the database 508 (e.g., via a data access object 506, which is not illustrated for purposes of simplicity).

The inventory analyzer 518, in turn, may analyze the current inventory (e.g., based on the addition of the product or based on another event, such as the occurrence of a predetermined time) and store an indication of a need for a promotion for one or more products based on the current state of the inventory. The indication may be stored in database 508. The promotion manager 520 may access the database 508 and determine the need for a promotion. The promotion manager 520 may then construct a promotion, based on the need. The event dispatcher 510 may determine the occurrence of a ConstructPromotion Event E-510-2 and communicate the occurrence of this event to the GUI manager 514. The GUI manager 514 may, in turn, cause the promotion to be displayed via the promotion GUI 516 sub-component. The event dispatcher 510 may detect the OutputPromotion Event E-510-3 and communicate the occurrence of this event to another component (e.g., promotion manager 520) and thus, indirectly, cause a record of the output of the promotion to be stored in the database 508.

D. Databases

Embodiments of the present invention may be implemented using one or more databases. As indicated above, it should be noted that although the example embodiment depicted in FIG. 1 includes six particular databases stored in data storage device 110 of a vending machine 100, other database arrangements may be used which would still be in keeping with the spirit and scope of the present invention. In other words, the present invention could be implemented using any number of different database files or data structures, as opposed to the six depicted in FIG. 1. Further, the individual database files could be stored on different servers (e.g. located on different; storage devices in different geographic locations, such as on a peripheral device 255, controller 205, peripheral device controller 260 or a combination thereof). Likewise, the program 115 could also be located remotely from the data storage device 110 and/or on another server. As indicated above, the program 115 may include instructions for retrieving, manipulating, and storing data in the databases 120, 125, 130, 135, 140 and 145, as may be useful in performing the methods of the invention as will be further described below.

1. Product Inventory Database

Turning to FIGS. 6A and 6B, illustrated therein is a tabular representation of an embodiment 600 of the product inventory database 120 (FIG. 1). The tabular representation 600 of the product inventory database includes a number of example records or entries, each of which defines a product available for sale from a vending machine. Those skilled in the art will understand that the product inventory database may include any number of entries. The tabular representation of product inventory database also defines fields for each of the entries or records. The fields specify: (i) a product identifier 605 that uniquely identifies the product; (ii) a product description 510 that describes the product; (iii) a product category 615 into which the product has been categorized; (iv) a row position 620 that identifies a particular row (and, optionally, a particular position within a particular row) of the vending machine in which the product is located; (v) a retail price 625 of the product; (vi) a minimum selling price 630 of the product; (vii) a cost 635 of the product; (viii) an actual (current) product velocity 640; (ix) a desired product velocity 645; and (x) a current number in stock 650 that indicates a number of the product currently available for sale.

The product inventory database may be accessed by various devices and/or for various purposes. For example, the processor of the vending machine 100 may access the product inventory database to determine whether a product is currently available for sale from the vending machine (e.g., whether the current number available is greater than zero). In another example, the processor of the vending machine 100 or a processor of a peripheral device 255 may access the product inventory database 600 to (i) determine whether a promotion should be output; (ii) identify a type of promotion to be output; and/or (iii) construct a promotion instance. The usage of the product inventory database of embodiment 600 to construct a promotion instance is described in more detail with respect to FIG. 13.

The product inventory database may be populated, for example, when an operator of the vending machine associated with the database adds products to the vending machine (e.g., the operator may enter a number of each product entered using a keypad of the vending machine or a bar code scanner in communication with the vending machine). The product inventory database may also be updated when a product is dispensed from the vending machine associated with the database.

It should be noted that, in some embodiments, the product inventory database may store information associated with more than one vending machine. This may occur, for example, if the product inventory database is stored in controller 205, peripheral device controller 260 and/or a peripheral device 255 that is associated with more than one vending machine 100. In such embodiments, the product inventory database may store a vending machine identifier in association with one or more records.

2. Coin Inventory Database

Turning to FIG. 7, illustrated therein is a tabular representation of an embodiment 700 of the coin inventory database 125 (FIG. 1). The tabular representation 700 of the coin inventory database includes a number of example records or entries, each of which defines a coin denomination available for dispensing from a vending machine. Those skilled in the art will understand that the coin inventory database may include any number of entries. The tabular representation of coin inventory database also defines fields for each of the entries or records. The fields specify: (i) a coin denomination 705; and (ii) a quantity 710 of coins of the coin denomination.

The coin inventory database may be accessed by various devices and/or for various purposes. For example, the processor of the vending machine 100 may access the coin inventory database to update a quantity of coins of a particular denomination after receiving an input of coins from a customer and after dispensing coins. In another example, the processor of the vending machine 100 or a processor of a peripheral device 255 may access the coin inventory database to determine (i) whether a promotion should be output; (ii) identify a type of promotion for output; and/or (iii) construct a promotion instance by populating a parameter of the promotion type with a value determined based on the data in the coin inventory database. An example usage of the coin inventory database is described in more detail with respect to FIG. 13.

The coin inventory database may be updated, for example, when an operator of the vending machine associated with the database adds coins to the hopper of the vending machine, when a customer inserts coins into the vending machine and when the vending machine dispenses coins as change for a transaction.

It should be noted that, in some embodiments, the coin inventory database may store information associated with more than one vending machine. This may occur, for example, if the coin inventory database is stored in controller 205, peripheral device controller 260 and/or a peripheral device 255 that is associated with more than one vending machine 100. In such embodiments, the coin inventory database may store a vending machine identifier in association with one or more records.

3. Transaction History Database

Figure 8A:
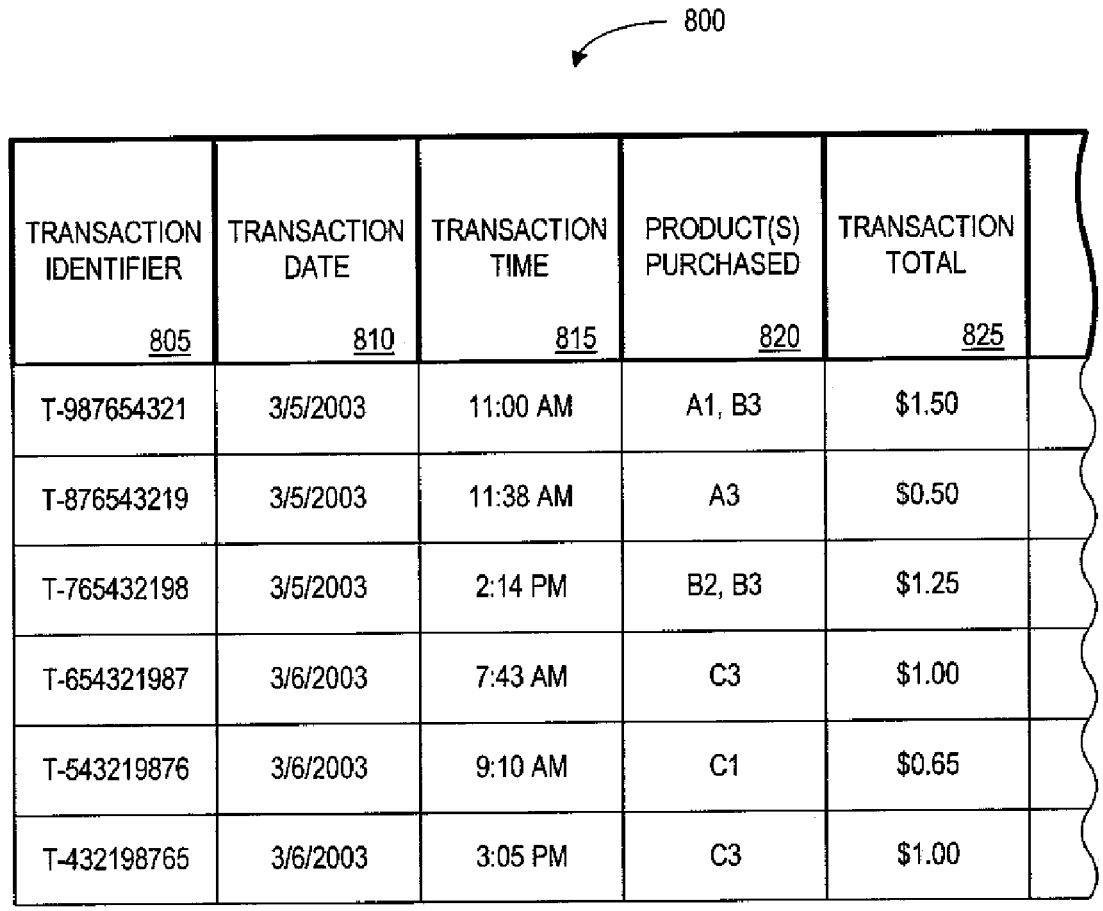

Turning to FIGS. 5A and 8B, illustrated therein is a tabular representation of an embodiment 800 of the transaction history database 130 (FIG. 1). The tabular representation 800 of the transaction history database includes a number of example records or entries, each of which defines a transaction that has occurred at a vending machine. Those skilled in the art will understand that the transaction history database may include any number of entries. The tabular representation of transaction history database also defines fields for each of the entries or records. The fields specify: (i) a transaction identifier 805 that uniquely identifies a transaction; (ii) a transaction date 810 that indicates the date on which the transaction occurred; (iii) the transaction time 815 that indicates the time at which the transaction occurred; (iv) a product(s) purchased 820 that stores an indication (e.g., product identifier and/or description) of products purchased during the transaction; (v) a transaction total 825 that indicates the purchase total for the transaction; (vi) an amount tendered 830 that indicates the amount of money input for the transaction by a customer; (vii) a change dispensed 835 that indicates an amount of change dispensed for the transaction; (viii) a promotion identifier 840 that uniquely identifies an instance of promotion and/or a promotion type output in association with the transaction; and (ix) a response 845 of a customer to the instance of the promotion and/or the promotion type.

The transaction history database may be accessed by various devices and/or for various purposes. For example, the processor of the vending machine 100 may access the transaction history database to store information about a transaction currently in progress or recently completed at the vending machine. In another example, the processor of the vending machine 100 or a processor of a peripheral device 255 may access the transaction history database to determine (i) whether a promotion should be output; (ii) identify a type of promotion for output; and/or (iii) construct a promotion instance by populating a parameter of the promotion type with a value determined based on the data in the transaction history database. An example usage of the transaction history database is described in more detail with respect to FIG. 13.

The transaction history database may be updated, for example, upon the initiation and/or completion of each transaction at the vending machine associated with the database.

It should be noted that, in some embodiments, the transaction history database may store information associated with more than one vending machine. This may occur, for example, if the transaction history database is stored in controller 205, peripheral device controller 260 and/or a peripheral device 255 that is associated with more than one vending machine 100. In such embodiments, the transaction history database may store a vending machine identifier in association with one or more records.

4. Promotion History Database

Figure 9:
FIG. 9 is a table illustrating an example data structure of an example offer history database for use in some embodiments of the present invention.

Turning to FIG. 9, illustrated therein is a tabular representation of an embodiment 900 of the promotion history database 135 (FIG. 1). The tabular representation 900 of the promotion history database includes a number of example records or entries, each of which defines a promotion, redeemable at a vending machine that had been output. Those skilled in the art will understand that the promotion history database may include any number of entries. The tabular representation of promotion history database also defines fields for each of the entries or records. The fields specify: (i) a promotion identifier 905 that uniquely identifies a promotion (e.g., a promotion type and/or a promotion instance (e.g., the first few digits of the identifier may identify the promotion type and the remaining digits may uniquely identify the promotion instance of the promotion type)); (ii) a promotion type 910 that indicates the type of the promotion (note that this field may be unnecessary if the promotion identifier already includes this information), such as a description of the promotion type; (iii) the promotion instance 915 that indicates the values included in the parameters of the promotion type; and (iv) an acceptance rate 920 of the promotion (e.g., the acceptance rate of the promotion instance or the acceptance rate of the promotion type).

The promotion history database may be accessed by various devices and/or for various purposes. For example, the processor of the vending machine 100 or controller 205 may access the promotion history database to store information about a promotion output and/or responded to at the vending machine (e.g., the acceptance rate may be updated). In another example, the processor of the vending machine 100 or a processor of a peripheral device 255 may access the promotion history database to determine (i) whether a promotion should be output; (ii) identify a type of promotion for output; and/or (iii) construct a promotion instance by populating a parameter of the promotion type with a value determined based on the data in the promotion history database. An example usage of the promotion history database is described in more detail with respect to FIG. 13.

The promotion history database may be updated, for example, upon the construction, acceptance and/or rejection of a promotion. In some embodiments, where the output of a promotion is tracked, the promotion history database may be updated upon the output of a promotion.

It should be noted that, in some embodiments, the promotion history database may store information associated with more than one vending machine. This may occur, for example, if the promotion history database is stored in controller 205, peripheral device controller 260 and/or a peripheral device 255 that is associated with more than one vending machine 100. In such embodiments, the promotion history database may store a vending machine identifier in association with one or more records.

5. Available Promotions Database

Turning to FIG. 10, illustrated therein is a tabular representation of an embodiment 1000 of the available promotions database 135 (FIG. 1). The tabular representation 1000 of the available promotions database includes a number of example records or entries, each of which defines a promotion that is available for output. Those skilled in the art will understand that the available promotions database may include any number of entries. The tabular representation of available promotions database also defines fields for each of the entries or records. The fields specify: (i) a promotion identifier 1005; (ii) a promotion description 1010; and (iii) condition(s) for output 1015 that describe the conditions under which the promotion may be output. In some embodiments, a rules database may store rules for selecting an available promotion for output. In such embodiments, the condition(s) for output 1015 may not be stored in the available promotions database.

The available promotions database may be accessed by various devices and/or for various purposes. For example, the processor of the vending machine 100 may access the available promotions database to select a promotion for output to a customer conducting a transaction at the vending machine. In another example, the processor of the vending machine 100 or a processor of a peripheral device 255 may access the available promotions database to add a promotion constructed by the processor. A usage of the available promotions database is described in more detail with respect to FIG. 16.

Promotions may be added or removed from the available promotions database by, for example, an operator of the vending machine associated with the database (e.g., the operator may access the available promotions database remotely and add or delete promotions as desired). Alternatively or additionally, a device (e.g., the vending machine 100, a peripheral device 255, controller 205, peripheral device controller 260, or a combination thereof) may add or remove available promotions (e.g., based on availability of products, coins, or success rates of promotions).

It should be noted that, in some embodiments, the available promotions database may store information associated with more than one vending machine. This may occur, for example, if the available promotions database is stored in controller 205, peripheral device controller 260 and/or a peripheral device 255 that is associated with more than one vending machine 100. In such embodiments, the available promotions database may store a vending machine identifier in association with one or more records (e.g., to indicate which promotions are available at which vending machine (s)).

6. Rules Database

A database of rules may be useful for various processes, in accordance with embodiments of the present invention. For example, rules may be used to select a promotion for output from a list of pre-constructed promotions. Such an embodiment was briefly described with reference to FIG. 10. In another example, a rules database may be used to determine which of a plurality of promotion types are eligible for output. In yet another example, a rules database may be used to select a promotion type from a plurality of eligible promotion types. Various types of promotions that may be available in accordance with embodiments of the present invention are described in detail below. In yet another example, rules may be used to construct an offer by providing guidance for the selection of a value to populate a parameter of a promotion type. Such an embodiment is described in more detail below with respect to FIG. 13. At least two embodiments of a rules database 145 are described below, with respect to FIG. 11 and FIG. 12. Other uses for one or more rules databases are described with reference to FIG. 13.

Turning to FIG. 11, illustrated therein is a tabular representation of an embodiment 1100 of the rules database 145 (FIG. 1). The tabular representation 1100 of the rules database includes a number of example records or entries, each of which defines a rule for determining an eligible promotion type, based on a state of coin inventory of a vending machine. Those skilled in the art will understand that the rules database may include any number of entries. The tabular representation 1100 of the rules database also defines fields for each of the entries or records. The fields specify: (i) a coin inventory state 1105 which describes a state of coin inventory of a vending machine; and (ii) one or more eligible promotion type(s) 1110 that may be output if the corresponding state of coin inventory is determined to have occurred.

As stated, stored rules which consider available, current data may dictate which promotion types are eligible to potentially serve as the basis for a promotion instance. For example, such rules may dictate that various coin inventory states (e.g., total hopper balance, customer credit balance) should instruct the processor of a vending machine 100 and/or the processor of a peripheral device 255 to identify corresponding promotion types as eligible promotions.

The rules database may be accessed by various devices and/or for various purposes. For example, the processor of the vending machine 100 or controller 205 may access the rules database to determine whether a current state of coin inventory satisfies any of the conditions described in the coin inventory state 1105, thereby determining whether there are any promotions eligible for output. For example, as illustrated in table 1100, customers who deposit exact change may be eligible for a combination promotion or a fixed price upsell promotion. As also illustrated in table 1100, customers who are due change after depositing a $1.00 or $5.00 bill and selecting one or more products may be offered a combination promotion, a fixed price upsell promotion, or a dynamically priced upsell promotion. Also, when the coins in the machine's hopper are less than that which is expected to be required in order to provide all customers with correct change during the sales period, the machine may construct and output dynamically priced upsell promotions. Such a promotion would be useful as a coin conservation tactic because customers would be offered additional products in lieu of their change due, which would function to preserve coin inventory in the hopper.

The rules database may store rules programmed by, for example, an operator of a vending machine associated with the database and/or another entity (e.g., a manufacturer of one or more products or an agent of the operator).

Turning now to FIG. 12, illustrated therein is a tabular representation of an embodiment 1200 of the rules database 145 (FIG. 1). The tabular representation 1200 of the rules database includes a number of example records or entries, each of which defines a condition which, if satisfied, dictate one or more promotions that are eligible for output. Unlike the embodiment of FIG. 11, in which the rules database stored conditions pertaining only to coin inventory state, the embodiment 1200 includes conditions pertaining to various states of a vending machine that may be considered in combination to determine a promotion type eligible for output. Those skilled in the art will understand that the rules database may include any number of entries.

The tabular representation 1200 of the rules database also defines fields for each of the entries or records. The fields specify: (i) a condition 1205 that must be satisfied in order for a corresponding promotion type to be eligible for output, and (ii) eligible promotion type(s) 1210 that indicate the one or more promotion types corresponding to the condition.

As described with reference to FIG. 11, the rules database of FIG. 12 may be accessed by various devices and/or for various purposes. As also noted with reference to FIG. 11, in some embodiments the rules database may store information associated with more than one vending machine and thus may store a vending machine identifier in association with one or more records.

E. Promotion Types

It should be noted that various promotion types have been referenced with respect to FIG. 11 and FIG. 12. Provided below is a description of each of the referenced promotion types, along with a rule set for constructing a promotion instance based on each promotion type.

It should further be noted that, in accordance with one or more embodiments, various data parameters may be available to a device (e.g., a vending machine 100, a peripheral device 255, a controller 205, a peripheral device controller 260 or a combination thereof) for use in determining eligibility of various promotion types as well as for use in other decisions described herein. The following table includes names and descriptions of many different data parameters that may be available for such decisions.

TABLE 1

Data Parameters

| Parameter Name | Description |
|---|---|
| MinSellingPriceAll | The lowest of the Minimum Selling Prices for items currently in stock |
| MinSellingPriceItem | The lowest price at which at which an operator wishes to sell a particular product |
| HowManyPromotionsHaveBeenPresented | The number of times that a promotion has been presented as a promotion to a customer in one transaction period |
| Planned Inventory (PI) | Average Velocity * Time Left in Fill Period (e.g. hours) |
| Current Inventory (CI) | The number of items remaining in the Vending Machine currently |
| Reserved Inventory (RI) | The number of products that are "committed" or reserved for future purchase through a future subscription/bulk promotion, as described herein. |
| CI to PI Indicator (Current Inventory to Planned Inventory Indicator) | (CI − (0.1 * RI) − PI)/CI<br>Example: If the average velocity of Doritos is .07 bags per hour and there are 168 hours left until next stock replenishment, the PI is 11.76. If the current inventory is 18 and reserved inventory is 5, the CI to PI indicator is then 31.89%.<br>Lower indicators tend to indicate that an item or items are selling at an acceptable pace. Conversely, higher indicators tend to indicate that items are selling at a slow pace, and promotions may be necessary to increase the pace, as described herein. |
| AmountChangeDue | The amount inserted minus the price of a selected item or items. |
| ProximityToGoal | This data point serves as a logical "barometer" that helps the System understand how close its operation is to the goal that was set forth by the Operator. For example, if the Operator instructs the System that the Goal is to have $300.00 Profit for this Fill Period, then this indicator will denote the System's performance and provide feedback as to how close it is to meeting the Goal.<br>The indicator may be expressed in terms of % reached. For example, if the current Profit is $200.00 and the Goal is $300.00, then the proximityToGoal is 66%. The Goal can also be expressed in more granular period increments. That is, the Goal of having $300.00 Profit per Fill Period can also be expressed as $21.42 Profit per Day (assuming 14 days in a Fill Period).<br>This indicator is constantly updated and evaluated by the system to determine which promotion is most suitable given the situation and other influences. |
| AvailableChange | The current inventory of coins available in the coin mechanism |
| OverridePromotion | This will indicate whether there is a promotion type that must be used as the basis for a promotion, regardless of the conditions. For example, an Operator may input commands to always offer Diet Coke ® as an upsell when a customer purchases Dasani ™ water. |
| TargetValueComboPrice | The price at which a particular combination promotion will be sold. For example, a combination promotion may be priced at $1.00 combo or $1.25. |

TABLE 1-continued

Data Parameters

| Parameter Name | Description |
| --- | --- |
| TargetValueComboCount | The number of items that the machine has made available for a given combination promotion. For example, two or three items can be included in a combination promotion. |
| MinBulkPrice | The lowest price at which a particular bulk or subscription can be sold. |
| MinSellingPriceCategory | This is the average minimum selling price for a specific category. |
| ItemCost | The cost of a particular item. |
| PromotionTakeRate | (Number of times a promotion has been presented/Number of time that promotion has been taken) This data parameter reflects the rate at which customers accept particular promotion promotions. |
| ExpectedPromotionProfit | Sum of (margin of all products in promotion instance) * promotionTakeRate |

Examples of types of promotions that may be implemented in embodiments of the present invention will now be described, along with an exemplary rule for determining when each respective promotion type should be selected for potential output.

1. Combination Promotion

In some embodiments, a combination promotion may be constructed and/or output. As stated, a combination promotion enables a customer to purchase at least two products for a single price.

(i) Fixed Combination Promotion

In some combination promotion embodiments, promotions may be "fixed" in the sense that the products in a package are pre-selected. In other words, in fixed combination promotion embodiments, customers do not have the ability to select which products will be included in the package. Fixed combination promotions may be desirable as they allow for the pairing of low velocity products with high velocity products, and can accordingly be used to increase overall inventory velocity (i.e., the baseline velocity demand for all products in inventory).

For example, a fixed combination promotion may be constructed when Items A and B are selling below their ideal product velocities, and Item C is selling at or above its ideal product velocity. In such a case, all three products may be offered as a package for a single price, reflecting a discount from that which could be realized if a customer purchased all three products individually. Thus, if the retail prices of Items A and B are $0.50 and $0.75, respectively, and the retail price of Item C is set at $0.75, the system may construct a combination promotion for the sale of all three products for $1.50, reflecting a $0.50 savings to the customer. Such a promotion may be output to customers through one or more output devices. For example, an LCD display located next to a keypad may read "get all three flashing items for $1.50—a 25% savings!", and shelf-mounted LED displays located adjacent to Items A, B and C may flash.

Fixed combination promotions are described at length in Applicant's U.S. Pat. No. 6,397,193, issued on May 28, 2003 as METHOD AND APPARATUS FOR AUTOMATICALLY VENDING A COMBINATION OF PRODUCTS; and Applicant's co-pending U.S. patent application Ser. No. 10/095,372, entitled METHOD AND APPARATUS FOR VENDING A COMBINATION OF PRODUCTS; the entirety of each is incorporated by reference herein for all purposes.

(ii) Open-Ended Combination Promotion

In one embodiment, some or all products selling at below their corresponding ideal product velocity may be offered for sale to customers at a single, discounted price. For example, the vending machine 100 and/or peripheral device 255 may identify Products W, X, Y and Z as selling below their corresponding ideal product velocities, and may output a promotion that provides customers with the ability to purchase any two of the four products for $1.00. More specifically, an LCD display may read "pick any 2 red flashing items for $1.00", and LED displays located proximately to the Products W, X, Y and Z may flash in red.

Once the actual product velocity of an included product increases to a favorable level (e.g. to the ideal product velocity), the control system may cease offering that product in open-ended combination promotions.

The following is an exemplary rule for determining when a combination promotion should be constructed. Such a rule may be stored, for example, in a rules database 145.

| | |
| --- | --- |
| If | proximityToGoal is <85% |
| And | MoneyInserted is null and selectionMade is null. |
| Or | minBulkPrice > moneyInserted >= targetValueComboCount |
| And | overridePromotion is null |
| And | The count of howManyPromotionsHaveBeenPresented <3 |
| And | Result from Value Combo query is >4 records |
| Then | Construct Value Combo Promotion |

2. Subscription (or "Bulk") Promotion

In some embodiments, a promotion for a subscription to one or more products offered at a vending machine may be constructed and/or output. Such subscriptions would enable customers to purchase at least two units of a product, and redeem the products at different points in time (e.g., one the first day, another the following day). Such subscription promotions typically would provide customers with the ability to purchase the products at a discount relative to the total of the retail prices of all the units. For example, a customer may be offered the opportunity to purchase a "subscription" to 6 cans of soda, redeemable one per day, for the price of 5 cans. Subscription promotions are a useful promotion type as they enable the system to increase baseline velocity demand for a given product in a predictable way. Thus, any discount provided by the promotion may be offset by the guaranteed increase in volume that results when the customer accepts the subscription promotion, and pays for the subscription.

In some embodiments, the system may construct and output a promotion for a subscription to one or more products offered at a vending machine in response to a customer's selection of a particular product.

In an example where a subscription promotion is constructed and/or output in response to a customer's selection of a particular product, a customer may request to purchase Product A for $0.75. In response, the vending machine may output a promotion to purchase a subscription to 6 units of Product A, redeemable once per day, for total of $3.00, or $0.50/unit. In order to realize the savings of $1.50, the customer may accept by depositing $3.00 into the vending machine (rather than merely $0.75) and transmitting a signal to the system via an input device to indicate his acceptance of the subscription promotion.

In some embodiments, customers who have already deposited the amount necessary for the purchase of a single unit may be offered a subscription for an amount equal to his or her change due. For example, if the customer deposits $5.00 and selects an item priced at $0.50/unit, the machine may offer 12 units redeemable over the span of several days in exchange for the $4.50 that otherwise would be returned to the customer. Alternatively, customers who have already deposited the amount necessary for the purchase of a single unit may be prompted to deposit additional currency in order to accept a subscription offer (i.e. a fixed-price upsell offer for a subscription).

Customers who accept subscription promotions may be issued, through a printer such as the one described herein, a printout containing subscription information (e.g. an account identifier). The printout may be used by the customer to redeem subscription products upon subsequent visits to the vending machine. For example, the customer may enter a code contained on the printout into the vending machine's keypad. The code may be, for example, assigned to the customer or selected by the customer (e.g., a customer may be allowed to select a personal identification number and/or password). The system would in turn determine whether or not the code is valid, and if so, activate a product dispenser corresponding to the subscribed-to product, and update an account record in a subscription database. Alternatively, customers who accept subscription promotions may be issued a read/write magnetic stripe card that is updated upon subsequent visits to reflect the redemption of subscription products.

Subscription promotions are described at length in Applicant's U.S. Pat. No. 6,298,972, entitled METHOD AND APPARATUS FOR ESTABLISHING AND MANAGING VENDING MACHINE SUBSCRIPTIONS, issued Oct. 9, 2001; U.S. Pat. No. 6,085,888, entitled METHOD AND APPARATUS FOR ESTABLISHING AND MANAGING VENDING MACHINE SUBSCRIPTIONS, issued Jul. 11, 2000; and U.S. Pat. No. 5,988,346, entitled METHOD AND APPARATUS FOR ESTABLISHING AND MANAGING VENDING MACHINE SUBSCRIPTIONS, issued Nov. 23, 1999; the entirety of each is incorporated by reference herein for all purposes.

The following is an exemplary rule for determining when subscription ("Bulk") promotion should be constructed. Such a rule may be stored, for example, in a rules database 145.

| | |
|---|---|
| If | proximityToGoal is <85% |
| And | moneyInserted is null and selectionMade is null. |
| Or | moneyInserted >= minBulkPrice |
| And | OverridePromotion is null |
| And | The count of howManyPromotionsHaveBeenPresented <3 |
| And | Result from Bulk query is >4 records |
| Then | Construct Bulk Purchase Promotion |

3. Dynamically Priced Upsell Promotion

In some embodiments, a dynamically priced upsell promotion may be constructed and/or output. As stated, a dynamically priced upsell promotion is a promotion to a customer of a first product for the purchase of an additional product for an additional amount that is equal to an amount of change due back to the customer as a result of the customer's purchase of the first product. For example, if a customer inserts a $1.00 bill into a vending machine and selects a product priced at $0.55, the vending machine may automatically prompt the customer to choose an additional product in exchange for their change due (i.e., $0.45 in the present example).

In some dynamically priced upsell embodiments, customers may be presented with a single product to accept or reject in exchange for their change due. In other dynamically priced upsell embodiments, customers may be presented with several products from which to select one or more products in exchange for their change due. In either case, the system may select one or more products to be included in an upsell offer by considering a variety of data points, including the actual product velocity of a product or products as compared to an ideal product velocity. Similarly, the current inventory to planned inventory ratio (as discussed herein) may be considered. Using such data, slow moving products can be promoted via dynamically priced upsell promotions. Further, the system may consider the expiration date of perishable products (e.g., as recorded in a product inventory database), so that soon-to-expire products may be offered via dynamically priced upsell promotions. Alternatively or additionally, the category of a product or products may be considered, so that complementary products may be included in dynamically priced upsell promotions (e.g., salty snacks can be offered as upsells to purchasers of soda). Further, the product or products that may be included in a dynamically priced upsell promotion may be selected by the system according to the rules included in a rules database 145.

A dynamically priced upsell promotion may then be output to the customer in several ways. In embodiments where the customer is provided with the opportunity to accept or reject the purchase of one, pre-selected product in exchange for the change due, the system may communicate the dynamically priced upsell promotion by outputting promotion content through one or more output devices, including touch screens and LED displays. In embodiments where the customer is provided with the opportunity to select from a plurality of products one or more product, the dynamically priced upsell promotion may similarly be communicated to the customer on one or more output devices, including touch screens and LED displays. For example, a message may be output to a customer via a touch screen display reading "pick any one of 3 flashing items for your change due", and shelf-mounted LED displays corresponding to the qualifying products may accordingly flash. Alternatively or additionally, prices of the qualifying products may be temporarily changed on corresponding LED displays to the amount of change due (i.e., changed to the amount of change due until the customer selects an upsell product, rejects the upsell promotion, or does not respond for a threshold period of time, after which the prices would revert back to the corresponding items' retail prices).

Further, in yet another alternate embodiment, promotion messages may be provided to the customer through a combination of static, physical means (e.g., on a printed or painted surface on the vending machine) and one or more electronic output devices (e.g., flashing LEDs located next to qualifying products).

In an alternate embodiment, a customer may be provided with the opportunity to receive a coupon or voucher in exchange for their change due. Such a coupon or voucher could be printed via the printer described herein. The coupon or voucher may allow the customer to redeem an item without depositing additional currency during a subsequent visit. Indeed, such a coupon or voucher may allow the customer to purchase a product at a discount during a subsequent visit to the vending machine. It should be noted that such coupons or vouchers may be redeemable only during a particular sales period, so that overall machine velocity may be increased during the particular sales period.

Various systems and methods for constructing, offering and processing dynamically priced upsell promotions are described in detail with reference to Applicant's U.S. Pat. No. 6,397,193 and Applicant's co-pending U.S. patent application Ser. No. 10/095,372. Additional systems and methods for constructing, offering and processing dynamically priced upsell promotions are described in detail with reference to Applicant's U.S. Pat. No. 6,119,099, entitled METHOD AND SYSTEM FOR PROCESSING SUPPLEMENTARY PRODUCT SALES AT A POINT-OF-SALE TERMINAL, issued Sep. 12, 2000; and Applicant's co-pending U.S. patent application Ser. No. 09/603,677 entitled METHOD AND APPARATUS FOR SELECTING A SUPPLEMENTAL PRODUCT TO OFFER FOR SALE DURING A TRANSACTION, filed Jun. 26, 2000; the entirety of each is incorporated by reference herein for all purposes.

The following is an example of a rule that may be utilized to determine when dynamically priced upsell promotion should be constructed. Such a rule may be stored, for example, in a rule database 145.

| | |
|---|---|
| If | Consumer selects a non-flashing item from Combo Promotion |
| Or | Consumer selects any item while the system was engaged in NO OTHER Promotion |
| And | proximityToGoal is <85% |
| And | Change Due from the first Transaction > minSellingPriceAll. Note: This infers that there was a first transaction (which can be defined as insertion of money and making a selection) to begin with. |
| And | OverridePromotion is null |
| And | The count of howManyPromotionsHaveBeenPresented <3 |
| And | Result from Roundup query is >4 records |
| Then | Construct Roundup Tactic |

4. Fixed Price Upsell Promotion

In some embodiments, a fixed price upsell promotion may be constructed and/or output. As stated, a fixed price upsell promotion is a promotion to a customer of a first product for the purchase of an additional product for an additional amount that is not necessarily correlated to an amount of change due to the customer as a result of the customer's purchase of a first product. Thus, a fixed price upsell promotion may provide a customer of a first product with the opportunity to purchase an additional product for an amount equal to his change due plus an additional amount. In some embodiments, the ability to purchase an additional product for an amount equal to change due from a first transaction plus an additional amount may still reflect a discount when compared to the additional product's retail price.

For example, a customer may insert $1.00 and select a soda priced at $0.75. The vending machine may, in turn, offer a fixed price upsell promotion for a complementary product (e.g., bag of potato chips) normally priced at $0.75 for $0.50, thereby requiring the customer to deposit an additional $0.25 to accept the fixed price upsell promotion and realize the $0.25 discount.

The additional product or products that may be included in a fixed price upsell promotion may be selected by the system according to the data parameters discussed with reference to dynamically priced upsell promotions, and/or according to rules that may be stored in a rules database.

As in the case of dynamically priced upsell promotions, fixed price upsell promotions may be communicated to customers via one or more output devices, including LCD and LED displays.

The following is an exemplary rule for determining when a fixed price upsell promotion should be constructed. Such a rule may be stored, for example, in a rule database 145.

| | |
|---|---|
| If | Consumer selects a non-flashing item from Combo Promotion |
| Or | Consumer selects any item while the system was engaged in NO OTHER Promotion |
| And | proximityToGoal is <85% |
| And | Change Due from the first Transaction < minSellingPriceAll Note: This infers that there was a first transaction (which can be defined as insertion of money and making a selection) to begin with. |
| And | OverridePromotion is null |
| And | The count of howManyPromotionsHaveBeenPresented <3 |
| And | Result from Upsell query is >4 records |
| Then | Construct Upsell Promotion |

5. Alternate Product Promotion

In some embodiments, an alternate product promotion may be constructed and/or output. That is, where a customer initiates a transaction to purchase a first product, the system may construct and output a promotion for an alternate product in lieu of the initially-requested product. The system may determine which product or products should be offered as substitutes by considering the actual product velocity of a product or products as compared to an ideal product velocity. Similarly, the current inventory to planned inventory ratio (as discussed herein) of a given product or product may be considered. Using such data, slow moving products can be promoted via alternate product offers.

Alternatively or additionally, the profit margins of one or more products may be considered by the system when determining alternate product offers so that higher margin products can be promoted via alternate product offers. Further, the system may consider the expiration date of perishable products (e.g., as may be recorded in a product inventory database), so that soon-to-expire products may be promoted via alternate product promotions. Alternatively or additionally, the category of a product or products may be considered, so that a product within the same category as the product initially requested by the customer is offered as an alternate product (e.g., Soda X, from the "carbonated drinks" category is offered as an alternate product to a customer who selected Soda Y).

Systems and methods for constructing, offering and processing alternate product promotions at vending machines are described in detail in Applicant's co-pending U.S. patent application Ser. No. 09/345,092 entitled VENDING MACHINE SYSTEM AND METHOD FOR ENCOURAGING THE PURCHASE OF PROFITABLE ITEMS, filed Jun. 30, 1999, the entirety of which is incorporated by reference herein for all purposes.

F. Processes

As stated, one benefit of embodiments of the present invention is an increase in vending machine profits (e.g., per fill period). Applicants have recognized that by selling products at a lower margin, but at a sufficiently offsetting velocity or volume, the overall profitability of a vending machine can be increased. Accordingly, in some embodiments, a vending machine may be associated with a target product velocity for a given fill period, and the control system will execute the inventive methods to determine which, if any, promotions are necessary in order to increase volume by an amount expected to yield increased profits by the end of the fill period.

Additionally, some embodiments of the present invention function to conserve coin inventory by executing one or more promotions, as described herein.

According to some embodiments, a general process designed to increase the profitability of a vending machine within a given fill period is stored in the memory of a vending machine and is executed by the control system (e.g., the processor, RAM, ROM, software, etc.). The control system may be the control system of a vending machine 100, the control system of a peripheral device 255, the control system of a controller 205, the control system of a peripheral controller 260, or a control system of a combination of any or all of these devices. Generally, from the control system's perspective, the general process may include the three basic steps of (i) determining whether a promotion should be output, based on information programmed to be pertinent to this determination; (ii) if a promotion should be presented, determining the one or more promotion types that are eligible for output, based on one or more eligibility rules; and (iii) determining, for the one or more eligible promotion types, one or more specific promotion instances that will result in an acceptable profit. The process may then further comprise outputting one or more of the determined promotion instances (e.g., the one promotion instance associated with the highest potential profit may be selected). More detailed processes are described below with reference to FIGS. 13-16.

Figure 13:
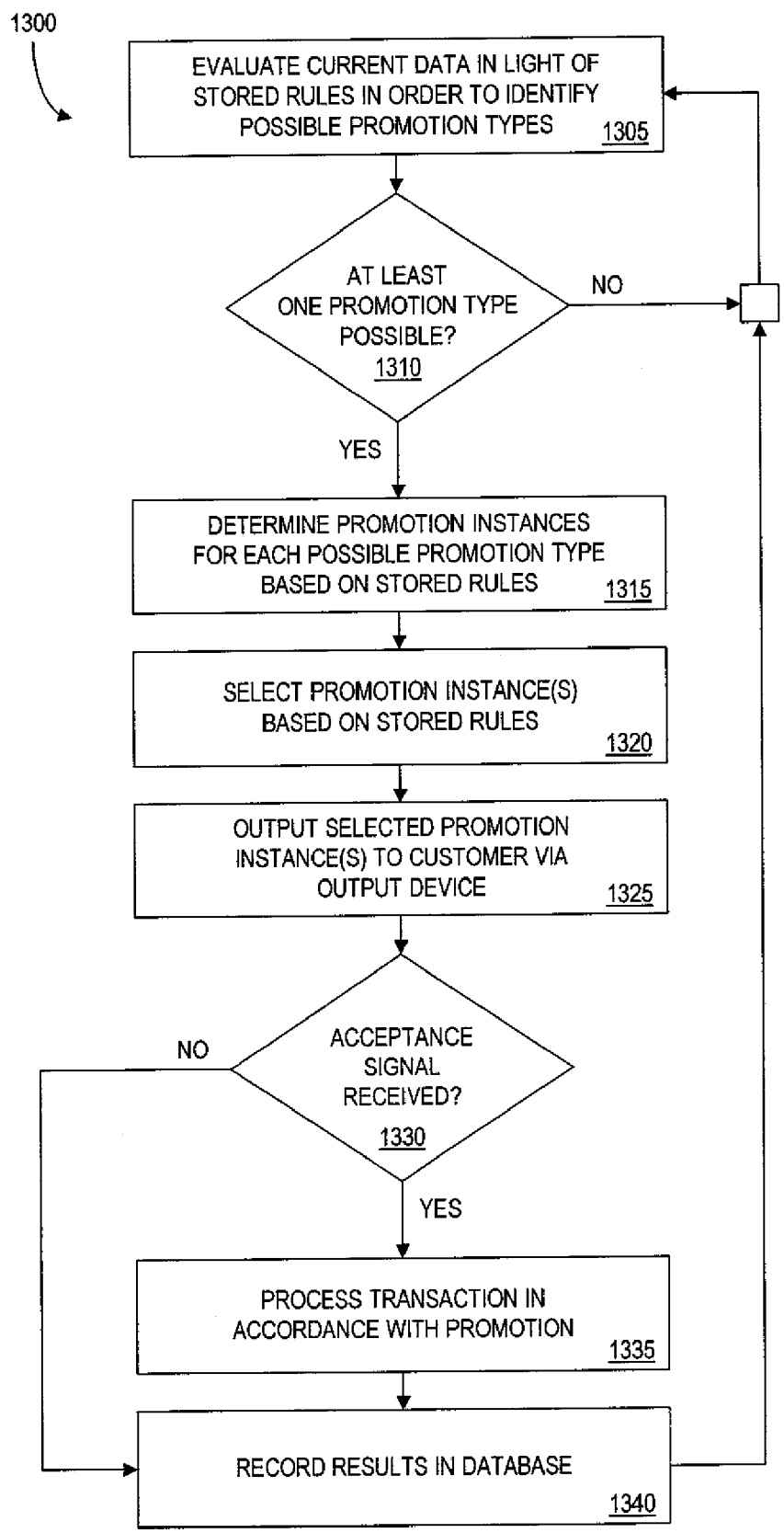
FIG. 13 is a flow diagram illustrating an exemplary process consistent with some embodiments of the present invention.

Referring now to FIG. 13, a flowchart illustrates a process 1300 that is consistent with one or more embodiments of the present invention. The process 1300 is a method for determining a promotion instance for output to a customer of a vending machine. The process 1300 (or portions thereof), and all other processes described herein unless expressly specified otherwise, may be performed, for example, by a vending machine 100, a peripheral device 255, a controller 205, a peripheral device controller 260, a user device, another computing device or a combination thereof. Each of these devices is described in detail above. Additionally, while some of the steps of a process may be performed by a first device, other steps may be performed by another device or a combination of devices. Further, the process 1300, and all other processes described herein unless expressly specified otherwise, may include steps in addition to those expressly depicted in the Figures or described in the specification without departing from the spirit and scope of the present invention. Similarly, the steps of process 1300 and any other process described herein, unless expressly specified otherwise, may be performed in an order other than depicted in the Figures or described in the specification, as appropriate.

The process 1300 begins at step 1305, in which the control system evaluates current data in light of stored rules to identify eligible promotion types. Step 1305 may be performed, for example, periodically, substantially continuously, or in response to a predetermined event. A predetermined event may comprise, for example, an occurrence of a predetermined time (e.g., a predetermined time from a previous performance of step 1305), an addition of a product to the vending machine, a dispensing of a product from the vending machine, an addition of coins to the vending machine (e.g., by a customer or by an operator), a dispensing of coins from the vending machine, an instruction from an operator, and/or an action of a customer (e.g., an initiation of a transaction, selection of a product and/or a request for a promotion).

According to one embodiment, the process 1300 may be initiated periodically, randomly, upon the occurrence of a predetermined event or substantially continuously in an effort to form "proactive" promotions (e.g., combination deals) that are offered to all customers, without regard to whether a first, triggering transaction has been initiated by a customer. Alternatively or additionally, the process 1300 may be initiated in response to a customer action in an effort to form a "reactive" promotion (e.g., a dynamically priced upsell offer) that is offered to a customer in response to the customer's purchase of a first product (i.e., a triggering transaction).

Many types of data accessible to the control system may be considered in making the determination of which, if any, promotion types are eligible to be used as the basis for a promotion. Such data includes, but is not limited to, data made available from (i) machine sensors (e.g., thermometers, etc.) or other peripherals (e.g., bill validators or coin acceptors for determining how much money has been deposited by a customer), and/or (ii) local and/or remote databases (e.g., storing product inventory information). For example, the control system may be able to access data indicative of: (1) the time left in a sales period (e.g., 72 hours and 45 minutes to next scheduled restock), (2) current or actual product velocity of one or more products (e.g., average sales of 4 units per day), and/or (3) product attributes, such as (a) the minimum selling price at which item can be sold, (b) the full price of a product, (c) the marginal cost of the item to the operator of the vending machine, (d) a category description of the product (e.g., salty snack, diet beverage, etc.), (e) the number of units of the product that are currently available (e.g., the in-stock inventory of the given product).

Thus, in an embodiment featuring a target product velocity (that is intended to increase profitability by increasing volume despite lower per item profit margins due to promotions), the control system may have access to the actual product velocity of some or all products in inventory. The control system may determine that based on the actual product velocity, the target product velocity for some or all products will not be reached based on current prices, promotions, and the like. Accordingly, the control system may at this point determine that one or more promotion types should be executed in an effort to reach the target product velocity.

In one embodiment, a basic calendar indicating holidays, school closings, and other periods during which sales may be relatively high or low may be accessible by the control system (e.g., in a database). Thus, the control system may adjust an ideal product velocity to account for such anticipated variations in demand during a sales period.

As stated, in one embodiment employing an ideal product velocity, the control system may determine promotion types, construct and select promotion instances, and output promotions based on the difference between the actual product velocity and the ideal product velocity of one or more products. For example, if an actual product velocity for all products is greater than or equal to an ideal product velocity for all products, then the control system may determine that a promotion is to be constructed and process 1300 may continue to step 1310. In the same example, if an actual product velocity for all products is less than an ideal product velocity for all products, the control system may determine that a promotion is not to be determined and the process 1300 may end or the step 1305 may be repeated in loop form until it is determined that a promotion is to be constructed.

At step 1310 it is determined whether at least one promotion type is eligible to serve as a basis for construction of a promotion instance. Such a determination may comprise, for example, accessing a rules database 145 (e.g., such as illustrated in FIG. 12) and determining whether eligibility conditions associated with one or more promotion types are satisfied by the current data. If it is determined, in step 1310, that no promotion types are eligible, the process 1300 may return to step 1305. If it is determined, in step 1310, that at least one promotion type is eligible, the process 1300 may continue to step 1315.

In step 1315 a promotion instance is determined (e.g., constructed or received from another device) for each eligible promotion type determined in step 1310. It should be noted that if, in step 1310, it is determined that more than one promotion type is eligible to serve as a basis for the construction of a promotion instance, each of the eligible promotion types may be utilized in step 1315 (the construction of the promotion instance). Alternatively, in one embodiment, a subset (e.g., one) of the eligible promotion types may be selected (e.g., based on one or more stored rules) and only the subset of promotion types may be utilized in step 1315.

In one embodiment, constructing a promotion instance comprises populating one or more parameters of a promotion type with a value. For example, a parameter of a promotion type may be a product selection. The control system may populate this parameter by selecting one or more products to be the subject of the promotion instance being created and populate this parameter with the product description of the one or more products selected. In another example, a parameter may comprise a price (e.g., a package price or a subscription price, depending on the promotion type serving as the basis for the promotion). In this example, the control system may populate this parameter by determining the price at which the product that is the subject of the promotion is to be offered and inserting this value into the price parameter.

The determination of a value to be inserted into a particular parameter of a promotion type may be performed based on one or more rules stored for such a purpose. In some embodiments, the determination of a value may be inherent in a previous step of process 1300. For example, assume that in step 1305 data is evaluated for each product being offered for sale at a vending machine and the result of the determination is that a particular product (e.g., product X) is selling below an ideal product velocity. Assume further that in step 1310 it is determine that a combination promotion is an eligible promotion type. Accordingly, it may be inherent that product X should be inserted into the product parameter the combination promotion type (e.g., along with a product selected by a customer). Similarly, if it is determined in step 1310 that a subscription promotion is an eligible promotion type, it may be inherent that product X should be the value inserted into the product parameter of the subscription offer type. In another example, the change due from a first transaction may be selected as the price to be inserted into a price parameter of a dynamically priced upsell promotion The promotion instances constructed in step 1315 may, in one or more embodiments, be stored in temporary memory pending further evaluation (e.g., pending calculation of the "expectedPromotionProfit" for each promotion instance and a comparison of the results of each calculation as described herein).

Following are exemplary rules that may be instituted in one or more embodiments for determining how to construct promotion instances for each eligible promotion type described herein.

Dynamically Priced Upsell promotion construction rule set:

| | |
|---|---|
| Query | Select (itemId, itemLocation, itemCategory) from productInventoryTable where amountChangeDue >= minSellingPriceItem and CI to PI Indicator >10.00% |
| Evaluate | Evaluate the list and rank<br>a) Ascending by (amountChangeDue − itemCost) − profit maximization<br>b) Then by the items that are in the same category as the first item that was selected<br>and select at most 6 from the top. |
| Construct | Provide the product list to the Application Control Service to display the proper promotion execution (e.g., appropriate promotion content) on LCD as well as to flash the LED's |

Fixed Price Upsell promotion construction rule set:

| | |
|---|---|
| Query | Select (itemId, itemLocation, minSellingPriceItem, itemCategory) from productInventoryTable where minSellingPriceItem is between 25%-55% of first selection's price and CI to PI Indicator >10.00% |
| Evaluate | Evaluate the list and rank<br>a) Ascending by (minSellingPriceItem − itemCost) − profit maximization<br>b) Then by the items that are in the same category as the first item that was selected<br>and select at most 6 from the top. |
| Construct | Provide the item list to the Application Control Service to display the proper promotion execution (e.g., appropriate promotion content) on LCD as well as to flash the LED's |

Combination Offer ("Value Combo") promotion construction rule set:

| | |
|---|---|
| Query | Select (itemId, itemLocation, itemCategory) from productInventoryTable where minSellingPriceItem <= ((1/ targetValueComboCount) * targetValueComboPrice) and CI to PI Indicator >10.00% |
| Evaluate | Evaluate the list and rank<br>a) Ascending by (targetValueComboPrice − itemCost) − profit maximization<br>b) Then by the items that are in the same category as the first item that was selected<br>and select at most 6 from the top. |
| Construct | As many combo packages as possible using the items from the result, targetValueComboCount and targetValueComboPrice. While constructing the combo packages, make sure the ($\Sigma$ item retail price <= $\Sigma$ targetValueComboPrice) Provide the item list to the Application Control Service to display the proper promotion execution (e.g., appropriate promotion content) on LCD as well as to flash the LED's |

Subscription ("Bulk") promotion construction rule set:

| | |
|---|---|
| Query | Select (itemId, itemLocation) from productInventoryTable where CI to PI Indicator >40.00% |
| Evaluate | Select (itemId) from the result For each item, calculate bulkPurchaseCount = (targetBulkPrice − desiredProfit)/ itemId.minSellingPriceItem. Round down to full number. |
| Construct | Bulk packages using the items from the result, targetValueComboCount and targetBulkPrice. While constructing the combo packages, make sure the ($\Sigma$ item retail price <= $\Sigma$ targetBulkPrice) Provide (itemId, itemId.bulkPurchasecount, itemId.targetBulkPrice) to the Application Control Service to display the proper promotion execution (e.g., appropriate offer content) on LCD. |

The above rules illustrate construction of a promotion instance to a particular product. In other embodiments, a subscription may be offered to a broad category of goods (e.g., 8 Candy bars for $5.00, without specifying the candy bar, 5 carbonated beverages, 5 beverages within a certain price category or of a certain size). The following rule illustrates how a promotion instance of a subscription to such a category of products may be constructed.

| | |
|---|---|
| Query | Select (itemId, itemLocation, itemCategory) from productInventoryTable where CI to PI Indicator >40.00% |
| Evaluate | Select (itemCategory) from the result For each category, calculate bulkPurchaseCount = (targetBulkPrice − desiredProfit)/ itemCategory.minSellingPriceCategory. Round down to full number. |
| Construct | Bulk packages using the items from the result, targetValueComboCount and targetBulkPrice. While constructing the combo packages, make sure the ($\Sigma$ item retail price <= $\Sigma$ targetBulkPrice) Provide (itemId, itemCategory.bulkPurchaseCount, itemCategory.targetBulkPrice) to the Application Control Service to display the proper promotion execution (e.g., appropriate promotion content) on LCD. |

Returning now to process 1300, at step 1320 the promotion instances constructed in step 1315 are evaluated in light of stored rules and at least one promotion instance is selected accordingly. In general, the stored rules that are considered in step 1320 may be used to determine which one or more promotion instances will be output to one or more customers of a vending machine.

In one embodiment, the stored rules provide for a determination of which promotion instance(s) yields the highest profit margin when considering the rate at which customers have historically accepted such promotion instances when offered. Thus, for each constructed promotion instance, the "expectedPromotionProfit" as defined above (i.e., the profit margin of the item in the promotion instance multiplied by the "take rate", or historic rate at which customers have accepted the promotion instance when previously offered) may be calculated.

Other methods may be employed for determining the projected profitability of several constructed promotion instances, and selecting one or more based on such a determination. For example, a method may be employed that scores the constructed promotion instances based on not only profit margin and "take rate", but also based on the vending machine's coin inventory state, the available inventory of an item or items, certain arbitrarily imposed "override" priorities or weights (e.g., certain products may be favored because of business relationships with product manufacturers, etc.), the difference between an ideal product velocity for a given item or group of items and the actual product velocity for the item or group of items, and the like.

Further, in some reactive promotion embodiments, the profitability of the initially requested product may be considered. Thus, in such embodiments, the profitability of the initially requested product may be calculated by multiplying the item's profit margin (retail price minus cost) by the "take rate" of 100%, as the customer has indeed selected the item. The profitability of the initially requested product may then be compared to the expected profitability of the other promotion instances, and the most profitable choice may be selected by the control system. Thus, it may be determined that the most profitable course of action is to let the customer proceed as initially requested, and not offer any promotions to the customer.

Further still, in reactive promotion embodiments featuring dynamically-priced upsell promotions and/or fixed price upsell promotions, the profitability calculation for a given dynamically-priced upsell promotion instance and/or fixed price upsell promotion instance can include not only the profit margin of the additional product offered, but also the profit margin of the first, triggering product that was initially requested by the customer. Thus, the profitability of a dynamically priced upsell promotion instance may be calculated as follows:

$$[(Rr-Cr)+(Change-Cu)]*Take\ Rate+(Rr-Cr)*(1-Take\ Rate)$$

Where:
  Rr=retail price of requested product
  Cr=cost of requested product
  Change=amount of change due to the customer, as determined by subtracting the retail price of the requested product from the amount of currency deposited in the machine
  Cu=cost of given upsell product
  Take rate=number of times that the promotion instance has been accepted divided by the number of times that the promotion instance has been offered In an alternate embodiment, rather than constructing and selecting promotion instances based on stored rules that consider profitability of the individual promotion instances, the control system may make a threshold profitability determination of the various, potentially eligible promotion types, and proceed to construct promotion instances only for those eligible promotion types that are expected to yield a certain profit. In this embodiment, the processing otherwise required for constructing and evaluating individual promotion instances may be reduced or avoided.

In one or more embodiments, a respective "income contribution factor" (also referred to as a "profit contribution factor") of one or more products may be considered in constructing a promotion instance. For example, a product may be selected to be the subject of a promotion instance to be output to a customer based on the product's income contribution factor. As used herein, an income contribution factor may be a measure of the revenue or profit realized from the sale of a particular product by a vending machine. In some embodiments, a product's income contribution factor may simply comprise the total amount of revenue or profit generated by the product in a certain time period (e.g., a fill period). In other embodiments, a product's income contribution factor may comprise a percentage, such as that which may be calculated by dividing the amount of profit generated by the product in a certain period of time by the total amount of profit generated by some or all products sold through the vending machine in the time period. For example, if a vending machine realized $100.00 in total profit during a fill period, and a certain product was responsible for generating $12.00 of the profit, the machine's income contribution factor would be 12%.

Returning now to process 1300, at step 1325 the one or more promotion instances selected in step 1320 are output to one or more customers of a vending machine via an output device. The output device may comprise an output device of, for example, a vending machine, a peripheral device associated with a vending machine, and/or a user device (e.g., a cellular telephone).

As described above, there are many means by which a promotion may be output at a vending machine. For example, a combination promotion may be output to the customer through a combination of LCD and LED displays. Thus, in the case of a fixed combination offer, an LCD display located next to a keypad may read "get all flashing items for $1.50—a 25% savings!", and shelf-mounted LED displays located adjacent to the eligible items may flash. Alternatively, in the case of an open-ended combination offer, an LCD display may read "pick any 2 red flashing items for $1.00", and LED displays located proximately to several products may flash in red.

Further, as stated, customers who accept subscription promotions may be issued, through a printer such as the one described herein, a printout containing subscription information (e.g., an account identifier such as a customer selected PIN). Alternatively, customers who accept subscription promotions may be provided with subscription information via other output devices, such as LED or LCD displays (e.g., subscription codes may be provided on such displays), audio speakers, or the like.

Additionally, dynamically priced upsell promotions may be output to the customer in several ways. In embodiments where the customer is provided with the opportunity to accept or reject the purchase of one, pre-selected item in exchange for their change due, the dynamically priced upsell promotion may be communicated to the customer by outputting promotion content through one or more output devices, including touch screens and LED displays. In embodiments, where the customer is provided with the opportunity to select from a plurality of products one or more product, the dynamically priced upsell promotion may similarly be communicated to the customer on one or more output devices, including touch screens and LED displays. For example, a message may be output to a customer via a touch screen display reading "pick any one of 3 flashing items for your change due", and shelf-mounted LED displays corresponding to the qualifying products may accordingly flash. Alternatively or additionally, prices of the qualifying products may be temporarily changed on corresponding LED displays to the amount of change due (i.e., the prices may be changed to the amount of change due until the customer selects an upsell product, rejects the upsell promotion, or does not respond for a threshold period of time, after which the prices would revert back to the corresponding items' retail prices).

Further, as stated above, in one embodiment in which a dynamically priced upsell promotion is selected for output, a customer may be provided with the opportunity to receive a coupon or voucher in exchange for their change due. Such a coupon or voucher could be printed via the printer described herein.

In one or more embodiments, a promotion instance may be output via a user device (e.g., a cellular telephone, a pager, or a PC). For example, it may be determined that a combination promotion is to be output to all potential customers within a predetermined range of a vending machine (e.g., all potential customers located in a building that the vending machine is located in or all potential customers within two hundred feet of the vending machine). Accordingly, contact information for such potential customers may be determined and used to output promotion content. For example, cellular telephone numbers and/or pager numbers for such potential customers may be retrieved from a database of available numbers and the proximate ones may be selected based on GPS information available to the system. In another example, electronic mail (e-mail) addresses of all such potential addresses may be retrieved from a database of available e-mail addresses (e.g., a list of e-mail addresses of all persons working in an office building or a particular portion of an office building) and a promotion may be e-mailed to each of the e-mail addresses.

In summary, promotions that may be provided through the inventive system, including but not limited to combination promotions, subscription promotions, dynamically priced upsell promotions, fixed price upsell promotions, and alternate product promotions, may be output to customers via one or more output devices, including but not limited to, LED displays, LCD displays, audio speakers, CRT monitors, or any other suitable output device.

Returning now to process 1300, at step 1330 it is determined whether an acceptance signal has been received in response to the output promotion instance. In other words, it is determined whether a customer has accepted a promotion by so indicating via an input device (e.g., an input device of a vending machine, a peripheral device associated with a vending machine, or a user device). If an acceptance signal has been received, the process continues to step 1335. If an acceptance signal has not been received (e.g., a response indicating rejection of the promotion has been received or no response has been received within a predetermined period of time), the process 1300 continues to step 1340.

It should be noted that in proactive promotion embodiments, a promotion may be output via an output device of a vending machine and/or a peripheral device associated with a vending machine constantly and/or until another promotion is determined or until it is determined that the promotion is no longer appropriate. In such embodiments, it may be determined whether a customer conducting a transaction at the vending machine during the time that the promotion is being output reacted to the promotion by accepting it or rather whether the customer simply conducted a conventional transaction at the vending machine.

In step 1335 the transaction is processed in accordance with the promotion. Thus, if a customer has accepted a promotion by providing a signal via an input device (e.g., within a threshold amount of time in reactive promotion embodiments, such as by touching an "accept" field of a touch screen display within 1 minute of the output of the promotion) the following steps may be performed. First, payment may be processed (e.g., detect an amount deposited, compare such an amount to a price, dispense change, request credit authorization from a remote computer, etc.). Second, a signal may be transmitted to an item dispensing apparatus to dispense one or more items (e.g., in the case of a combination promotion, several products would be dispensed). More detailed descriptions regarding how to process various promotional promotions previously invented by Applicants are disclosed with reference to the various U.S. patents and patent applications disclosed herein.

It should be noted that, in embodiments where more than one promotion is output to a customer, step 1335 may include an additional determination of which of the output promotions the customer has accepted.

If, in embodiments where a promotion is provided to a customer conducting a transaction at a vending machine, the customer rejects the promotion (e.g. by touching a "reject" field of a touch screen display), the initially requested transaction may be processed in a conventional manner (e.g., processing payment, updating an inventory record in an inventory database, and actuating an item dispensing mechanism). Similarly, should the customer provide no response to the promotion within a threshold period of time (e.g., one minute), it may be assumed, by default, that the customer has not accepted the promotion and the transaction may be processed as it would if the customer had affirmatively rejected the promotion.

In an alternate embodiment, should the customer reject a promotion (affirmatively or by not providing a response within a threshold time), another, alternative promotion may be output to the customer (e.g., one with a lower expected profitability than the initially output promotion).

In step 1340 the results of the promotion instance are recorded in one or more databases (e.g., the promotion history database 135). For example, in a reactive promotion embodiment, an indication of the promotion instance may be stored in association with an indication of the customer's response to the promotion, a time at which the promotion had been output, and an indication of the product initially requested by the customer. In another example, in a proactive promotion embodiment, an indication of each acceptance of the promotion may be stored in association with a time of the acceptance and an indication of a product initially requested by the customer (if any). For example, a customer may walk up to a vending machine at which a proactive promotion is being output and simply accept the proactive promotion, without first indicating an initially requested product. In another example, a customer may walk up to a vending machine and, after or while the customer is selecting a product, be presented with a proactive promotion (a promotion the output of which was triggered by the customer's selection of the product but which was not constructed based on information associated with the customer's transaction).

Step 1340 may include the steps of (i) updating an inventory record in an product inventory database to reflect the vending of items, (ii) updating an inventory record in a coin inventory database to reflect a change in a coin inventory as a result of the transaction, (iii) creating or updating a transaction record in a transaction history database to indicate the acceptance or rejection of the promotion, (iv) creating or updating an acceptance or "take" rate associated with a promotion in a promotion history database to reflect the acceptance or rejection of a promotion, and/or (v) creating or updating a record in a rules' database. In an example of (v), a rule for selecting or constructing a promotion instance may be modified or deleted if the promotion is rejected a predetermined number of times, in an iterative process for refining the rule.

It should be noted that the step of updating of an acceptance or "take" rate associated with a promotion in a promotion database is advantageous in that it provides updated market data that can be used in subsequent execution of the various processes described herein. For example, updated take rates may be used to identify possible promotion types, construct promotion instances for each possible promotion type based on stored rules, and/or select promotion instances based on stored rules. In this manner, the inventive system can adapt to its local market by identifying, constructing, and outputting promotions that are successful in the local market, and by ceasing to offer those promotions that are unsuccessful. For example, because a promotion instance's take rate may be considered at 1320 when determining the projected profitability of a given promotion instance, those promotion instances with higher historical take rates may be more likely to be output as promotions to customers in 1325 than those promotion instances with relatively lower historical take rates.

The process 1330 may then return to step 1305. Alternatively, the process 1300 may end until an evaluation of current data is triggered. An evaluation of data, and thus the initiation of process 1300, may be triggered by, for example, a predetermined event (e.g., the occurrence of a predetermined time from a previous evaluation of data, an addition of a product, a dispensing of a product, a dispensing of change). In another example, process 1300 may be triggered by an instruction from an operator. In yet another example, process 1300 may be triggered by a request from a customer for a promotion.

EXAMPLE

An example of the process 1300 wilt now be described. Reference will be made to embodiment 600 (FIGS. 6A and 6B) of the product inventory database 120, the embodiment 700 (FIG. 7) of the coin inventory database 125, the embodiment 800 of the transaction history database 130, the embodiment 900 of the promotion history database 135, and the embodiment 1200 (FIG. 12) of the rules database 145. For purposes of this example, it is assumed that a control system of a vending machine 100 and/or peripheral device 255 performs the steps of process 1300, unless expressly specified otherwise.

The control system may perform step 1305 by (periodically, substantially continuously and/or when triggered by a predetermined event) accessing table 1200 and determining whether any of the conditions 1205 are satisfied by current data. For example, the control system may, every hour, determine whether or not less than 3 days remain in the current fill period. The control system may further determine whether or not a transaction is currently in process and/or whether the average actual product velocity of all inventoried products is less than the average product item velocity of all inventoried products (i.e., determine whether or not overall sales are slow). Based on these determinations, the control system may determine which, if any, promotion type is eligible for output to a customer.

Assuming, for the present example, that the control system determined (i) more than three days remain in the fill period, and (ii) a customer initiated a first transaction (Bob Jones, a customer, inserted a $1.00 into the vending machine and elected to purchase one unit of Soda X for $0.65). The control system thus determined that a combination promotion is not an eligible promotion type because the conditions of record R-1201 are not satisfied by the current data. The control system may continue to perform step 1310 by determining whether a fixed price upsell promotion, a dynamically priced upsell promotion, or an alternate product offer is eligible based on whether the conditions 1205 of record R-1202 or R-1203 are satisfied by the current data. Assume that the control system determines that the conditions of record R-1203 are satisfied based on the following determinations.

The control system may first determine whether the average actual product velocity of all inventoried products is less than the average ideal product velocity of all inventoried products (i.e., determine whether or not sales are slow). Such a determination may be made, for example, by determining an average value of the values in field 640 of table 600 (embodiment 600 of the product inventory database 120), determining an average value of the values in field 645 of table 600, and comparing the two determined averages.

The control system may then determine whether the coin inventory is sufficient to provide change for all anticipated transactions throughout the remainder of the fill period. The control system may determine this by evaluating stored transaction data (e.g., in the transaction history database 130) and the coin inventory state (e.g., as indicated by the data stored in the coin inventory database 125). For example, the control system may (i) calculate an anticipated amount of change due throughout the remainder of the fill period by determining a projected transaction volume and an average change due per transaction, and (ii) compare the anticipated amount of change due to the amount of coins currently in the vending machine's hopper.

If the data in table 800 (embodiment 800 of the transaction history database 130) were utilized for the above determination, it would be determined that the transaction volume is three transactions per day, with an average of $0.35 dispensed as change per day. Thus, the control system may reasonably anticipate that, assuming there are five days left in the fill period, approximately $1.75 in change will be needed to provide change to customers for the balance of the fill period (e.g., further assuming all future customers pay with dollar bills and no more coins are added to the hopper). It should be noted that alternative and additional methods of forecasting a future amount of change due are provided in International Patent Application Publication Number WO 98/58355, entitled CURRENCTLY HANDLING APPARATUS, published Dec. 23, 1998, the entirety of which is incorporated by reference herein.

If the data in table 700 (embodiment 700 of coin inventory database 125) were utilized for the above determination, it would be determine that a coin total of $1.25 exists in the coin hopper ((seven nickels*$0.05 value)+(four dimes*$0.10 value)+(two quarters*$0.25 value)). This is not sufficient to meet the anticipated $1.75 in change needed for the remainder of the fill period.

It should also be noted that, rather than forecasting the ability of the vending machine to make correct change for the remainder of a fill period based on the change stored in the machine, in alternate embodiments a forecast of available change may be estimated based on the rate at which customers use particular denominations to make purchases. Thus, in such alternate embodiments, the control system may consider coins that it expects to receive in determining whether or not the machine will likely have sufficient coin inventory to provide future customers in the fill period with correct change.

Based on the above determinations, the control system may determine in step 1310 that dynamically priced upsells and alternate product offers are eligible promotion types, This is because the conditions 1205 for record R-1203 are satisfied by the current data. More than three days remain in the fill period. The actual average product velocity of all inventoried products is less than the ideal average product velocity of all inventoried products. The coin inventory is less than the forecast amount of coins necessary for providing change until the end of the fill period. It should be noted that dynamically priced upsell promotions, as they function to offer customers additional products in exchange for their change due, provide a way for machines to engage in coin conservation when necessary, as is the case in the present example. Further, additional product promotions may always be desirable "reactive" promotions because they function to encourage customers to purchase higher margin products than that which they initially selected.

Accordingly, in step 1315, the control system determines at least one promotion instance for the eligible promotion type(s) based on stored rules. For example, a promotion construction rule for the alternate product offer promotion type may provide that instances are to be created (and stored in temporary memory pending filer evaluation) for every product within the same category as the initially selected product that (1) has a gross margin greater than the selected product (where gross margin=item retail price−marginal cost), (2) has a retail price equal to the initially selected product, and (3) has an actual product velocity less than its ideal product velocity. Further, a promotion construction rule for the dynamically priced upsell promotion type may provide that instances are to be created (and stored in temporary memory pending further evaluation) for every product that (1) has a different product category than that which was initially selected (e.g., a complementary product), (2) has a minimum selling price less than or equal to the change due to the customer from the first, triggering transaction, and (3) has an actual product velocity less than its ideal product velocity.

The control system may determine a promotion instance by, for example, constructing the promotion instance or receiving a constructed promotion instance from another device in response to a request from the control system. For example, the control system may access a rules database to determine a rule for constructing a combination promotion following stored promotion construction rules. It should be noted that, in some embodiments, table 1200 may include an additional field for each eligible promotion type, the field storing one or more rues for constructing the promotion type. In other embodiments, one or more rules for constructing a promotion type may be stored in another rules database or elsewhere in a memory accessible by the control system. For example, a control system of a peripheral device 255 may access (e.g., search) data stored on another device (e.g., controller 205 and/or peripheral device controller 260) to determine the rule. Alternatively, the control system may determine the rule by transmitting a request to another device (e.g., controller 205 and/or peripheral device controller 260) for the rule.

In an alternate embodiment, the control system may determine one or more promotion instances by transmitting an indication of the selected promotion type to another device (e.g., controller 205 and/or peripheral device controller 260), requesting a construction of a promotion instance and may receive, in response, one or more constructed promotion instances. Assume for purposes of the present example that the control system itself constructs the one or more promotion instances.

As described above, a promotion instance may be constructed by populating each parameter of a promotion type with a respective value. The value may be selected based on the construction rule associated with the promotion type.

The control system may first determine a promotion instance for an alternate product promotion type. In order to construct a promotion instance for an alternate product promotion, the control system may access a product inventory database, such as that illustrated in FIGS. 6A and 6B. Assume the data in the table 600 (embodiment 600 of product inventory database 120) is utilized to construct the one or more promotion instances in step 1315. Based on this data, the control system would determine, based on the above rule set for alternate product promotions, that Soda Y could be potentially output as an item in an alternate product promotion because it is a product within the same category as the initially selected product (Soda) that (1) has a gross margin greater than the selected product (Soda Y's margin=$0.45, while Soda X's margin=$0.40), (2) has a retail price equal to the initially selected product ($0.65), and (3) has an actual item velocity less than its ideal item velocity (0/day is less than 2/day). Thus, Soda Y may be selected as the value for the product parameter of the alternate product promotion instance.

The control system may then determine a promotion instance for the dynamically priced upsell promotion type, also using the data in table 600. Based on this data, the control system would determine, based on the rule set for dynamically priced upsells, that Doritos® qualify as a dynamically priced upsell offer instance because they (1) are from a different product category than that which was initially selected (Doritos® are from the "chips" category, whereas Soda X is from the "soda" category), (2) have a minimum selling price less than or equal to the change due to the customer (Bob Jones) from the first, triggering transaction (here, $0.35 is due Bob Jones for his purchase of a $0.65 item with a $1.00 bill, while the minimum selling price of Doritos® is $0.25), and (3) have an actual product velocity less than their ideal product velocity (0.5/day is less than two/day). Thus, Doritos™ may be selected as the value for the product parameter of the dynamically priced upsell product parameter.

The control system may then select one of the two promotion instances constructed (step 1320). Assume, in the present example, the control system compares the two promotion instances (alternate product offer of Soda Y vs. dynamically priced upsell of Doritos®) to determine which is more profitable when considering the products' respective margins and the promotion instances' respective "take" (i.e., acceptance) rates. As described above, the control system may so compare the promotion instances by determining the "expectedPromotionProfit" as defined herein (i.e., the profit margin of the product in the promotion instance multiplied by the "take" rate, or historic rate at which customers have accepted the promotion instance when previously offered).

The respective profit margin for Soda Y and Doritos® can be determined from the data in table 600. Table 600 illustrates a $0.45 margin for Soda Y (calculated as the $0.65 retail price of Soda Y minus the $0.20 cost of Soda Y) and a $0.15 margin for Doritos® (calculated as $0.35 price of the Doritos™ in the dynamically priced upsell offer minus the $0.20 cost of the Doritos™).

The take rate for each product when offered in an alternate product promotion or a dynamically priced upsell promotion, respectively, can be determined from a Promotion History database, such as the exemplary one illustrated in table 900. Assume the data in table 900 is used in the present example. Based on this data, the expected profitability of the instance "Soda Y rather than Soda X?" can be estimated as $0.315, or approximately $0.31 (70% of $0.45=$0.315). Also based on this data, the expected profitability of the instance "Doritos® in addition to Soda X?" can be estimated as $0.54 [(95%*$0.15)+(100%*0.40)=($0.14+$0.40)=$0.54]. It should be noted that the calculation for the dynamically priced upsell promotion "Doritos™ in addition to Soda X?" takes into account the profit margin for Soda X ($0.40, as determined from the data in table 600) and the take rate for Soda X (100% since the customer has requested to purchase Soda X). Thus, the control system, based on the criteria in the present example, select the instance "Doritos® in addition to Soda X?" as the promotion instance to be output.

Accordingly, in step 1325 the promotion instance "Doritos® in addition to Soda X?" is output to Bob Jones via an output device. For example, an LCD display may read "How about some Doritos® in exchange for your $0.35 change due?". Bob may decide whether to accept the promotion or not and the transaction will be completed as discussed above with reference to steps 1330 through 1340.

Figure 14:
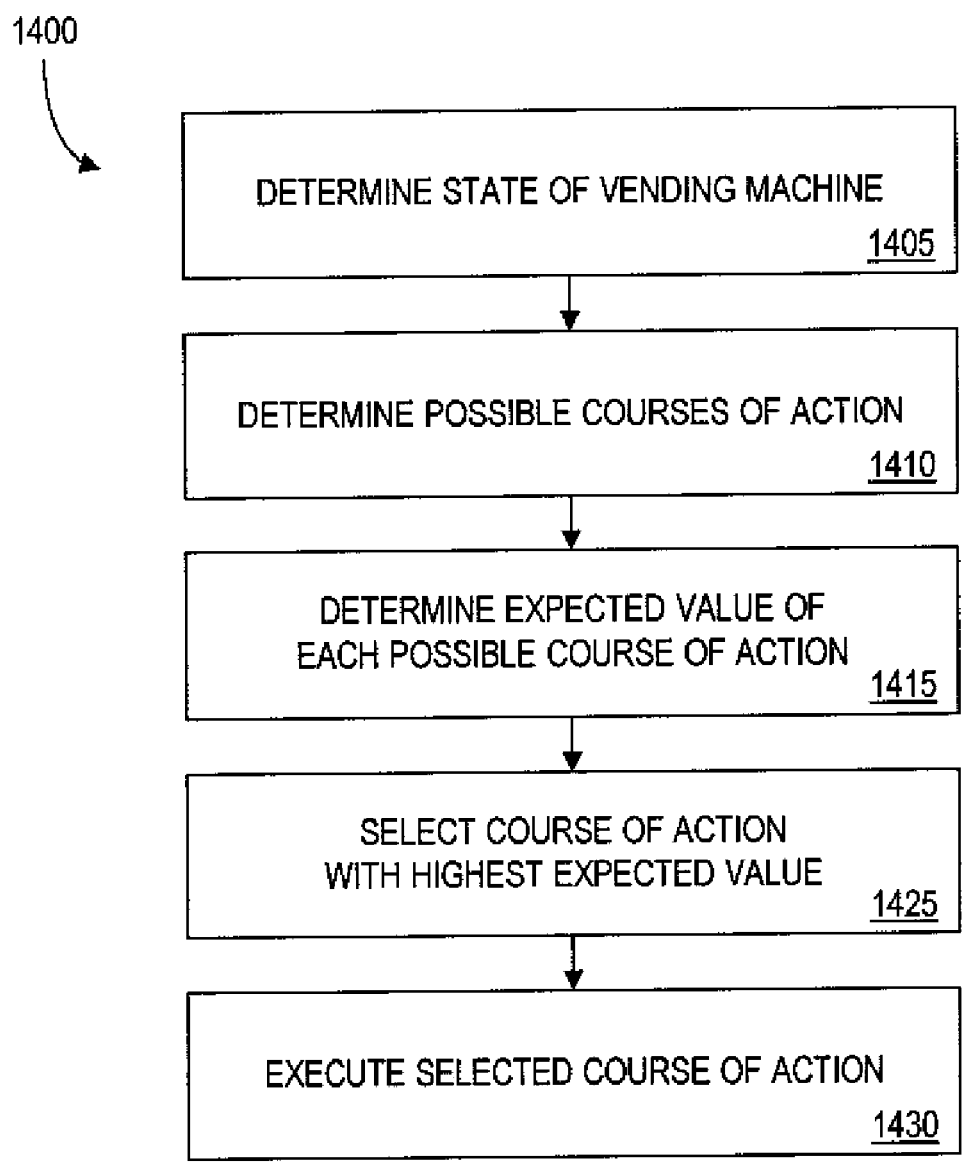
FIG. 14 is a flow diagram illustrating an exemplary process consistent with some embodiments of the present invention.

Referring now to FIG. 14, a flow diagram illustrates another process, consistent with one or more embodiments of the present invention. The embodiment illustrated by process 1400 of FIG. 14 will be introduced before the steps of 1400 are described in detail.

In one or more embodiments, a vending machine may be regarded as having a number of possible "states". A state may be defined by any one or more factors relevant to overall machine profitability or to some other metric of the vending machine. Examples of such factors include, but are not limited to: (i) a number of each type of product contained within the vending machine; (ii) a number of nickels, dimes, and quarters contained within the vending machine; (iii) a value of all the bills contained within the vending machine; (iv) a time remaining in the fill period; (v) a time of day; (vi) the weather; (vii) the season; and (viii) the date. For example, a first state may correspond to a vending machine that has six Diet Cokes® remaining, nine Cokes®, three orange drinks, seven bags of potato chips, twelve Snicker's® bars, $427.85 in currency, and for which there are seventy-two hours remaining in the fill period. Such a state description may be abbreviated as "S(6, 9, 3, 7, 12, $427.85, 72:00)," where it is understood that the first number represents the number of Diet Cokes® remaining, the second number represents the number of Cokes® remaining, and so on.

A vending machine may transition from one state to another, e.g., through the occurrence of a transaction, through the passage of time, through change in the weather, or through any other factor relevant to its state. For example, if a vending machine is in state S(6, 9, 3, 7, 12, $427.85, 72:00), and five minutes pass without any transaction occurring, the vending machine then reaches the state S(6, 9, 3, 7, 12, $427.85, 71:55). The latter state is the same as the former in every respect except that in the latter state, only seventy-one hours and fifty-five minutes remain, versus seventy-two hours in the former. If a customer now buys a single Coke® from the vending machine for a price of $1.00, in a transaction that lasts for one minute, the new state of the vending machine after the transaction will be S(6, 8, 3, 7, 12, $428.85, 71:54). As is apparent, the number of Cokes® has declined by one, the amount of currency in the vending machine has increased by $1.00, and the amount of time remaining in the fill period has decreased by one minute. Of course, numerous other state transitions are possible.

Each state S of the vending machine may be assigned, or may correspond to, a metric that may indicate, for example, the favorability of the state S. For instance, state S(6, 8, 3, 7, 12, $428.85, 71:54) may correspond to the metric "98742," while state S(5, 9, 3, 7, 12, $428.90; 71:54) may correspond to the metric "98915." If a higher value for the metric corresponds to a more favorable state of the vending machine, then the latter state is a more favorable state than the former, since the latter has the higher metric.

An exemplary "favorability" metric may comprise an expected value of the contents of a vending machine at the time of the next restock event. The expected value may be based on an actual value of the contents of the vending machine at the time of the next scheduled restock, which may be derived as follows:

$$\text{actual value} = \text{value of currency in the machine} + \sum_k (\text{\# product } k) \times (\text{cost of product } k),$$

where "k" is taken over all products in the vending machine

Prior to the end of the fill period, the actual value at the next restock event cannot be determined with certainty, since it may depend on unpredictable activities of customers. For example, the amount of currency in the machine at the next restock event will depend on the number of people that make purchases from the vending machine, the number of products they buy, and the prices they pay, none of which may be predicted with certainty. Therefore, the expected value of a vending machine at the next restock event may comprise a weighted average of various possible actual values that may occur at the time of the next restock event. The weightings of the actual values correspond to the probabilities with which each of the possible actual values may come to pass. The probabilities may be based on models of human behavior and based on the amount of time remaining to the next restock event.

To illustrate an exemplary determination of an expected value of the contents of a vending machine at the end of a fill period, a simplified vending machine will be assumed. The simplified vending machine has two products: A and B. Product A has a cost (i.e., to the vending machine operator) of $0.30, and product B has a cost of $0.20. One minute prior to end of the fill period, the simplified vending machine has $100.00 in currency, five units of product A in stock, and one unit of product B in stock. The state of the simplified vending machine may therefore be written, S(5, 1, $100.00, 0:01). Assume that the probability of no transactions occurring in the next minute is 0.8, that the probability of one transaction occurring in the next minute is 0.2, and that the probability of more than one transaction occurring in the next minute is zero. Note that these probabilities may be derived from models based on historical data about transaction frequency at the vending machine.

If no transactions occur at the vending machine in the next minute, then at the end of the fill period, the state of the vending machine will be S(5, 1, $100.00, 0:00), and the actual value of the vending machine will be:

actual value of S(5, 1, $100.00, 0:00)=$100.00+5× $0.30+1×$0.20=$101.70.

Assuming there is one transaction in the next minute, further probabilities may be utilized. Assume that, in a given transaction, there is a probability of 0.4 that product A is purchased for $1.00, resulting in a state of S(4, 1, $101.00, 0:00). Assume also that there is a probability of 0.6 that product B is purchased for $0.80, resulting in a state of S(5, 0, $100.80, 0:00). The actual values for each of these two resultant states are derived below:

$$\text{actual value of } S(4, 1, \$101, 0:00) = \$101.00 + 4 \times \$0.30 + 1 \times \$0.20$$

$$= \$102.40$$

$$\text{actual value of } S(5, 0, \$100.80, 0:00) = \$100.80 + 5 \times \$0.30 + 0 \times \$0.20$$

$$= \$102.30$$

The expected value of the vending machine in state S(5, 1, $100.00, 0:01) may therefore be computed as:

$$\text{Expected value} = \sum_m (\text{probability of scenario } m) \times$$

$$\begin{pmatrix} \text{actual value of state} \\ \text{resulting from scenario } m \end{pmatrix},$$

where "m" is taken over all possible scenarios $$= \begin{bmatrix} prob(\text{no transactions}) \times \\ \text{actual value of } S(5, 1, \$100.00, 0:00) \end{bmatrix} +$$

$$\begin{bmatrix} prob(1 \text{ transaction with } A \text{ sold for } \$1.00) \times \\ \text{actual value of } S(4, 1, \$101.00, 0:00) \end{bmatrix} +$$

$$\begin{bmatrix} prob(1 \text{ transaction with } B \text{ sold for } \$0.80) \times \\ \text{actual value of } S(5, 0, \$100.80, 0:00) \end{bmatrix}$$

$$= \begin{bmatrix} prob(\text{no transactions}) \times \\ \text{actual value of } S(5, 1, \$100.00, 0:00) \end{bmatrix} +$$

$$\begin{bmatrix} prob(1 \text{ transaction}) \times prob(A \text{ sold for} \$1.00) \times \\ \text{actual value of } S(4, 1, \$101.00, 0:00) \end{bmatrix} +$$

$$\begin{bmatrix} prob(1 \text{ transaction}) \times prob(B \text{ sold for} \$0.80) \times \\ \text{actual value of } S(5, 0, \$100.80, 0:00) \end{bmatrix}$$

$$= [0.8 \times \$101.70] + [0.2 \times 0.4 \times \$102.40] +$$

$$[0.2 \times 0.6 \times \$102.30]$$

$$= \$101.83$$

Therefore, state S(5, 1, $100.00, 0:01) may correspond to the expected value of $101.83. As may be appreciated, expected values corresponding to a number of states with one minute remaining until the next restock event may similarly be derived. For instance, S(4, 2, $100.20, 0:01) corresponds to an expected value of $101.93, since $$\text{actual value of } S(4, 2, \$100.20, 0:00) = \$100.20 + 4 \times \$0.30 + 2 \times \$0.20$$
$$= \$101.80;$$

$$\text{actual value of } S(3, 2, \$101.20, 0:00) = \$101.20 + 3 \times \$0.30 + 2 \times \$0.20$$
$$= \$102.50; \text{ and}$$

$$\text{actual value of } S(4, 1, \$101.00, 0:00) = \$101.00 + 4 \times \$0.30 + 1 \times \$0.20$$
$$= \$102.40.$$

$$\text{Expected value} = (0.8 \times \$101.80) + (0.2 \times 0.4 \times \$102.50) + (0.2 \times 0.6 \times \$102.40)$$
$$= \$101.93.$$

Further, $S(5, 2, \$99.20, 0:01)$ corresponds to an expected value of $\$101.23$, since $$\text{actual value of } S(5, 2, \$99.20, 0:00) = \$99.20 + 5 \times \$0.30 + 2 \times \$0.20$$
$$= \$101.10;$$

$$\text{actual value of } S(4, 2, \$100.20, 0:00) = \$100.20 + 4 \times \$0.30 + 2 \times \$0.20$$
$$= \$101.80; \text{ and}$$

$$\text{actual value of } S(5, 1, \$100.00, 0:00) = \$100.00 + 5 \times \$0.30 + 1 \times \$0.20$$
$$= \$101.70.$$

$$\text{Expected value} = (0.8 \times \$101.10) + (0.2 \times 0.4 \times \$101.80) + (0.2 \times 0.6 \times \$101.70)$$
$$= \$101.23.$$

Now, suppose the state of the vending machine is $S(5, 2, \$99.20, 0:02)$. Unlike the prior examples, this state now involves two minutes until the end of the fill period. However, the expected value for $S(5, 2, \$99.20, 0:02)$ may be derived with reference to the expected values of states in which only one minute remains until the end of the fill period. For instance, suppose as before, that in the next minute, the probability of no transactions occurring is 0.8, the probability of exactly one transaction occurring is 0.2, and, if there is a transaction, the probability that A will be bought for one dollar is 0.4, and the probability that B will be bought is 0.6. In the case that no transaction occurs, after one minute the state of the vending machine will be $S(5, 2, \$99.20, 0:01)$, a state whose expected value has been derived above as $\$101.23$. In the case that A is bought in the next minute, the state of the vending machine will be $S(4, 2, \$100.20, 0:01)$, a state whose expected value was derived above as $\$101.93$. In the case that B is bought in the next minute, the state of the vending machine will be $S(5, 1, \$100.00, 0:01)$, a state whose expected value was derived above as $\$101.83$. Now, $$\text{Expected value of } S(5, 2, \$99.20, 0:02) = \begin{bmatrix} prob(\text{no transaction}) * \\ \text{expected value of} \\ S(5, 2, \$99.20, 0:01) \end{bmatrix} +$$
$$\begin{bmatrix} prob(A \text{ bought for } \$1.00) * \\ \text{expected value of} \\ S(4, 2, \$100.20, 0:01) \end{bmatrix} +$$
$$\begin{bmatrix} prob(B \text{ bought for } \$0.80) * \\ \text{expected value of} \\ S(5, 1, \$100.00, 0:01) \end{bmatrix}$$
$$= [0.8 \times \$101.23] + [0.2 \times 0.4 \times \$101.93] + [0.2 \times 0.6 \times \$101.83]$$
$$= \$101.36$$

Thus, expected values of states with one minute remaining until the end of the fill period have been derived by reference to actual values of the contents of a vending machine at the end of the fill period. In turn, an expected value of a state with two minutes remaining until route pickup has been derived by reference to the expected value of states with one minute until the end of the fill period. In general, for "a", "b", and "y" greater than zero, $$\text{expected value of } S(a, b, \$x, y\text{min}) = \begin{bmatrix} prob(\text{no transaction}) * \\ \text{expected value of} \\ S(a, b, \$x, y - 1 \text{ min}) \end{bmatrix} +$$
$$\begin{bmatrix} prob(A \text{ bought for } \$1.00) * \\ \text{expected value of} \\ S(a-1, b, \$x + \$1, y - 1\text{min}) \end{bmatrix} +$$
$$\begin{bmatrix} prob(B \text{ bought for } \$0.80) * \\ \text{expected value of} \\ S(a, b-1, \$x + \$0.80, y - 1\text{min}) \end{bmatrix}$$

It will be appreciated, that this procedure may be carried out by the control system recursively to generate expected values of states in which there are three minutes remaining until the end of a fill period based on the expected values of states in which there are two minutes remaining; to generate expected values for states in which there are four minutes remaining based on states in which three minutes are remaining, and so on. In this manner, in principle, an expected value for each possible state of the vending machine may be derived using a model of the number of transactions possible in a given minute, and the likelihood of various types of transactions occurring. Of course, the derivation may be extended to involve a vending machine with many more products, to incorporate states that indicate the number of seconds remaining until the end of the fill period (rather than just the number of minutes), and so on. The model may also incorporate the possibility that a single transaction may take more than a minute, that a single transaction may involve more than one product, and so on. The model may additionally incorporate time varying probabilities. For instance, the likelihood of a transaction occurring during any given minute may change based on whether it is daytime or nighttime.

A promotion may thus be determined in accordance with the above-described embodiments (i.e., based on a state of the vending machine). For instance, if a customer inserts a dollar bill and selects a Coke® to purchase, an alternate product promotion may be output to the customer, suggesting that the customer instead purchase an orange drink. As another example, a customer may purchase an item priced at $0.70 by inserting a dollar bill. The customer may then be asked whether the customer would like to receive $0.30 change, or whether he would like to receive an additional bag of pretzels instead of his change (i.e., a dynamically priced upsell offer, as defined herein).

In one example, the actual value of the vending machine at the end of a fill period may be equal to the total costs of the products remaining plus the amount of currency in the machine. Assuming again the simplified vending machine described above, the following actual values for three different states may be derived:

$$\text{actual value of } S(5, 1, \$100.00, 0:00) = \$100.00 + (5 \times \$0.30) + (1 \times \$0.20)$$
$$= \$101.70$$

$$\text{actual value of } S(4, 1, \$100.65, 0:00) = \$100.65 + (4 \times \$0.30) + (1 \times \$0.20)$$
$$= \$102.05$$

$$\text{actual value of } S(5, 0, \$100.60, 0:00) = \$100.60 + (5 \times \$0.30) + (0 \times \$0.20)$$
$$= \$102.10$$

$$\text{actual value of } S(3, 1, \$101.00, 0:00) = \$101.00 + (3 \times \$0.30) + (1 \times \$0.20)$$
$$= \$102.10$$

$$\text{actual value of } S(4, 0, \$101.00, 0:00) = \$101.00 + 4 \times \$0.30 + 0 \times \$0.20$$
$$= \$102.20$$

Assume again that the probability of no transaction occurring in a given minute is 0.8, that the probability of a customer selecting product A during a given transaction is 0.4, and that the probability of the customer selecting product B during a given transaction is 0.6. Assume further that product A has a posted price of $0.65 and product B has a posted price of $0.60. Assume further still that, when a customer inserts a dollar bill into a vending machine, and selects product A or product B to purchase, the vending machine may offer, based on rules stored in a rules database 145, to provide an additional product A or a product B in return for what would otherwise be the customer's change. In other words, a rule for selecting a promotion from a list of constructed promotions may specify that (i) a customer who selects product A is to be provided with a dynamically priced upsell promotion for either a second unit of product A or a unit of product B, and (ii) a customer who selects a product B is to be provided with a dynamically priced upsell promotion for a unit of product A or a second unit of product B. Thus, a customer might insert a dollar and, by accepting a dynamically priced upsell promotion, receive (i) a first unit of product A for $0.65 and a second unit of product A for $0.35, (i) a unit of product A for $0.65 and a unit of product B for $0.35, (iii) a unit of product B for $0.60 and a unit of product A for $0.40, or (iv) a first unit of product B for $0.60 and a second unit of product B for $0.40.

Referring again to FIG. 14, the process 1400 will now be described with reference to an example. The process 1400 begins with step 1405, in which a current state of a vending machine is determined, as described above. Assume, for the example illustrating process 1400, that the current state of a vending machine is determined to be S(5, 1, $100.00, 0:01).

At step 1410, possible courses of action are determined. For example, step 1410 may comprise determining whether a promotion is to be output. Step 1410 may further comprise determining the type of promotion(s) that may be output and a construction of at least one promotion instance. Alternatively, step 1410 may fluffier comprise selecting a preconstructed promotion instance from a list of stored promotion instances. Eligible promotion types and/or construction of promotions may be conducted in manners similar to those described with respect to process 1300 of FIG. 13.

For example, assume a customer inserts a dollar bill and selects product A to purchase for $0.65. One possible course of action may be to not output any promotion. In that case, product A and $0.35 change may be provided to the customer. Assume further that two other courses of action identified are to either provide the customer with a dynamically priced upsell promotion for an additional unit of product A or to provide the customer with a dynamically priced upsell promotion for a unit of product B.

In step 1415 an expected value is determined for each course of action determined in step 1410. In the example, each of these possibilities has an associated expected value for the contents of the vending machine at the end of the fill period, and the task of the vending machine will be to determine which of the possibilities to choose in order to yield the maximum expected value.

If the first possibility is chosen (no promotion), then the vending machine will reach state S(4, 1, $100.65, 0:00). This state has an actual value of $102.05.

If the second possibility is chosen (dynamically priced upsell promotion for additional unit of product A), then an additional probability must be incorporated. Let prob(accept A) be the probability that the customer will accept the promotion to receive an additional unit of product A for his change of $0.35. If the customer accepts the promotion, the vending machine will reach state S(3, 1, $101.00, 0:00), with an actual value of $102.10. If the customer declines the promotion, where the probability of his declining is 1−prob (accept A), then the vending machine will again reach state S(4, 1, $100.65, 0:00), with an actual value of $102.05.

If the third possibility is chosen (dynamically priced upsell promotion for unit of product B), then another probability, prob(accept B) may be incorporated to indicate the probability that the customer will accept the promotion for the unit of product B. If the customer accepts the promotion, the vending machine will reach state S(4, 0, $101.00, 0:00) with an actual value of $102.20. If the customer declines the promotion, where the probability of his declining is 1−prob (accept B), then the vending machine will again reach state S(4, 1, $100.65, 0:00), with an actual value of $102.05.

It should be noted that prob(accept A) and prob(accept B) may be determined from models of human behavior based on e.g., the historical responses of customers to the vending machine's promotions (i.e., "take rates", as defined herein). For the present example, assume that prob(accept A)=0.7 and prob(accept B)=0.5. The expected value for the contents of the vending machine at the end of the fill period for each of the three possibilities may therefore be determined as follows:

1) expected value = actual value $S(4, 1, \$100.65, 0:00)$
   = \$102.05

2) expected value = $prob$(accept $A$) ×
   actual value $S(3, 1, \$101.00, 0:00)$ +
   $(1 - prob$(accept $A$)) ×
   actual value $S(4, 1, \$100.65, 0:00)$
   = 0.7 × \$102.10 + (1 − 0.7) × \$102.05
   = \$102.09

3) expected value = $prob$(accept $B$) ×
   actual value $S(4, 0, \$101.00, 0:00)$ +
   $(1 - prob$(accept $B$)) ×
   actual value $S(4, 1, \$100.65, 0:00)$
   = 0.5 × \$102.20 + (1 − 0.5 × \$102.05)
   = \$102.13

In step 1425, the possible course of action with the highest expected value is selected. Therefore, in the present example, if the simplified vending machine is in state S(5, 1, \$100.00, 0:01), and a customer inserts a dollar bill and chooses to purchase product A, the third possible course of action (i.e., the dynamically priced upsell promotion for a unit of product B) should be selected. That is, the customer should be offered a unit of product B in lieu of his change, since such a promotion instance results in the highest expected value for the vending machine of the three possible courses of action. Since, with optimum choice, the vending machine can realize an expected value of \$102.13 for state S(5, 1, \$100.00, 0:01), the state may be assigned the expected value of \$102.13. Therefore, in embodiments where there is a choice of several promotions, an expected value may be assigned to states based on the assumption that an optimum choice of promotion instances in every subsequent state.

In step 1430, the course of action selected in step 1425 is executed. This may comprise, for example, outputting the selected promotion (if the selected course of action includes outputting a promotion) and processing the transaction based on the customer's response to the promotion. If the selected course of action comprises not outputting any promotion, step 1430 may comprise processing the transaction in a conventional manner.

In summary, it should be appreciated that many possible courses of action may be identified in step 1430. In general, a determination may be made for each possible course of action as to the states that might result, and as to the likelihood of reaching each of those states based on e.g., the likelihood of a customer accepting a promotion ("take rates"). An expected value may then be assigned to each possible course of action based on the expected values of each state in which the possible course of action may result, and based on the probability of reaching each such state given the possible course of action. The course of action (e.g., promotion instance) with the highest associated expected value may then be selected. It will be appreciated that, using a recursive procedure, an expected value for every conceivable state may be derived. Then, during any given transaction, all possible courses of action may be enumerated, the expected value determined for each, and the course of action with the highest expected value may be chosen.

To illustrate using a formula, the expected value of a state S(a, b, \$x, y min) may be determined as follows:

$$\begin{array}{c}\text{expected value of} \\ S(a, b, \$x, y\text{min})\end{array} = \left[\begin{array}{c}prob(\text{no transaction}) \times \\ \text{expected value of } S(a, b, \$x, y - 1\text{min})\end{array}\right] +$$

$$\left[\sum_j prob(\text{transaction } j \text{ initiated}) \times \left(\begin{array}{c}\text{expected value of output} \\ \text{with the maxium expected value} \\ \text{given transaction } j \text{ initiated}\end{array}\right)\right]$$

where the index "j" is taken over all possible transactions that may be initiated and where the expected values of possible courses of action (e.g., offer instances) are determined based on the expected values of the states that would result from such courses of action, and based on probabilities with which a customer would respond in various ways to such courses of action (e.g., acceptance or "take" rates).

In other words:

$$\begin{array}{c}\text{expected value of output} \\ \text{given transaction } j \text{ initiated}\end{array} = \sum_p prob(\text{response } p) \times$$
(expected value of state that
would result from response $p$)

where the index "p" is taken over all possible responses given transaction j has been initiated.

In an alternate embodiment, the profitability of alternate product promotion instances may be calculated by considering not only the profit margin of the product to be included in the promotion instance multiplied by the take rate, but also by considering the historic profit margin of the possible alternate product(s) given the difference between the actual product velocity and the ideal product velocity. In such an embodiment, a database accessible to the control system may provide for different historic profit margins of various products that correlate with different levels of demand for the products. For example, the variation in historic profit margins may reflect the degree to which a given product will be sold for less than its suggested retail price if the product is selling at less than its ideal product velocity. A tabular representation of an exemplary database follows:

| Velocity State | Product A (cost = $0.65; suggested retail price = $.75) | Product B (cost = $0.50; suggested retail price = $.80) | Product C (cost = $0.50; suggested retail price = $.80) |
|---|---|---|---|
| If actual product velocity < ideal product velocity | Then historic profit margin = $0.05 | Then historic profit margin = $0.25 | Then historic profit margin = $0.10 |
| If actual product velocity = ideal product velocity | Then historic profit margin = $0.07 | Then historic profit margin = $0.30 | Then historic profit margin = $0.25 |
| If actual product velocity > ideal product velocity | Then historic profit margin = $0.10 | Then historic profit margin = $0.35 | Then historic profit margin = $0.30 |

Figure 15A:
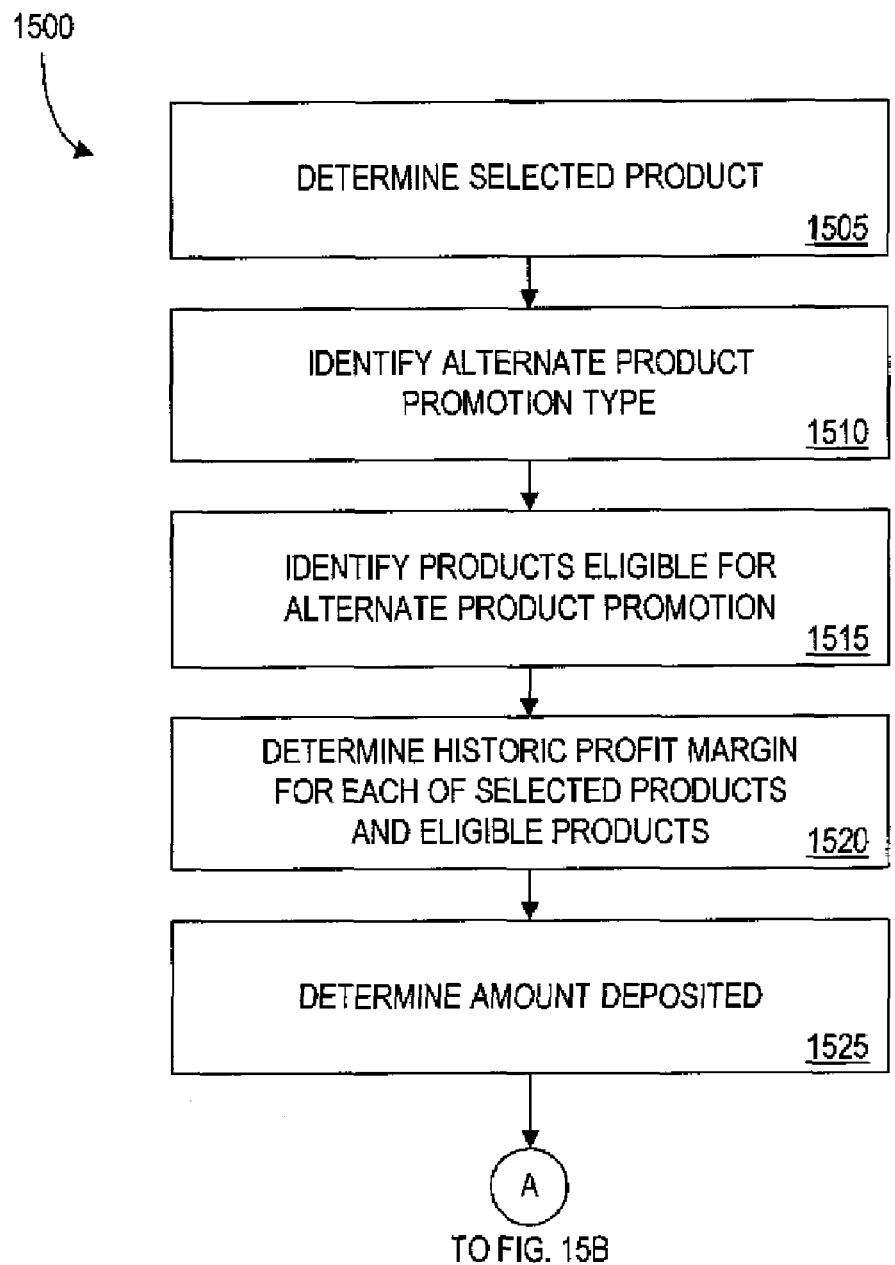
FIGS. 15A and 15B are a flow diagram illustrating an exemplary process consistent with some embodiments of the present invention.
Figure 15B:
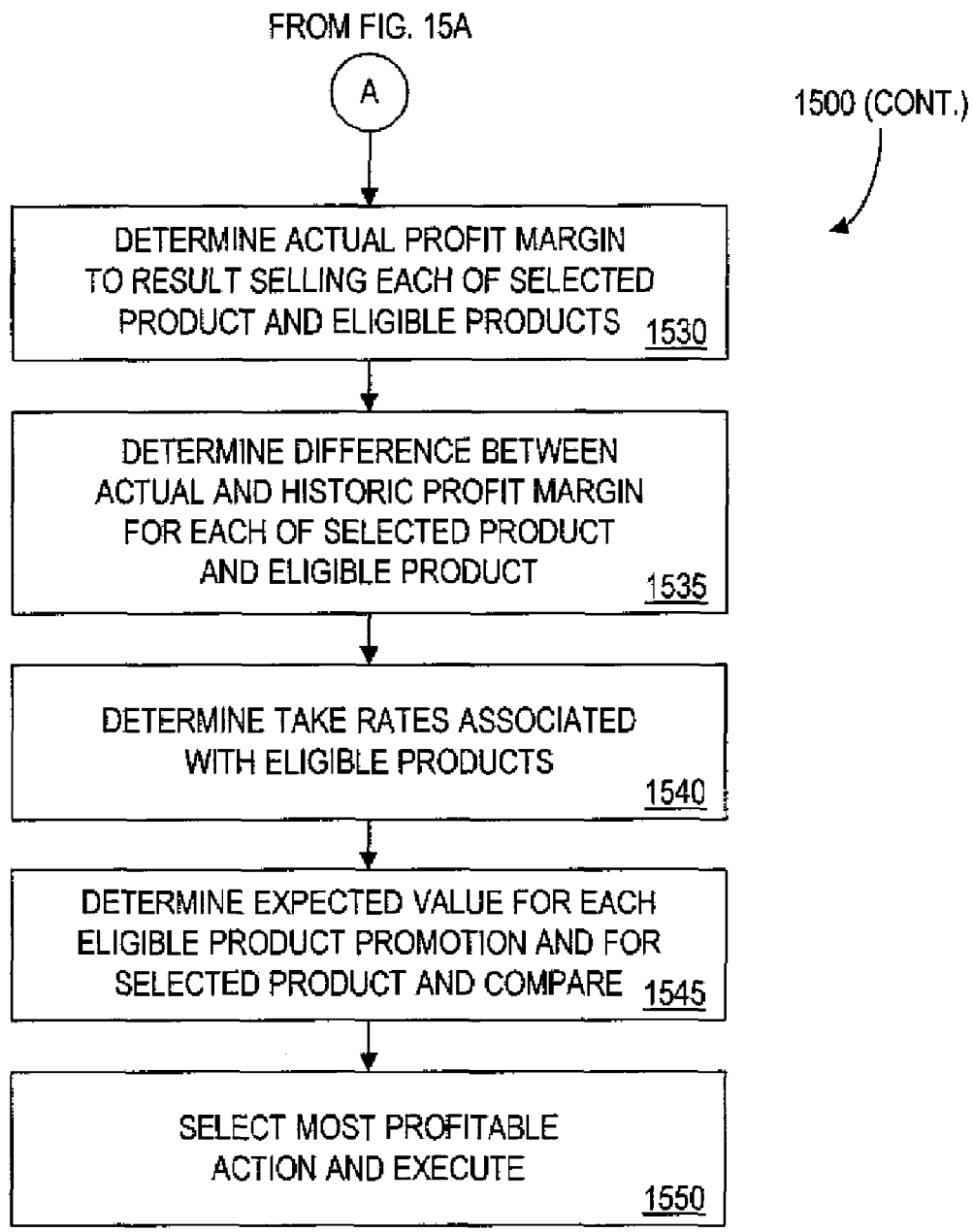

Referring now to FIGS. 15A and 15B, a flow diagram illustrates a process 1500, in accordance with the alternate embodiment just described. Process 1500 may be performed, for example, by a control system of one or more devices (e.g., a vending machine 100, a peripheral device 255, a controller 205, a peripheral device controller 260, or a combination thereof). Process 1500 wilt be described with continues reference to an example, for purposes of illustrating an exemplary usage of process 1500.

Process 1500 begins at step 1505, in which a product selected by a customer for purchase at a vending machine is determined. Assume, for purposes of the example illustrating a usage of process 1500, that it is determined that product A has been selected for purchase.

In step 1510, an alternate product promotion type is identified as an eligible promotion type. This may be done, for example, using a rules database such as that described with reference to FIG. 12.

In step 1515, products eligible to be included in the alternate product promotion type are identified. In other words, the alternate product promotion type includes a product parameter and the values for the parameter are determined. Such a determination may be made, for example, by accessing a rule for constructing an alternate product promotion type. Continuing with the example, assuming that a customer selected Product A, the control system may determine that Product B and Product C are potentially eligible to be included in an alternate product promotion type (e.g., because they are products within the same category, such as "soda").

In step 1520, the control system may determine the historic profit margin for each of the product selected for purchase by the customer and the products selected in step 1515. Continuing with the example, the historic profit margin may be determined for both Product B and Product C, as well as for Product A. Assuming that Product B is selling at its ideal product velocity, the historic profit margin would be $0.30. Assuming that Product C is selling at less than its ideal product velocity, the historic profit margin would be $0.10. Assuming that Product A—the initially requested product—is selling at higher than its ideal product velocity, the historic profit margin would be $0.10.

In step 1525, the monetary amount deposited by the customer into the vending machine as payment for the initially selected product is determined. Continuing with the example, assuming that the underlying transaction that triggered the alternate product promotion required a deposit of $0.75 and that the customer deposited the exact amount required (i.e., $0.75).

In step 1530, the actual profit margin that is expected is determined for each of the product selected for purchase by the customer and the products selected in step 1515. Continuing with the example, the control system may determine the actual profit margin that would result if the customer was offered a different product for the amount deposited. Thus, for Product B, which has a cost of $0.50, the actual profit margin would be $0.25 ($0.75 deposited–$0.50 cost=$0.25). For Product C, which also has a cost of $0.50, the actual profit margin would again be $0.25 ($0.75 deposited–$0.50 cost=$0.25). Note that, in this event, Products B and C would be selling for $0.75 each, a discount from the products' suggested retail prices ($0.80/unit for Item B and C, respectively), thereby presenting an opportunity for the customer to purchase the products at a discount. The control system may also determine the actual profit margin for the initially requested product. Thus, for Product A—the product initially selected by the customer—the actual profit margin would be $0.10 ($0.75 deposited–$0.65 cost=$0.10).

In step 1535 the difference between the actual profit margin and the historic profit margin is determined for each of the product initially selected by the customer and the products selected in step 1515. The differences would reflect the value of the present opportunities available for a given unit of each possible alternate product, without regard to take rates. Thus, continuing with the example, for Product B, the difference would be –$0.05 ($0.25-$0.30=–$0.05). For Product C, the difference would be $0.15 ($0.25–$0.10=$0.15).

In step 1540, the take rates associated with each of the products selected in step 1515 (i.e., the take rates associated with alternate product promotions specifying the selected products) are determined. This may comprise retrieving the take rates from a database.

In step 1545, the expected value for each eligible alternate product promotion instance is determined. The expected value of processing the transaction as initially requested (i.e., dispense the initially requested product and offer no promotion) is also determined. These determined expected values are then compared to one another.

Continuing with the example, assuming that the take rate for alternate product promotions offering Product B when Product A is initially requested is 50%, the expected value of the promotion instance in which Product B is offered in lieu of Product A is $0.025, calculated as follows:

(–$0.05 difference between actual and historic profit margin for Item B*50% take rate)+($0.10 actual profit margin for Item A*50% chance that customer will reject alternate product offer for Item B and thereby purchase Item A)

Assuming that the take rate for alternate product promotions offering Product C when Product A is initially requested is 80%, the expected value of the promotion instance in which Product C is offered in lieu of Product A is $0.14, calculated as follows:

($0.15 difference between actual and historic profit margin for Product C*80% take rate)+($0.10 actual profit margin for Product A*20% chance that customer will reject alternate product promotion for Product C and thereby purchase Product A)

The probability of selling Product A, assuming that no alternate product is offered, is 100% because the customer has already indicated his willingness and ability to purchase the product. Thus, the expected value for proceeding with the transaction as initially requested is $0.10, calculated as follows:

$0.10 actual profit margin for Product A*100%

In step 1550, the most profitable course of action is selected and executed. In other words, the course of action associated with the highest expected value is selected and executed. Continuing with the example, the most profitable course of action is to output an alternate product promotion for Product C.

Thus, the vending machine may realize a greater gain on the transaction than otherwise would have happened had the transaction simply been processed as the customer initially requested. Further, the vending machine may realize a greater gain on a distressed product (i.e., Product C) than reasonably could have been expected given the relatively low historic profit margin that corresponds with a relatively low level of demand. Additionally, the customer benefits from the ability to purchase an alternate product at a discount (here, Product C at a $0.05 discount). Also, the vending machine benefits from the ability to offer such distressed inventory at a discount without suffering from the effects of dilution. That is, because the customer has indicated an initial willingness to purchase Product A, it can reasonably be assumed that the customer was not willing to purchase Product C for $0.80, its suggested retail price. Thus, Product C may be sold to the customer for $0.75 without sacrificing $0.05 that may have otherwise been gained if the customer was indeed willing to purchase Product C for $0.80.

Executing the selected course of action may comprise processing the transaction in a conventional manner if the selected course of action is to offer no promotion. Alternatively, executing the selected course of action may comprise outputting a promotion instance and determining a customer's response to the promotion instance, if the selected course of action is a promotion.

Figure 16:
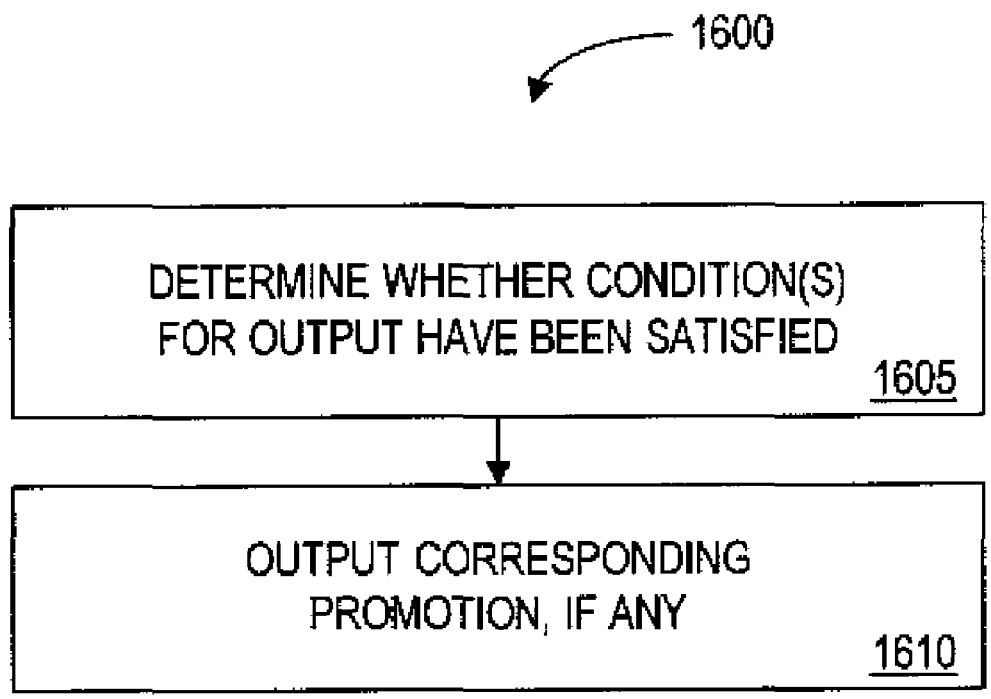
FIG. 16 is a flow diagram illustrating an exemplary process consistent with some embodiments of the present invention.

As described above, in one or more embodiments, a device (e.g., a vending machine 100, a peripheral device 255, a controller 205, a peripheral device controller 260, or a combination thereof) may determine a promotion instance by selecting a pre-constructed promotion from a list of available promotions. FIG. 16 illustrates a flow diagram of a process 1600 in accordance with such an embodiment.

Process 1600 begins with step 1605, in which it is determined whether any condition(s) for outputting a promotion have been satisfied. For example, referring to table 1000 (embodiment 1000 of an available promotions database 140), a control system may determine whether the condition(s) for output 1015 of any record of the table are satisfied by current data. Step 1605 may be performed substantially continuously, periodically, in response to a predetermined event, or otherwise as appropriate.

If it is determined, in step 1605, that condition(s) for outputting a promotion have been satisfied, the promotion corresponding to the satisfied condition(s) is output as a promotion instance in step 1610. For example, referring again to table 1000, if it is determined that the actual product velocity of Soda X is less than a minimum threshold (which may be stored in the table 1000 or elsewhere in a memory accessible by the control system) and that the number of units of Snack W in inventory is greater than ten, the promotion "P-10-321" may be output. A promotion instance may be output via any of the methods described herein.

It should be noted that, in the embodiment of FIG. 16 and in other embodiments described herein, a promotion may be associated with a promotion identifier that uniquely identifies the promotion. Such an identifier may be used, for example, to retrieve data associated with the promotion. The data may be stored in various memories or storage devices of one or more devices. For example, an image file (e.g., that stores graphics to be displayed when the promotion is output) and/or audio file (e.g., that stores one or more sounds to be output when the promotion is output) associated with the promotion may be retrieved based on the promotion identifier. The retrieved image file and/or audio file may be utilized in outputting the promotion.

In one or more embodiments, a control system may customize a pre-constructed promotion by inserting data relevant to a transaction associated with the output of the promotion instance. For example, referring again to table 1000, assume it is determined that the condition(s) for output of promotion "P-30-528" have been satisfied. In outputting the promotion "P-30-528", the actual and specific amount of change due to the customer of the transaction associated with the output of the promotion may be inserted into the text of the output promotion instance. For example, assuming a customer inserted $1.00 into a vending machine and selected a $0.65 product for purchase, the output of the promotion instance to the customer may read "Get Snack W for your $0.35 in change!".

It should be noted that the embodiments described with reference to the following figures are presented for illustrative purposes only and are not meant to be limiting in any sense. It should also be noted that, as used herein, the terms "an embodiment", "embodiment", "embodiments", "the embodiment", "the embodiments" "one or more embodiments"; "some embodiments", and "one embodiment" mean "one or more embodiments" unless expressly specified otherwise. Further, although particular features of the present invention may be described with reference to one or more particular embodiments or figures, it should be understood that such features are not limited to usage in the one or more particular embodiments or figures with reference to which they are described.

In conclusion, while the methods and apparatus of the present invention have been described in terms of particular embodiments, those skilled in the art will recognize, after reading the present disclosure, that the present invention may be practiced with modification and alteration without departing from the teachings disclosed herein.

What is claimed is:

1. A method, comprising:
   determining a promotion redeemable at a vending machine, the promotion comprising an offer distinct from a general offer to sell products from the vending machine at posted prices, wherein the determining comprises:

selecting the promotion from a plurality of available promotions, wherein the selecting comprises:
    selecting, based on data associated with transactions completed at the vending machine, the promotion from the plurality of available promotions; and
causing the promotion to be output.

2. The method of claim 1, wherein the data associated with transactions completed comprises:
data indicating products purchased from the vending machine.

3. The method of claim 1, wherein the data associated with transactions completed indicates, for each product of a plurality of products, a rate at which the product has been selling; and
further comprising:
    determining, for each product of the plurality of products, a rate at which the product should be sold; and
    wherein the selecting of the promotion further comprises:
        selecting a promotion for the product of the plurality of products for which the rate at which the product has been selling is the furthest away from satisfying the rate at which the product should be sold.

4. The method of claim 1, wherein the data associated with transactions completed comprises:
a balance of coins currently available for dispensing from the vending machine.

5. The method of claim 4, wherein the data associated with transactions completed further comprises:
data describing an amount of change dispensed from the vending machine during a period of time.

6. A method, comprising:
determining a promotion redeemable at a vending machine, the promotion comprising an offer distinct from a general offer to sell products from the vending machine at posted prices, wherein the determining comprises:
    selecting the promotion from a plurality of available promotions, wherein the selecting comprises:
        selecting, based on data associated with a transaction currently initiated at the vending machine, the promotion from the plurality of available promotions; and
causing the promotion to be output.

7. A method, comprising:
determining a promotion redeemable at a vending machine, the promotion comprising an offer distinct from a general offer to sell products from the vending machine at posted prices, wherein the determining comprises:
    selecting the promotion from a plurality of available promotions, wherein the selecting comprises:
        selecting, based on data associated with transactions completed at the vending machine and on data describing a transaction currently initiated at the vending machine, the promotion from the plurality of available promotions; and
causing the promotion to be output.

8. A method, comprising:
determining a promotion redeemable at a vending machine, the promotion comprising an offer distinct from a general offer to sell products from the vending machine at posted prices;
selecting a type of the promotion from a plurality of types of promotions, each type of promotion including at least one parameter, wherein the selecting comprises:
    selecting, based on at least one of data associated with transactions completed and data describing a transaction currently initiated but not yet completed at the vending machine, the type of promotion;
populating the at least one parameter of the selected type of promotion with a value, thereby creating an instance of the promotion; and
causing the promotion to be output.

9. The method of claim 8, wherein selecting a type of promotion is further based on a goal.

10. The method of claim 9, wherein the goal is a goal of profit to be realized by the vending machine.

11. The method of claim 10, wherein the goal of profit is a goal of profit to be realized by the vending machine for a particular product and during a predetermined period of time, the product being a product sold by the vending machine.

12. The method of claim 10, wherein the goal is a preservation of an inventory of coins available for dispensing from the vending machine.

13. A method, comprising:
determining a promotion redeemable at a vending machine, the promotion comprising an offer distinct from a general offer to sell products from the vending machine at posted prices;
selecting a type of the promotion from a plurality of types of promotions, each type of promotion including at least one parameter;
populating the at least one parameter of the selected type of promotion with a value, thereby creating an instance of the promotion, wherein the populating comprises:
    selecting, based on at least one of data associated with transactions completed at the vending machine and data associated with a transaction currently initiated but not yet completed at the vending machine, the value to be at least one value from a plurality of available values; and
causing the promotion to be output.

14. The method of claim 13, further comprising:
determining a list of the plurality of available values from which the value for the at least one parameter is selected.

15. The method of claim 14, wherein determining the plurality of available values comprises:
selecting a subset of values from a set of available values based on the at least one of data associated with transactions completed at the vending machine and data associated with a transaction currently initiated at the vending machine.

16. The method of claim 13, wherein the selecting of the value is further based on a goal.

17. The method of claim 16, wherein the goal is a goal of profit.

18. The method of claim 17, wherein the goal of profit is a goal of profit to be made by the vending machine for a particular product during a predetermined period of time, the product being a product sold by the vending machine.

19. The method of claim 16, wherein the goal is a preservation of an inventory of coins available for dispensing from the vending machine.

20. The method of claim 13, wherein each value of the plurality of values represents a product of a plurality of products sold by the vending machine, and
wherein the data associated with transactions completed indicates, for each product of the plurality of products, a rate at which the product has been selling; and further comprising:
  determining, for each product of the plurality of products, a rate at which the product should be sold; and
  wherein selecting the value from the plurality of values comprises:
    selecting a value representing the product of the plurality of products for which the rate at which the product has been selling is the furthest away from satisfying the rate at which the product should be sold.

21. A method, comprising:
  determining a promotion redeemable at a vending machine, the promotion comprising an offer distinct from a general offer to sell products from the vending machine at posted prices;
  selecting a type of the promotion from a plurality of types of promotions, each type of promotion including at least one parameter, wherein selecting the type of promotion is based on a goal;
  populating the at least one parameter of the selected type of promotion with a value, thereby creating an instance of the promotion; and
  causing the promotion to be output.

22. The method of claim 21, wherein the goal is a goal of profit to be made by the vending machine.

23. The method of claim 22, wherein the goal of profit is a goal of profit for a particular product during a predetermined period of time, the product being a product sold by the vending machine.

24. The method of claim 21, wherein the goal is a goal of preserving an inventory of coins available for dispensing from the vending machine.

25. A method, comprising:
  determining a promotion redeemable at a vending machine, the promotion comprising an offer distinct from a general offer to sell products from the vending machine at posted prices, wherein the determining comprises:
    determining, at the vending machine and based on at least one of data associated with transactions completed at the vending machine and data associated with a transaction initiated at the vending machine, the promotion to be output via an output device of the vending machine; and
  causing the promotion to be output.

26. A method, comprising:
  determining a promotion redeemable at a vending machine, the promotion comprising an offer distinct from a general offer to sell products from the vending machine at posted prices, wherein the determining comprises:
    selecting a type of the promotion from a plurality of types of promotions, each type of promotion including at least one parameter;
    populating the at least one parameter of the selected type of promotion with a first value, thereby creating a first instance of a promotion;
    populating the at least one parameter of the selected type of promotion with a second value, thereby creating a second instance of a promotion; and
    selecting one of the first instance of the promotion and the second instance of the promotion for output via an output device associated with the vending machine, wherein the selecting of the one of the first instance of the promotion and the second instance of the promotion comprises:
      selecting, based on at least one of data associated with completed transactions at the vending machine and data associated with a transaction initiated at the vending machine, the one of the first instance of the promotion and the second instance of the promotion for output via the output device associated with the vending machine; and
  causing the promotion to be output.

27. The method of claim 26, wherein the selecting one of the first instance and the second instance is further based on a goal.

28. The method of claim 27, wherein the goal is a goal of profit to be realized by the vending machine.

29. The method of claim 28, wherein the goal of profit comprises a goal of profit to be realized by the vending machine for a particular product, the product being a product sold by the vending machine.

30. The method of claim 27, wherein the goal is a preservation of an inventory of coins available for dispensing from the vending machine.

31. The method of claim 27, further comprising:
  determining the goal.

32. A method, comprising:
  determining a promotion redeemable at a vending machine, the promotion comprising an offer distinct from a general offer to sell products from the vending machine at posted prices, wherein the determining is performed in response to an initiation of a transaction at the vending machine; and
  causing the promotion to be output.

33. The method of claim 32, wherein the causing comprises:
  causing the promotion to be output to a customer associated with the initiated transaction before a completion of the initiated transaction.

34. A method, comprising:
  determining a promotion redeemable at a vending machine, the promotion comprising an offer distinct from a general offer to sell products from the vending machine at posted prices, wherein the determining is performed based on a current time; and
  causing the promotion to be output.

35. The method of claim 34, wherein the determining is performed if the current time is within a predetermined time of a previous determination of a promotion to be output.

36. A method, comprising:
  determining a promotion redeemable at a vending machine, the promotion comprising an offer distinct from a general offer to sell products from the vending machine at posted prices, wherein the determining is performed in response to a predetermined event; and
  causing the promotion to be output.

37. The method of claim 36, wherein the predetermined event comprises at least one of:
  an addition of inventory to the vending machine;
  a dispensing of a product from the vending machine;
  a dispensing of currency from the vending machine;
  a receipt of a response to a previous promotion output via the output device of the vending machine;
  an update of a price of a product sold by the vending machine;
  a selection of an item to be purchased from the vending machine;
  a receipt of an instruction to determine a promotion;
  an audit of inventory of the vending machine;
  an audit of transactions completed at the vending machine;

an audit of an inventory of coins available for dispensing from the vending machine; and a request for a promotion.

38. A method, comprising:

determining a promotion redeemable at a vending machine, the promotion comprising an offer distinct from a general offer to sell products from the vending machine at posted prices; and causing the promotion to be output, wherein the causing comprises:

causing the promotion to be output such that the promotion is presented to all viewers of the vending machine.

39. A method, comprising:

determining a promotion redeemable at a vending machine, the promotion comprising an offer distinct from a general offer to sell products from the vending machine at posted prices; and causing the promotion to be output, wherein the causing comprises:

causing the promotion to be output constantly until it is determined either that the promotion is no longer to be output or that the promotion is to be replaced by another promotion.

40. A method, comprising:

determining a promotion redeemable at a vending machine, the promotion comprising an offer distinct from a general offer to sell products from the vending machine at posted prices; and causing the promotion to be output, wherein the causing comprises:

causing the promotion to be output in response to an initiation of a transaction at the vending machine.

41. A method, comprising:

determining a promotion redeemable at a vending machine, the promotion comprising an offer distinct from a general offer to sell products from the vending machine at posted prices;

causing the promotion to be output;

receiving a response to the promotion; and storing an indication of the response in association with the promotion, for use in determining another promotion.

42. A method, comprising:

determining an occurrence of a predetermined event;

constructing, in response to the occurrence of the predetermined event, an instance of a promotion, the instance of the promotion being distinct from a general offer to sell products from the vending machine at posted prices, wherein the instance of the promotion is constructed based on (i) at least one of data associated with transactions completed at the vending machine and data associated with a transaction currently initiated at the vending machine; and (ii) a predetermined goal stored in a memory of the vending machine; and outputting, via an output device associated with the vending machine, the instance of the promotion.

43. The method of claim 42, wherein the predetermined event comprises at least one of:

an addition of inventory to the vending machine;

a dispensing of a product from the vending machine;

a dispensing of currency from the vending machine;

a receipt of a response to a previous promotion output via the output device associated with the vending machine;

an update of a price of a product sold by the vending machine;

a selection of an item to be purchased from the vending machine;

a receipt of an instruction to determine a promotion;

an audit of inventory of the vending machine;

an audit of transactions completed at the vending machine;

an audit of an inventory of coins available for dispensing from the vending machine;

an initiation of a transaction at the vending machine; and a request for a promotion.

44. The method of claim 42, wherein the data associated with transactions completed at the vending machine comprises at least one of:

data indicating products purchased from the vending machine;

a balance of coins currently available for dispensing from the vending machine; and data describing an amount of change dispensed from the vending machine.

45. The method of claim 42, wherein the data associated with a transaction currently initiated at the vending machine comprises at least one of:

an amount of currency inserted into the vending machine;

a product selected for purchase; and a current time.

46. The method of claim 42, wherein the predetermined goal comprises at least one of:

a goal of profit to be realized by the vending machine; and a preservation of an inventory of coins available for dispensing from the vending machine.

47. The method of claim 46, wherein the goal of profit is a goal of profit to be realized by the vending machine for a particular product and during a predetermined period of time, the product being a product sold by the vending machine.

48. The method of claim 42, further comprising:

selecting a product to be the subject of the instance of the promotion.

49. The method of claim 48, wherein the data associated with transactions completed indicates, for each product of a plurality of products, a rate at which the product has been selling; and further comprising:

determining, for each product of the plurality of products, a rate at which the product should be sold; and wherein selecting a product comprises:

selecting a product of the plurality of products for which the rate at which the product has been sold is furthest away from satisfying the rate at which the product should be sold.

50. The method of claim 42, wherein constructing an instance of a promotion comprises:

determining, based on at least one rule, which types of promotions are eligible to serve as a basis for the instance of the promotion;

constructing, based on at least one rule, at least one instance of a promotion for each type of promotion determined to be eligible; and selecting, based on at least one rule, at least one of the constructed instances of a promotion.

51. The method of claim 50, further comprising:

outputting one of the selected at least one of the constructed instances of a promotion.

52. The method of claim 50, further comprising:

outputting each of the selected at least one of the constructed instances of a promotion.

53. The method of claim 50, wherein selecting comprises: selecting the one constructed instance of a promotion that is expected to yield the highest profit margin.

54. The method of claim 50, wherein selecting comprises: selecting at least one of the constructed instances of a promotion based on at least one of:
- an expected profitability of each constructed instance of a promotion;
- a likelihood of acceptance of each constructed instance of a promotion;
- an inventory of coins available for dispensing from the vending machine;
- an inventory of products available for sale from the vending machine; and
- a determination, for each of a plurality of products that are the subject of at least one of the constructed instances of a promotion, a difference in a rate at which the product is being sold and a rate at which the product should be sold.

55. The method of claim 50, wherein selecting comprises: selecting at least one of the constructed instances of a promotion based on a profitability of a product selected for purchase, as indicated by the data associated with the transaction currently initiated at the vending machine.

56. The method of claim 42, wherein outputting comprises:
- visually outputting, via a display device associated with the vending machine, the instance of the promotion before the completion of the transaction currently initiated at the vending machine; and
- ceasing to output the instance of the promotion upon receiving one of an acceptance and rejection of the instance of the promotion.

57. The method of claim 42, wherein outputting comprises:
- visually outputting, via a display device associated with the vending machine, the instance of the promotion such that the instance of the promotion is viewable by any customer of the vending machine; and
- continuing to output the instance of the promotion until a determination of one of a desirability to cease outputting the instance of the promotion, and an instance of another promotion.

58. The method of claim 42, further comprising:
- receiving a response to the instance of the promotion, the response indicating one of an acceptance and a rejection; and
- storing an indication of the response in association with an indication of the instance of the promotion, for use in constructing another instance of a promotion.

59. A vending machine, comprising:
a processor, and
a storage device that stores a program for directing the processor;
the processor being operative with the program to:
perform the method of claim 42.

60. A computer readable medium encoded with instructions for directing a processor to:
perform the method of claim 42.

61. A control system operable to:
determine, based on a stored goal associated with a vending machine, whether a promotion should be output;
determine, in the case that it is determined that a promotion should be output, a plurality of eligible promotions;
determine, for each of the plurality of eligible promotions, at least one promotion instance;
select a one or more of the promotion instances to be output; and
output the selected one or more promotion instances.

62. The control system of claim 61, wherein the control system is further operable to:
determine a receipt of an acceptance signal associated with a customer of the vending machine, wherein the acceptance signal is indicative of an acceptance of one of the outputted one or more promotion instances; and
process a transaction at the vending machine in accordance with the accepted one of the outputted one or more promotion instances.

63. The control system of claim 62, wherein the processing comprises:
processing a payment associated with the customer's purchase of one or more items in accordance with the accepted one of the outputted one or more promotion instances; and
causing a dispensing mechanism of the vending machine to dispense the one or more items.

64. The control system of claim 61, wherein the outputting comprises:
broadcasting an indication of the selected one or more promotion instances within a pre-determined range of the vending machine.

65. The control system of claim 61, wherein the outputting comprises:
determining an electronic address associated with each of a plurality of customer devices; and
transmitting an indication of the selected one or more promotion instances to a set of the plurality of customer devices via the respective electronic addresses.

66. The control system of claim 65, wherein the set of the plurality of customer devices is determined based on Global Positioning System (GPS) information associated with each customer device of the set of the plurality of customer devices.

67. The control system of claim 61, wherein the stored goal comprises a profit target.

68. The control system of claim 67, wherein the determining of whether a promotion should be output is further based on a forecast indicative of whether the profit target will be achieved by the vending machine upon an expiration of a time period.

69. The control system of claim 61, wherein the stored goal comprises an inventory target.

70. The control system of claim 69, wherein the determining of whether a promotion should be output is further based on a forecast indicative of whether the inventory target will be achieved by the vending machine upon an expiration of a time period.

71. The control system of claim 61, wherein the determining of the plurality of the eligible promotions is randomly triggered.

72. The control system of claim 61, wherein the determining of the plurality of the eligible promotions is based at least in part on a comparison of current vending machine data and one or more stored eligible promotion rules.

73. The control system of claim 72, wherein the current vending machine data comprises one or more of: (i) data from a vending machine sensor; (ii) data from a vending machine temperature sensor; (iii) data indicative of an amount of coin deposited into the vending machine; (iv) data indicative of a product inventory of the vending machine; (v) data indicative of an amount of time remaining in a current sales period; (vi) data indicative of a current product velocity; (vii) data indicative of a minimum product selling price; (viii) data indicative of a marginal cost of an item; (ix) data indicative of a full price of the item; and (x) data indicative of a product category associated with the item.

74. The control system of claim 61, wherein the determining of the at least one promotion instance for each of the plurality of eligible promotions comprises:
   determining, based on one or more stored rules, a value for a parameter that defines each promotion instance; and
   populating the parameter defining each promotion instance with the value.

75. The control system of claim 74, wherein the parameter defines a product associated with each promotion instance and wherein the value comprises a product identifier, and wherein the one or more stored rules comprise a rule for selecting the product identifier based on a product velocity associated with the product identifier.

76. The control system of claim 61, wherein the selecting of the one or more of the promotion instances to be output is based at least in part on one or more stored promotion instance selection rules.

77. The control system of claim 76, wherein the one or more stored promotion instance selection rules comprise one or more of: (i) a rule associated with a profit margin of each promotion instance; (ii) a rule associated with a take rate of each promotion instance; (iii) a rule associated with an expected promotion profit of each promotion instance; (iv) a rule associated with a coin inventory state of the vending machine; (v) an override rule; (vii) a priority rule; (viii) a weight rule; and (ix) a rule associated with a product velocity of each product associated with each promotion instance.

78. The control system of claim 61, wherein the control system comprises a control system of the vending machine.

79. The control system of claim 61, wherein the control system comprises a control system of a peripheral device.

80. The control system of claim 61, wherein the control system comprises a control system of a central controller.

* * * * *